(12) United States Patent
Arakel et al.

(10) Patent No.: US 7,595,001 B2  
(45) Date of Patent: Sep. 29, 2009

(54) PROCESS FOR THE TREATMENT OF SALINE WATER

(75) Inventors: Aharon Arakel, Pennant Hills (AU); Hongjun Tian, Carlingford (AU); Lance James Stapleton, Cronulla (AU)

(73) Assignee: GEO-Processors USA, Inc., Glendale, CA (US)

( * ) Notice: Subject to any disclaimer, the term of this patent is extended or adjusted under 35 U.S.C. 154(b) by 329 days.

(21) Appl. No.: 10/533,980

(22) PCT Filed: Aug. 27, 2003

(86) PCT No.: PCT/AU03/01088

§ 371 (c)(1),  
(2), (4) Date: Mar. 27, 2006

(87) PCT Pub. No.: WO2004/041731

PCT Pub. Date: May 21, 2004

(65) Prior Publication Data

US 2006/0196836 A1 Sep. 7, 2006

(30) Foreign Application Priority Data

Nov. 5, 2002 (AU) .............................. 2002952478  
Nov. 28, 2002 (AU) .............................. 2002953007

(51) Int. Cl.  
*C02F 1/58* (2006.01)

(52) U.S. Cl. .................. 210/710; 210/638; 210/652; 210/724; 210/726; 423/158; 423/184

(58) Field of Classification Search .................. 210/710  
See application file for complete search history.

(56) References Cited

U.S. PATENT DOCUMENTS 2,342,666 A * 2/1944 Sheldon et. al. ............. 423/160

(Continued)

FOREIGN PATENT DOCUMENTS

AU 641871 9/1993

(Continued)

OTHER PUBLICATIONS

Schofield, S. et al. 1998 "Sodium-bicarbonate waters—the danger of artesian flow from boreholes in the Ballimore region, central NSW" Groundwater Sustainable Solutions, International Groundwater Conference IAH, University of Melbourne.

(Continued)

*Primary Examiner*—Peter A Hruskoci  
(74) *Attorney, Agent, or Firm*—Knobbe Martens Olson & Bear LLP

(57) ABSTRACT

A process and an apparatus are described for treating seven types of saline waters each having a concentration of total dissolved solids exceeding 1 g/L, wherein the concentration of total dissolved solids, the ratio of the chloride ion concentration to the bicarbonate ion concentration and the ratio of the chloride ion concentration to the sulphate ion concentration of each of the water types are as indicated in Table 1. The process includes the steps of contacting the water with a first reagent comprising a source of calcium ions selected from calcium oxide and calcium hydroxide to form a first solid product which is recovered. The process includes a further step of subjecting at least a portion of the partially processed water to at least partial evaporation so as to promote the formation of a precipitate and a mother liquor. The precipitate is recovered as a second product.

22 Claims, 22 Drawing Sheets

U.S. PATENT DOCUMENTS

| | | | | |
|---|---|---|---|---|
| 2,793,099 | A | * | 5/1957 | Clarke ........................ 423/164 |
| 3,350,292 | A | * | 10/1967 | Weinberger et al. ......... 210/651 |
| 3,676,067 | A | | 7/1972 | Tabata et al. |
| 4,036,749 | A | * | 7/1977 | Anderson ................... 210/638 |
| 4,059,513 | A | * | 11/1977 | Zadera ....................... 210/696 |
| 4,180,547 | A | | 12/1979 | Chirico |
| 4,188,291 | A | * | 2/1980 | Anderson ................... 210/639 |
| 4,336,232 | A | * | 6/1982 | Moritz ....................... 423/164 |
| 4,392,959 | A | * | 7/1983 | Coillet ....................... 210/638 |
| 4,423,009 | A | | 12/1983 | Maurel et al. |
| 4,956,157 | A | | 9/1990 | Nasu |
| 5,221,528 | A | * | 6/1993 | Jongema ................. 423/499.1 |
| 6,342,127 | B1 | | 1/2002 | Possidento |
| 7,198,722 | B2 | * | 4/2007 | Hussain ..................... 210/651 |
| 2003/0080066 | A1 | | 5/2003 | Vohra et al. |

FOREIGN PATENT DOCUMENTS

| | | |
|---|---|---|
| AU | 677563 | 4/1997 |
| CN | 1112905 | 12/1995 |
| DE | 39 13 044 A1 | 10/1990 |
| JP | 54-029879 A | 3/1979 |
| JP | 2003325945 A | 11/2000 |

OTHER PUBLICATIONS (2000) "Technology for complex waste-free processing of natural saline waters with obtaining fresh water and valuable mineral products" from Vernadsky Institute of Geochemistry and Analytical Chemistry, Russian Academy of Sciences.

* cited by examiner

PROCESS FOR THE TREATMENT OF SALINE WATER

FIELD OF THE INVENTION

This invention relates to the treatment of saline impaired water. More particularly, the invention relates to a process and apparatus for the comprehensive treatment of saline impaired water, for the recovery of useful products therefrom and/or for the avoidance or elimination of liquid effluent.

BACKGROUND OF THE INVENTION

Saline impaired waters originate from many sources and exhibit diverse salinity levels and chemical compositions, largely reflecting the source, the extent of natural erosion processes and contaminant input by human activities.

Large occurrences of saline impaired water, characterised by elevated alkalinity and salinity and emanating from ground water sources are recorded from many sedimentary basins in Australia and elsewhere. Such saline impaired waters are particularly common in those sedimentary basins incorporating coal beds and seams at sub-surface depths.

Saline impaired water is sometimes evaporated in evaporation ponds, discharged into waterways, oceans and sewers or disposed of by injection into deep wells or holding voids.

With the mounting concern over disposal problems and the impact of long-term storage of saline effluent at landscape level or in underground formations, government agencies around the globe now require the major producers of saline waste water to operate under stricter effluent disposal regulations. These regulations often even prohibit the discharge of any waste water. Processes that do not produce any waste water (or that avoid discharging water outside their operation areas) are referred to as Zero Liquid Discharge (ZLD) processes. ZLD processes commonly combine membrane, distillation and thermo-mechanical evaporation technologies to process waste water to recover a "clean" water portion and another portion of either a highly concentrated liquid or a dry "cake" solid residue requiring disposal.

In countries like Australia, the treatment of massive volumes of saline ground water in RO desalination processes offers significant potential for multiple benefits, i.e., environmental protection and water supply to communities, provided that effluent from such processes can be safely and cost effectively disposed of.

One approach is to remove hazardous or undesirable contaminants from the RO concentrate, in order to facilitate disposal thereof by storage, discharge, re-injection into aquifers, incineration of solids, etc.

Another approach is to further concentrate the volume of the RO concentrate by evaporation of water therefrom.

Still another approach is to use the concentrate productively, by selectively or sequentially recovering dissolved solids in useable form, thereby reducing the costs of treatment.

Pre-treatment of feed to RO desalination plants is known to constitute a significant portion of the total operating costs of RO desalination processes (K. S. Speigler and Y. M. El-Sayed, 1994; *Sandia and Bureau of Reclamation,* 2003). If left untreated, the elevated concentration of certain dissolved solids (such as silica, sulphate, bicarbonate and certain metals) may be a cause of damage to RO membranes resulting in shorter membrane life and increased membrane replacement costs.

Current ZLD processes involving the evaporation of effluent by thermo-mechanical means to a solid residue (or salt cake) for land fill disposal are very expensive both in terms of capital and operating costs. In addition, they require land filling which contributes to environmental concerns. Additionally, the large energy consumption of brine concentrators represents a major disadvantage.

US Patent application No. US 2003/0080066 A1 describes a process for yielding valuable products from concentrated brines. While this process may improve salt quality, it is limited in application to seawater type saline waters that are first concentrated several fold. A further drawback of this process is the use of calcium chloride as the sole reagent for the removal of sulfate, thus limiting the usefulness of this process to certain saline impaired water types. A related major disadvantage of this process is its high capital and reagent costs.

U.S. Pat. No. 4,180,547 discloses a process for the recovery of chemicals from saline waters containing dissolved solids ranging from 3 wt % to 8 wt %, in which sodium carbonate and sodium hydroxide are used as primary reagents for the recovery of calcium and magnesium ions as useable products. The process provides means for further treatment of the partially processed water to recover chemical products, some of which are partially recycled to reduce throughput volume, equipment size and utility cost while improving sodium chloride yield and impurity. Major disadvantages of this process are that it considers only waters with a TDS of over 30 g/L and fails to recover bicarbonate ions in the form of a useful product. Furthermore, the process uses relatively costly reagents and it is acknowledged by the inventor to produce a waste stream, although minimal, and is thus precluded from consideration as a ZLD process.

Processes for the manufacture of precipitated calcium carbonate (PCC) are described in several patents including U.S. Pat. No. 3,320,026, U.S. Pat. No. 4,882,310, U.S. Pat. No. 5,643,415 and U.S. Pat. No. 6,221,146. However, these processes commonly require direct reaction of calcium oxide with carbon dioxide gas, the generation of which gas is costly and usually requires a large and expensive energy input, thus adding significantly to the cost of the PCC production. Also, the aforementioned processes suffer from the disadvantage of the need for accurate control of process conditions so to ensure that the physical properties of the PCC product are as desired and, particularly, to achieve the desired particle size and morphology. The low solubility of lime in an aqueous medium is one of the reasons for having to control operating conditions in the above processes within a narrow range.

Another product of significant commercial value which may be extracted from saline effluents is magnesium hydroxide. Processes for the extraction of magnesium hydroxide are described in U.S. Pat. Nos. 3,787,558 and 4,314,985. Australian Patent 677563 describes a process for producing a high grade magnesium hydroxide from high sulphate content saline waste water. The two stage reaction described in the latter patent leads to significant loss of magnesium ions during the desulphation stage. This method for the production of magnesium hydroxide also generates a significant volume of partially processed water which requires disposal. Consequently, it is considered unsuitable for comprehensive treatment of saline impaired waters to meet the goals of ZLD.

Whereas the prior art processes described above generally claim to be conducive to the reduction of the salt load of the saline waste water and the alleviation of some of the problems associated with effluent disposal, none of these processes can be regarded as a ZLD process because partially processed water, waste effluent and/or slurry emanate from them, which require disposal.

The aforementioned processes for the production of magnesium hydroxide also require pretreatment by either evaporation or cooling and are limited in their use of alternative reagents for cost effective recovery of products. Where these processes are used for the treatment of concentrate generated by known desalination processes, the broader application of these processes is limited primarily due to the inability to achieve ZLD objectives.

Accordingly, there is a need for a process for the comprehensive treatment of saline impaired water by means of sequential extraction of saleable chemical products. There is also a need for a process for reducing the salt loading and volume of saline impaired water.

OBJECTS OF THE INVENTION

It is an object of the invention to overcome or substantially ameliorate at least one of the above disadvantages.

It is another object of the invention to address at least one of the above needs.

It is a further object of the invention to provide a process for the comprehensive treatment of saline impaired waters rich in dissolved ions, which process overcomes or at least ameliorates one or more of the disadvantages of existing processes.

These and other objects of the invention will be apparent from the following definitions and description of the present invention, including the various aspects thereof, read in conjunction with the accompanying tables, examples and drawings.

SUMMARY OF THE INVENTION

According to a first aspect of the invention, there is provided a method of treatment of water containing dissolved solids, wherein the water is selected from the group consisting of types 1 to 7 waters as defined in Table 1:

TABLE 1

| Type | TDS (g/L) | $Cl^-/HCO_3^-$ mol. | $Cl^-/2SO_4^{2-}$ mol. |
|---|---|---|---|
| 1 | 1 to 60 | <2 | >1 |
| 2 | 1 to 15 | ≧2 | >1 |
| 3 | 1 to 15 | >2 | <1 |
| 4 | >15, ≦60 | >5 | >7 |
| 5 | >15, ≦60 | >5 | <7 |
| 6 | >60 | >5 | >9 |
| 7 | >60 | >5 | <9 | comprising the steps of:
(a) contacting the water with a first reagent comprising a source of calcium ions selected from the group consisting of calcium oxide, calcium hydroxide, and a combination thereof, so as to cause at least some solids dissolved in the water to react with the first reagent and to form a first solid product and a partially processed water;
(b) recovering the first solid product from the partially processed water;
(c) at least partially concentrating at least a portion of the partially processed water, so as to promote the formation of a precipitate and a mother liquor; and
(d) recovering the precipitate from the mother liquor, as a second product.

According to a second aspect of the invention, there is provided an apparatus for the treatment of water containing dissolved solids, wherein the water is selected from the group consisting of types 1 to 7 waters as defined in Table 1:

TABLE 1

| Type | TDS (g/L) | $Cl^-/HCO_3^-$ mol. | $Cl^-/2SO_4^{2-}$ mol. |
|---|---|---|---|
| 1 | 1 to 60 | <2 | >1 |
| 2 | 1 to 15 | ≧2 | >1 |
| 3 | 1 to 15 | >2 | <1 |
| 4 | >15, ≦60 | >5 | >7 |
| 5 | >15, ≦60 | >5 | <7 |
| 6 | >60 | >5 | >9 |
| 7 | >60 | >5 | <9 | comprising:
(A) means for contacting the water with a first reagent comprising a source of calcium ions selected from calcium oxide, calcium hydroxide, and a combination thereof so as to cause at least some of the dissolved solids to react with the first reagent and to form a first solid product and a partially processed water;
(B) means for recovering the first solid product from the partially processed water;
(C) means for at least partially concentrating at least a portion of the partially processed water, so as to promote the formation of a precipitate and a mother liquor; and
(D) means for recovering the precipitate from the mother liquor, as a second product.

The water containing dissolved solids may be a saline impaired water. Where, in this specification, the term "saline impaired" water is used, it is to be understood as including within its scope any water of which the dissolved solids fall within the ranges of concentrations and ratio's of constituents as set out in Table 1. The term is not to be construed so as to be restricted to waters which have become impaired as a result of human activities, but is to include in its scope waters which naturally contain dissolved solids in the concentrations and ranges referred to in Table 1, as further exemplified below.

Where the water is a type 1 water, its TDS may be from 1 to 50 g/L, preferably from 1 to 40 g/L, more preferably from 1 to 30 g/L, even more preferably from 1 to 25 g/L, alternatively, from 1 to 20 g/L, 1 to 15 g/L, 1 to 10 g/L, 1 to 5 g/L, 2 to 50 g/L, 2 to 40 g/L, 2 to 30 g/L, 2 to 25 g/L, 2 to 20 g/L, 2 to 15 g/L, 2 to 10 g/L, 2 to 5 g/L, 3 to 50 g/L, 3 to 40 g/L, 3 to 30 g/L, 3 to 25 g/L, 3 to 20 g/L, 3 to 15 g/L, 3 to 10 g/L, 3 to 5 g/L, 4 to 50 g/L, 4 to 40 g/L, 4 to 30 g/L, 4 to 25 g/L, 4 to 20 g/L, 4 to 15 g/L, 4 to 10 g/L, 4 to 5 g/L, 5 to 50 g/L, 5 to 40 g/L, 5 to 30 g/L, 5 to 25 g/L, 5 to 20 g/L, 5 to 15 g/L, 5 to 10 g/L, 6 to 50 g/L, 6 to 40 g/L, 6 to 30 g/L, 6 to 25 g/L, 6 to 20 g/L, 6 to 15 g/L, 6 to 10 g/L, 7 to 50 g/L, 7 to 40 g/L, 7 to 30 g/L, 7 to 25 g/L, 7 to 20 g/L, 7 to 15 g/L, 7 to 10 g/L, 10 to 50 g/L, 10 to 40 g/L, 10 to 30 g/L, 10 to 25 g/L, 10 to 15 g/L, 15 to 20 g/L, 20 to 25 g/L, 25 to 30 g/L, 30 to 35 g/L, 35 to 40 g/L, 40 to 50 g/L, 50 to 60 g/L.

At higher concentrations of TDS within the range of 1 to 60 g/L, a type 1 water contains so much bicarbonate that it becomes unstable. These high concentrations of bicarbonate may be reached by subjecting water to a high partial pressure of carbon dioxide at a temperature low enough to permit dissolution of a sufficient amount of carbon dioxide in the water.

Where the water is a type 2 or a type 3 water, its TDS may be from 1 to 12 g/L, from 1 to 10 g/L, from 1 to 8 g/L, from 1 to 5 g/L, alternatively, from 2 to 12 g/L, 2 to 10 g/L, 2 to 8 g/L, 2 to 5 g/L, 3 to 12 g/L, 3 to 10 g/L, 3 to 8 g/L, 3 to 5 g/L, 4 to 15 g/L, 4 to 12 g/L, 4 to 10 g/L, 4 to 8 g/L, 4 to 5 g/L, 4 to 5 g/L, 5 to 15 g/L, 5 to 12 g/L, 5 to 10 g/L, 5 to 8 g/L, 6 to 15 g/L, 6 to 12 g/L, 6 to 10 g/L, 6 to 8 g/L, 7 to 15 g/L, 7 to 12 g/L, 7 to 10 g/L, 7 to 8 g/L, 10 to 15 g/L.

Where the water is a type 4 or a type 5 water, its TDS maybe from 15 to 50 g/L, from 15 to 40 g/L, from 15 to 30 g/L, from 15 to 25 g/L, alternatively, from 15 to 20 g/L, 20 to 50 g/L, 20 to 40 g/L, 20 to 30 g/L, 20 to 25 g/L, 30 to 50 g/L, 30 to 40 g/L, 40 to 50 g/L, 25 to 30 g/L.

Where the water is a type 6 or a type 7 water, its TDS may be more than 70 g/L, alternatively, more than 80 g/L, more than 90 g/L, more than 100 g/L, more than 120 g/L, more than 150 g/L, more than 180 g/L, more than 200 g/L, more than 230 g/L, more than 250 g/L, more than 300 g/L, more than 320 g/L, more than 350 g/L, more than 400 g/L, more than 500 g/L.

Where the water is a type 1 water, its $Cl^-/HCO_3^-$ ratio may be from 0.01 to 2.0, from 0.01 to 0.1, from 0.01 to 1.0, from 0.1 to 2.0, from 0.1 to 1.0, from 0.1 to 0.5, from 0.1 to 0.3, from 0.5 to 2.0, from 0.7 to 2.0, from 0.9 to 2.0, from 1.0 to 2.0, from 1.2 to 2.0, from 1.5 to 2.0, from 1.75 to 2.0, from 1.9 to 2.0, from 1.95 to 2.0 or from 1.99 to 2.0, alternatively from 0.1 to 1.5, from 0.5 to 1.5, from 0.75 to 1.5, from 1.0 to 1.5, from 1.2 to 1.5, from 1.3 to 1.5.

Where the water is a type 2 or a type 3 water, its $Cl^-/HCO_3^-$ ratio may be more than 2.0, more than 2.1, more than 2.2, more than 2.3, more than 2.4, more than 2.5, more than 3.0, more than 4.0, more than 5.0, alternatively more than 10.0, more than 15.0, more than 20.0, more than 30.0, more than 40.0 or more than 50.0.

Where the water is a type 4, 5, 6 or 7 water, its $Cl^-/HCO_3^-$ ratio may be more than 7, alternatively more than 10.0, more than 15.0, more than 20.0, more than 50.0, more than 70.0, more than 100.0, more than 150.0, more than 200.0, more than 300.0, more than 500.0, more than 800.0, more than 1000.0, more than 2000.0, more than 3000.0, more than 5000.0 or more than 10000.0.

Where the water is a type 1 or a type 2 water, its $Cl^-/2SO_4^{2-}$ ratio may be may be more than 5, alternatively more than 2.0, more than 5.0, more than 10.0, more than 15.0, more than 20.0 or more than 40.0, more than 50.0, more than 100.0, more than 200.0 or more than 500.0.

Where the water is a type 3 water, its $Cl^-/2SO_4^{2-}$ ratio maybe from 0.01 to 1, from 0.01 to 0.1, from 0.1 to 0.2, from 0.1 to 0.3, from 0.2 to 0.3, from 0.3 to 0.4, from 0.4 to 0.5, from 0.5 to 0.7, from 0.1 to 1.0, from 0.5 to 1.0, from 0.7 to 1.0, from 0.9 to 1.0, from 0.1 to 0.9, from 0.5 to 1.0, from 0.7 to 1.0, 0, from 0.3 to 1.0 or from 0.3 to 0.8, alternatively from 0.4 to 0.8, from 0.5 to 0.9.

Where the water is a type 4 water, its $Cl^-/2SO_4^{2-}$ ratio may be more than 7, more than 9, more than 10, more than 11, more than 12, more than 15, more than 20, more than 30, more than 50.

Where the water is a type 5 water, its $Cl^-/2SO_4^{2-}$ ratio may be less than 7, less than 6.0, less than 5.0, less than 4.0, less than 2.0 or less than 1.0.

Where the water is a type 6 water, its $Cl^-/2SO_4^{2-}$ ratio may be more than 9, more than 10, alternatively more than 11.0, more than 12.0, more than 15.0, more than 20.0 or more than 50.0.

Where the water is a type 7 water, its $Cl^-/2SO_4^{2-}$ ratio may less than 9, less than 8.0, less than 6.0, less than 5.0, alternatively less than 3.0, less than 1.0, less than 0.5 or less than 0.1.

The concentration step and/or the means for concentrating may comprise evaporation of water from the partially processed water, or another means of concentrating the partially processed water.

The precipitate, which is also referred to herein as the second product, may be in the form of crystals in a suspension of mother liquor. Alternatively or additionally, the precipitate may comprise an amorphous solid substance which may be powder.

In the event that the water is a type 1 water, the first product may be precipitated calcium carbonate (PCC). In the event that the water is a water of any one of types 2 to 7, the first product may be a gypsum-magnesium hydroxide mixture (GMH).

The water may be contacted with a predetermined amount of the first reagent. The pre determined amount may be a stoichiometric amount, required to achieve complete conversion of a species forming part of the dissolved solids in the feed water. Alternatively, the predetermined amount of the first reagent may be an amount required for the at least partial conversion of at least one species forming part of the dissolved solids in the feed water. As an example, predetermined amount of the first reagent may be sufficient to convert about 10 to 90% of the stoichiometric amount, alternatively about 40 to 60% of the stoichiometric amount, say conveniently about 50% of the stoichiometric amount of the one species forming part of the dissolved solids in the feed water.

Table 1 provides a listing of the key chemical characteristics of inorganic saline water types which the applicant has determined by experimentation as being suitable for treatment in accordance with the invention.

Saline impaired waters belonging to the water types listed in Table 1 are known in many parts of Australia and are also widely reported from other parts of the world. The known sources of such saline water include water from coal bearing aquifers, concentrates from desalination facilities, surface and sub-surface water of seawater type composition, produced water from coal bed and coal seam methane gas production, coal mining and coal washing operations, oil and gas production, mining and mineral processing, industrial activities, water and waste water treatment, coal power stations, saline ground water extraction, irrigation related drainage, saline water storage and dewatering schemes for the protection of properties and infrastructure.

Accordingly, the saline impaired waters listed in Table 1 may originate from both natural processes, resource utilisation and other human activities.

In addition to the above sources, concentrates from conventional reverse osmosis (RO) desalination processes or other desalination and water purification processes, having chemical characteristics similar to the waters listed in Table 1 may also be treated in the process and apparatus of the invention. Also, where the water to such RO processes, having chemical characteristics of the water types in Table 1, is desalinated to form a concentrate, this concentrate may also be treated in the process and apparatus of the invention.

For an initial period of about 30 minutes to about 60 minutes after the first reagent is contacted with the feed water, the reaction mixture may be agitated vigorously, whilst the temperature of the reaction mixture may be maintained in the range of from ambient to a maximum of 55° C. Thereafter, the reaction may be allowed to continue for another 30 minutes to about 60 minutes, under the same temperature conditions, but at moderate agitation conditions.

For waters belonging to Type 1, as an optional step (b)(i), the pH of the partially processed water obtained from step (b) may be lowered to a pH falling within the range of from 7 to 10, preferably to between 8 and 10, more preferably to between 8 and 9, by adding thereto a suitable pH adjustment agent. The pH adjustment agent may be a solution of a suitable strong mineral acid such as hydrochloric acid or sulphuric acid. Sulphuric acid is preferred because of its lower cost. Alternatively, the pH adjusting agent may be type 1 feedwater, a portion of which may be diverted around the reaction step (a) to the pH adjustment step (b)(i). The water thus produced from step (b)(i) is referred to below as pH adjusted water and may be further processed in steps (c) and (d) as mentioned above. Depending on the reagent used for pH adjustment, the pH may be lowered, and with the resultant formation of the second product as indicated below:

Partially processed water from type 1 using sulfuric acid for pH adjustment: from a pH of about 12 to a pH of about 8-9; Second product: sodium sulfate;

Partially processed water from type 1 water using hydrochloric acid for pH adjustment: from about a pH of 11 to 12 to a pH of about 8 to 9; Second product: sodium chloride; and Partially processed water from type 1 water using diverted feedwater: from a pH of about 11 to 12 to a pH of about 9 to 10; Second product: sodium carbonate.

In the event that the pH is not adjusted in step (b)(i), the second product may be the following:

Type 1 feedwater: sodium hydroxide;
Type 2 feedwater: sodium chloride; whilst calcium chloride may be recovered as a third product;
Type 3 feedwater: sodium sulphate; whilst sodium chloride may be recovered as a third product;
Type 4 feedwater: sodium chloride; whilst calcium chloride may be recovered as a third product;
Type 5 feedwater: sodium chloride;
Type 6 feedwater: sodium chloride; whilst sodium sulphate may be recovered as a third product;
Type 7 feedwater: sodium chloride.

The partially processed or pH adjusted water may optionally be concentrated by means of evaporation, which may be natural evaporation or enhanced evaporation. In the event of the latter, a thermo-mechanical concentrator may be used. Alternatively, the partially processed water from step (b) or pH adjusted water from step (b)(i) may be concentrated by means of a reverse osmosis or other suitable desalination process.

Steps (a) and (b) may conveniently be performed repeatedly on the partially processed or pH adjusted water, to produce other products or more of the first and second products.

For purposes of step (c), the partially processed water from step (b) or the pH adjusted water from step (b)(i) is preferably transferred to a separate pond, container or evaporator before being concentrated.

In order to avoid the formation of a precipitate, which may be in the form of crystals, in the evaporation pond, container or evaporator, the partially processed or pH adjusted water is preferably transferred to another pond, container or crystalliser before being concentrated even further, so as to promote the formation of the crystals where it is convenient to collect them. To enhance crystallisation, the concentrated solution is optionally cooled.

In step (d), the crystals are conveniently recovered as a slurry. They may be treated further by dewatering, optionally also by drying and such other steps as may be required. To improve the quality of the crystals, they may be redissolved and recrystallised several times.

The residual mother liquor may be disposed of as a product, or it may be recycled through the process with a portion removed from the circuit and evaporated to dryness thus avoiding build up of unwanted ions in the circuit. Alternatively, to obtain a reduction in volume, all of the residual mother liquor may be evaporated to total dryness and safely disposed.

The residual mother liquor (being normally only a small fraction of the volume of the feed) may be evaporated in a natural or solar evaporation pond or in an enhanced evaporation process, or by using a thermo-mechanical concentrator, or by a combination thereof.

In the description that follows, the chemical reactions of Table 2 are referred to.

TABLE 2

CHEMICAL REACTION EQUATIONS

| | |
|---|---|
| $NaHCO_3 + Ca(OH)_2 \rightarrow CaCO_3 + NaOH + H_2O$ | 1 |
| $CaCl_2 + Na_2CO_3 \rightarrow CaCO_3 + 2\,NaCl$ | 2 |
| $NaHCO_3 + NaOH \rightarrow Na_2CO_3 + H_2O$ | 3 |
| $2NaOH + H_2SO_4 \rightarrow Na_2SO_4 + 2H_2O$ | 4 |
| $Mg^{2+} + SO_4^{2-} + Ca(OH)_2 + 2H_2O \rightarrow Mg(OH)_2 + CaSO_4.2H_2O$ | 5 |
| Alternatively, | (5) |
| $(MgSO_4 + Ca(OH)_2 + 2H_2O \rightarrow Mg(OH)_2 + CaSO_4.2H_2O)$ | |
| $MgCl_2 + Ca(OH)_2 \rightarrow Mg(OH)_2 + CaCl_2$ | 6 |
| $NaOH + HCl \rightarrow NaCl + H2O$ | 7 |
| $2H_2O + SO_4^{2-} + CaCl_2 \rightarrow CaSO_4.2H_2O + 2Cl^-$ | 8 |
| $MgSO_4 + Na_2CO_3 \rightarrow MgCO_3 + Na_2SO_4$ | 9 |
| $MgCl_2 + Na_2CO_3 \rightarrow MgCO_3 + 2NaCl$ | 10 |
| $2NaHCO_3 + Ca(OH)_2 \rightarrow CaCO_3 + Na_2CO_3 + 2H_2O$ | 11 |
| $H_2SO_4 + Mg(OH)_2 \rightarrow MgSO_4 + 2H_2O$ | 12 |

ZLD Process for Co-Producing PCC and $Na_2CO_3$ from Water Type 1

In one embodiment, the process of the invention is operated as a ZLD process for co-producing precipitated calcium carbonate (PCC) and sodium carbonate ($Na_2CO_3$) from saline impaired waters of Type 1. In this embodiment, the water is reacted, in step (a), with milk of hydrated lime, having a solids content in the range of from 5 wt % to 20 wt %. This step is followed by the further steps of transferring the thin PCC slurry formed in the reaction vessel to a thickener for solid-liquid separation, i.e. in step (b). The thickened PCC slurry is then washed in an appropriate washing unit at a wash water to slurry volumetric ratio of between 3:1 and 5:1; before the washed PCC slurry is separated from the filtrate. The filtrate may be recycled to the raw water stream. Alternatively, it may be used for lime slaking. Optionally, a polymeric dispersing agent, such as a polycarboxylate dispersant, is added to the PCC for improving its stability during storage. The washed PCC slurry is optionally dried at a temperature between 75° C. and 220° C., using a suitable drying facility, to obtain a dry powdery PCC product.

The PCC that is recovered is calcitic and consists of euhedral to subhedral cubic particles with uniform particle size distribution, ranging between 0.2 microns and 2 microns in diameter, and, depending on the water and reagent quality, may have a purity of 98 wt % or more.

Type 1 water, used as feed water, may be added to the partially processed water from step (b) at a volumetric ratio of about 1:1 or as may be required, until the pH is lowered to around 9.6 but not exceeding 10. The partially processed, pH adjusted water is then transferred to an evaporation pond and concentrated by solar energy until a specific gravity (SG) of slightly above 1.20 (equating a salinity of slightly above 300 g/L TDS) is reached. The resultant brine may be transferred to a thermo-mechanical concentrator and subjected to further concentration to give an SG of up to 1.25 (equating a salinity of up to about 460 g/L TDS). The brine may then be transferred to a crystalliser to promote crystallisation at ambient temperature for 5 to 10 hours. The brine may be artificially cooled to improve the crystallisation process and reduce the crystallisation time and thus to improve production management and scheduling. The crystalline precipitate separated from the residual mother liquor may then be dewatered and the crystalline material may be dehydrated by artificial means at a temperature between 120° C. and 150° C., to recover anhydrous sodium carbonate crystals. The residual mother liquor may be transferred to an evaporation and crystallisation pond (or optionally to a thermo-mechanical concentrator) to reduce the volume of the residual liquor substantially or to reduce it to dry solids for disposal. Alternatively, the residual bittern may be recycled to the first evaporation pond to improve the product recovery, with a bleed of between 5 and 10% by volume evaporated to full dryness using a separate evaporation pond, thus avoiding build up of unwanted ions within the process.

ZLD Process for Co-Producing PCC, $Na_2SO_4$ and NaCl from Water Type 1

In another embodiment, the process may be operated as a ZLD process for co-producing precipitated calcium carbonate (PCC), anhydrous sodium sulphate ($Na_2SO_4$) and sodium chloride (NaCl) from saline impaired waters of Type 1. In this embodiment, concentrated sulphuric acid of a commercially available grade may be added to partially processed water from step (b), in a sufficient amount to decrease the pH of the reduced water from step (b) to between 7 and 9, preferably to about 8. Thereafter, the water may be transferred to an evaporation pond to concentrate it by solar evaporation until the sulfate content reaches a minimum of about 60 g/L, which usually corresponds to a TDS of around 200 g/L. The resultant brine may optionally be artificially cooled to between 0° C. and minus 10° C. or naturally in winter months to below minus 5° C., to promote crystallisation, whereafter the crystal slurry may be dewatered to separate the crystalline material from the mother liquor. The crystalline material may be dehydrated and dried using an appropriate drying device, to produce anhydrous sodium sulphate. The resultant brine from the dewatering step may be further concentrated, optionally by evaporative concentration in a solar pond, until its SG is slightly over 1.20, before the resultant brine is conveniently shifted to a shallow crystallisation pond to allow the formation of sodium chloride crystals. The sodium chloride salt may be separated from the residual bittern by means of a conventional salt harvesting method. The residual bittern may be recycled to the primary evaporative concentration pond, and a small proportion (preferably between 5 and 10% by volume) may be bled from the recycle and evaporated to dryness in pond or a thermal-evaporator, to avoid build up of undesirable ions within the process.

Production of PCC and NaCl from Water Type 1 in a ZLD Process

In another embodiment, the process may be operated as a ZLD process for co-producing precipitated calcium carbonate (PCC) and sodium chloride (NaCl) from saline impaired waters of Type 1. In this embodiment, concentrated hydrochloric acid may be added to partially processed water from step (b), in a sufficient amount to decrease the pH of the reduced water from step (b) to between 7 and 9, preferably to about 8. The chemical reaction taking place in this step is reaction [7]. Thereafter, the water may be transferred to an evaporation pond to concentrate it by evaporative concentration, until its SG is slightly over 1.20, before the resultant brine is conveniently shifted to a shallow crystallisation pond to allow the formation of sodium chloride crystals. The sodium chloride salt may be separated from the residual mother liquor by means of a conventional salt harvesting method. The residual mother liquor may be recycled to the primary evaporative concentration pond, and a small proportion (between 5 and 10% by volume), may be bled from the recycle and evaporated to dryness in a pond or a thermal evaporator, to control accumulation of unwanted species in the process.

ZLD Process for the Production of PCC and NaOH

In another embodiment, the process of the invention may be operated as a ZLD process for co-producing precipitated calcium carbonate (PCC) and anhydrous sodium hydroxide (NaOH) from saline impaired waters of Type 1. In this embodiment, the partially processed water from step (b) is transferred to an evaporation pond and concentrated by solar evaporation to a concentration not exceeding 400 g/L TDS, which corresponds to an SG of about 1.24 whereupon the concentrated liquor is transferred to a crystalliser for crystallisation. Optionally, the advanced stages of evaporation are controlled by using a thermo-mechanical concentrator to achieve the target concentration for promoting crystallisation and improving operational efficiency. The crystals that are formed may be recovered and dewatered to yield hydrous sodium hydroxide crystals. These crystals may be dehydrated in a drier at a temperature between 150° C. and 200° C. to form a stable product. The residual mother liquor may be recycled to the evaporation pond, and a small proportion (between 5 to 10% by volume) may be bled from the recycle and evaporated to dryness in a further pond or in a thermal evaporator to control accumulation of unwanted species in the process.

As an alternative, liquid sodium hydroxide may be produced from the concentrated solution produced in step (c). The concentrated solution may be transferred to a deep lined pond or a tank for storage and aging, which allows for crystallisation and settlement of a minor quantity of sodium chloride salt at the bottom of the pond or tank, causing maturation of the solution. The concentrated solution may be sold as a liquid sodium hydroxide product for use in waste water treatment.

As a further alternative, both anhydrous and liquid sodium hydroxide may be recovered as co-products.

PCC Production Using Seeding Method

In a further embodiment of the process according to the invention, PCC is recovered, in two subsequent reaction steps, from saline impaired waters belonging to water Type 1. In this embodiment, the water is reacted in step (a) of the process with a milk of hydrated lime having a solids content in the range of from 5 wt % to 20 wt %, added at a rate to convert 45-50% of the stoichiometric amount of the dissolved bicarbonate ions to insoluble calcium carbonate as shown by reaction [11]. The reaction is allowed to proceed for about 30 minutes under high agitation conditions. The thin slurry thus formed provides seed crystals for a secondary reaction according to reaction [2] whereby the thin slurry is reacted in a secondary reactor with a solution of calcium chloride at a concentration between 15 wt % and 40 wt %, added at a pre-determined rate to convert 100% of the stoichiometric amount of dissolved carbonate ions to insoluble calcium carbonate. This reaction is allowed to proceed for about 60 minutes under high agitation conditions. The thin slurry formed by the two subsequent reactions is transferred from the secondary reactor to a thickener for solid-liquid separation. The thickened slurry is then washed in a suitable washing unit at a wash water to slurry volumetric ratio of between 3:1 and about 5:1. The washed PCC slurry is separated from the filtrate. The filtrate is recycled to the raw water stream. Alternatively, it is used for lime slaking. The PCC product is optionally dried. The partially processed water from the thickening step is transferred to an evaporation pond in order to concentrate it by evaporative concentration, until the SG of solution reaches slightly above 1.20, thereafter the resultant brine is shifted to a shallow crystallisation pond to allow the formation of sodium chloride crystals. The sodium chloride salt is separated from the residual mother liquor by means of a conventional salt harvesting method. The residual mother liquor may be recycled to the primary evaporative concentration pond, and a minor portion thereof (conveniently between about 5% and about 10% by volume) may be bled from the recycle and evaporated, conveniently to total dryness in a pond or a thermal-evaporator to control accumulation of unwanted species in the process.

The PCC product according to this method is the result of rapid nucleation of minute PCC crystals and crystallites due to a solid-liquid reaction according to reaction [11] which is then followed by reaction [2]. These minute crystals and crystallites formed in reaction [11] serve as nuclei (seeds) for the secondary formation of calcium carbonate in a lower pH reaction medium according to reaction [2]. An advantage of this method is that any un-reacted lime particles from the first reaction become coated by PCC, thus causing the lowering of the product pH, because the PCC coating prevents continuous dissolution of the lime particles and hence the lowering of the pH of the reaction mixture. The resulting PCC product has desirable features for use as a filler in several applications.

The calcitic PCC product from this process comprises discrete euhedral rhombohedral to cubic particles with highly uniform particle size distribution within a narrow range of about 1 micron to about 2 microns, averaging about 1.5 microns. Depending on the water quality, the PCC may have a purity of about 98 wt % or more. The pH of a slurry made by saturating the product PCC in distilled water is between about 9 and about 10.5. These features are considered particularly suitable for use of this PCC product in the manufacture of high grade paper, as well as in the manufacture of plastics, paint and ink.

Compared to PCC produced from a single complete reaction with hydrated lime such as in reaction [1], a distinct advantage of PCC made according to this embodiment is the effective coating of unreacted lime particles with calcium carbonate precipitated thereon, yielding a fine grain PCC product characterised by a low saturated slurry pH, thus making it a particularly suitable product for some applications.

Two Step PCC Production

In another embodiment of the invention, PCC is produced from saline impaired waters belonging to water Type 1. In this embodiment, the water is reacted, in step (a) with a milk of hydrated lime having a solids content in the range of from 5 wt % to 20 wt %, added at a rate to convert 45-50 t % of the stoichiometric amount of the dissolved bicarbonate ions to insoluble calcium carbonate according to reaction [11]. The reaction is allowed to proceed for about 60 minutes under high agitation conditions. Step (a) is followed by the further step of transferring the thin slurry formed in the reaction vessel to a thickener for solid-liquid separation. The thickened slurry is optionally washed in a suitable washing step at a wash water to slurry volumetric ratio between about 3:1 and about 5:1. The washed PCC slurry is separated from the filtrate. The filtrate is recycled to the raw water stream or is used for lime slaking. The PCC product is optionally dried. The partially processed water from step (b) is then further reacted with a solution of calcium chloride, at a concentration between 15 wt % and 40 wt %, added at a predetermined rate to convert 100% of the stoichiometric amount of dissolved carbonate ions to insoluble calcium carbonate according to reaction [2]. The thin slurry thus formed is then transferred to a thickener for solid-liquid separation. The thickened slurry may be washed in a washing step at a wash water to slurry volumetric ratio of between about 3:1 and about 5:1. The washed PCC slurry is then separated from the filtrate. The filtrate may be recycled to the raw water stream and/or may be used for reagent preparation. The PCC product may optionally be dried. Thereafter, the partially processed water from the second thickener may be transferred to an evaporation pond to concentrate it by evaporative concentration, until its SG is slightly over 1.20, before the resultant brine is conveniently shifted to a shallow crystallisation pond to allow the formation of sodium chloride crystals. The sodium chloride salt may be separated from the residual mother liquor by means of a conventional salt harvesting method. The residual mother liquor may be recycled to the primary evaporative concentration pond, and a small proportion (between 5 and 10% by volume) may be bled from the recycle and evaporated to dryness in pond or a thermal-evaporator to control accumulation of unwanted species in the system.

The key advantage of this two step process is that two distinct PCC products with different physical and chemical features (e.g., particle size, morphological features and pH of saturated slurry), are produced, so as to be able to satisfy diverse product specifications for various PCC markets in a single integrated plant. In this embodiment of the invention, there is first produced a calcitic PCC, having a chemical composition and physical features similar to PCC from a single step reaction of water reacted with milk of hydrated lime. Thereafter, another calcitic PCC is produced, which is characterised by blocky, euhedral crystals, often forming agglomerates of intergrown crystals and crystal assemblages of cubic and rhombohedral form, with variable particle size distribution between about 4 and about 10 microns. Depending on the water quality, it may have a purity of 98 wt % or even more. These features make the PCC suitable for use in a variety of applications.

ZLD Process for the Production of GMH, MH, NaCl and $CaCl_2$

In another embodiment, the process of the invention is operated as a ZLD process for co-producing gypsum-magnesium hydroxide (GMH), magnesium hydroxide [$Mg(OH)_2$] (or MH), sodium chloride (NaCl) and calcium chloride solution ($CaCl_2$). This may be done by contacting water selected from types 2, 4, 5, 6 or 7 with milk of hydrated lime having a solids content between about 5 wt % and about 20 wt %. The lime may be dosed at a stoichiometrically calculated dosing rate according to reaction [5], for substantially complete removal of the $SO_4^{2-}$ content of the feed. The reaction may be allowed to proceed in a first stage reactor, for about 30 minutes, under high agitation conditions, whilst maintaining the pH of the reaction mixture between pH 8 and pH 10.5 and the reaction temperature in the range between ambient and about 55° C. This step is referred to below as the desulphation step. Thereafter, the resultant thin slurry (or precipitate) from the first stage reactor may be separated in a thickener and then optionally washed and dried to yield a gypsum-magnesium hydroxide product which may have a composition comprised of 60-70 wt % gypsum ($CaSO_4.2H_2O$) and 30-40 wt % $Mg(OH)_2$ on a dry weight basis. The product comprises particles ranging in size from about 1 micron to about 30 microns. This product is suitable for application as a soil conditioner, particularly for amelioration of sodic soils in salinity impacted areas.

The partially processed water from the thickener, may be stored in a holding pond for about 5 to 7 days to cause maturation by way of gypsum precipitation and reduction of the sulphate ion concentration to less than 5 g/L.

Thereafter, the matured water may be reacted, in a second stage reactor, with a milk of hydrated lime made to between 5 wt % and 20 wt % of solids content, at a dose equating 100% of the stoichiometric amount for magnesium conversion, according to reactions [6]. The reaction is allowed to proceed, preferably under strong agitation conditions, for about 60 minutes whilst the pH of the solution is maintained between 10 and 10.5. Thereafter, the resultant slurry may be thickened using a thickener. The thickened slurry may be washed, conveniently in a multiple stage counter current washing unit, before it is dewatered and dried to obtain a commercial grade magnesium hydroxide product.

The partially processed water from the thickener may be placed in a solar pond to allow further evaporative concentration to take place, until the SG of the solution is slightly more than 1.20, so as to form a brine. The brine may be transferred to a shallow crystalliser pond to promote the formation of sodium chloride crystals. The sodium chloride crystals may be separated from the residual mother liquor by means of a conventional salt harvesting method.

The residual mother liquor may be transferred to a deep pond to allow further crystallisation of sodium chloride to take place, and settlement of the sodium chloride salt at the bottom of the pond.

The remaining liquor is a concentrated calcium chloride solution, having a concentration of between 30 wt % and 40 wt %. It is suitable as a saleable product.

Improvement of GMH

The gypsum-magnesium hydroxide (GMH) product produced in the embodiment described above may be subjected to further treatment for use in the manufacture of lightweight solid moulded articles and improved soil conditioners. The further treatment may include washing and dewatering before the GMH is reacted with sulphuric acid. The amount of sulphuric acid added may be sufficient to react with about 5-50% of the stoichiometric amount of the magnesium hydroxide present in the GMH. The reacted GMH, which now contains an amount of magnesium sulphate ($MgSO_4$) in hydrated form, may be dried at 120-300° C. and then ground to provide a dry powder. At this stage the product may be used as an improved soil conditioner for slow release of magnesium, calcium and sulfate ions. This is particularly effective in the amelioration of sodic soils. Alternatively, the dried/ground powder may be mixed with magnesium oxide (MgO) and optionally also with fibres which may be natural fibres such as straw or sawdust or synthetic fibres such as glass fibre or polymeric fibres to give physical strength to the mouldings. A predetermined amount of water is added during mixing to form a paste. The amount of water added may be less if the fibres contain inherent moisture. The paste thus formed may be used in a variety of applications, particularly to produce strong, hard setting moulded products including building articles. Where the improved GMH is to be used to produce moulded products, the temperature in the drying stage of the reacted GMH material, prior to admixing thereof with MgO, is preferably in the range of 200 to 300° C. Optionally, the need for magnesium oxide (MgO) addition may be obviated by calcining a portion of the raw unreacted GMH at a temperature between 650° C. and 750° C. to produce a mixture of magnesia (MgO) and anhydrite ($CaSO4$). This mixture may be used instead of magnesium oxide from an external supply. The products made from this improved GMH material exhibit characteristics including fire resistance, noise suppression and are light weight. These characteristics are advantageous for use of the improved GMH material as a building material.

In addition, it can be later disposed of by crushing it and placing it in soil as a slow release soil additive.

Alternative to Desulphation in Production of MH, NaCl and $CaCl_2$

As an alternative to the desulphation step in the production of magnesium hydroxide described above, for waters belonging to types 2, 4, 5, 6 and 7, the process may include a step of controlling the reaction conditions during reaction in step (a) to ensure that they are unfavourable for the formation of calcium sulphate.

To this end, it has been found that if the weighted average sulphate ion concentration of the water and the hydrated lime fed to the reactor are less than about 3.5 g/L, more preferably below about 3 g/L, even more preferably, below about 2.5 g/L, yields a magnesium hydroxide product having a low gypsum concentration. Where the water has a sulphate ion concentration exceeding 3.5 g/L, the weighted average sulphate ion concentration may be controlled so as to be less than 3.5 g/L, alternatively less than 3.4 g/L, alternatively less than 3.3 g/L, alternatively less than 3.2 g/L, alternatively less than 3.1 g/L, alternatively less than 3.0 g/L, alternatively less than 2.9 g/L, alternatively less than 2.8 g/L, alternatively less than 2.7 g/L, alternatively less than 2.6 g/L, alternatively less than 2.5 g/L, alternatively within the range of 2.0 g/L and 3.5 g/L, or 2.0 g/L to 3 g/L, or 2.0 g/L to 2.9 g/L, or 2.0 g/L to 2.8 g/L, or 2.0 g/L to 2.7 g/L, or 2.0 g/L to 2.6 g/L, or 2.0 g/L to 2.5 g/L, or 2.0 g/L to 2.4 g/L, or 2.0 g/L to 2.3 g/L, or 2.0 g/L to 2.2 g/L, or 2.5 g/L to 3.5 g/L, or 2.5 g/L to 3 g/L, or 2.5 g/L to 2.9 g/L, or 2.5 g/L to 2.8 g/L, or 2.5 g/L to 2.7 g/L.

The weighted average sulphate ion concentration may be calculated by dividing the sum of the mass of the sulphate ions in the water and the milk of hydrated lime fed to the reactor or contacted with each other in the contacting step (a), with the combined volumes of the water and the hydrated lime.

A weighted average sulphate ion concentration in the water and the hydrated lime which is at or below 3 g/L, is considered to be adequate to avoid the presence of more than about 2.5 wt % gypsum mineral with the washed magnesium hydroxide. The reactions between water and hydrated lime slurry are according to reactions [5] and [6], with the reaction [6] being the preferred reaction. The objective is to achieve substantially complete conversion of the magnesium ions to magnesium hydroxide. For this alternative embodiment, a lime reagent with a substantially lower solids content than those used in other embodiments of the invention, is used. Thus, the solids content is preferably in the range from about 1 wt % to about 5 wt %, typically about 3 wt %. This allows the reaction [6] in step (a) to proceed largely independently of the degree of saturation of the reaction medium with respect to gypsum mineral. The reaction is preferably allowed to proceed under strong agitation conditions, for about 60 minutes, whilst the pH of the solution is maintained between about 10 and about 10.5. The resultant precipitate, which is recovered as a slurry, contains mainly magnesium hydroxide with a small amount of gypsum being present as an impurity. The slurry may optionally be thickened using a conventional thickener. The thin or thickened slurry is then washed thoroughly in a multiple stage counter current washing unit, to reduce the content of fine grain, unstable, hemi-pyramidal, gypsum crystals and crystallites which may have co-precipitated with magnesium hydroxide, by dissolution thereof in the wash water. The washed slurry may then be dewatered and dried to obtain a commercial grade magnesium hydroxide product.

The partially processed water from the thickening step (b) may be placed in a solar pond to allow evaporative concentration to take place, until the SG of the solution is slightly more than 1.20 so as to form a brine. The brine may be transferred to a shallow crystalliser pond to promote the formation of sodium chloride crystals. The sodium chloride crystals may be separated from the residual mother liquor by means of a conventional salt harvesting method.

The residual mother liquor may be transferred to a deep pond to allow further crystallisation to take place, and to cause settlement of the sodium chloride salt at the bottom of the pond.

The remaining liquor is a concentrated calcium chloride solution, having a concentration of between 30 wt % and 40 wt %. It is suitable as a saleable product, particularly for dust suppression and a calcium ion additive to lawns in the turf industry.

ZLD Process for Co-Producing GMH, PCC, $Na_2SO_4$ and NaCl, Type 3 Water

In another embodiment, the process of the invention is operated as a ZLD process for co-producing gypsum-magnesium hydroxide (GMH), precipitated calcium carbonate (PCC), anhydrous sodium sulphate ($Na_2SO_4$) and sodium chloride (NaCl) from saline impaired waters of Type 3. In this embodiment, the water is contacted, in a first reaction stage, for about 30 to about 60 minutes but preferably about 40 minutes, with a pre determined amount of milk of hydrated lime having a solids content of about 5 wt % to about 20 wt %, sufficient to achieve substantially complete removal of magnesium ions from the feed water. The reaction is allowed to proceed according to reaction [5], under low to moderate agitation conditions, whilst the pH of the reaction mixture is maintained between 9 and 11 by controlling the rate of line addition. The temperature of the reaction mixture is maintained between ambient temperature and 55° C. Thereafter, the thin slurry resulting from the reaction mixture is transferred to a thickener for solid-liquid separation. The thickened slurry is optionally washed in a washing step at a suitable wash water to slurry volumetric ratio, to obtain a gypsum-magnesium hydroxide slurry product.

The partially processed water recovered from the thickener is transferred to a reaction vessel where it is reacted with a 25 wt % to 40 wt % solution of sodium carbonate, which is added to the reduced water at a rate or in a total amount necessary for substantially complete removal of calcium ions in the partially processed water, according to reaction [2]. The partially processed water and the solution of sodium carbonate are allowed to react for about 60 minutes under high agitation conditions. Thereafter, the resulting thin slurry containing PCC is transferred to a thickener for solid-liquid separation, before the thickened slurry is washed in a suitable washing step at a wash water to slurry volumetric ratio of between 3:1 and 5:1. The washed slurry is dewatered, optionally by filtration, to separate the PCC from the wash water. The filtrate may be recycled to the raw feed or alternatively it may be used for reagent dilution.

The PCC slurry may be dried at a temperature between about 75° C. and about 220° C., using a suitable drying device to obtain a dry powdery PCC product.

The partially processed water may be subjected to further concentration via membrane based or other suitable desalination processes, which also generates a fresh water stream.

The partially processed water or concentrate is transferred to an evaporation pond and concentrated by solar evaporation until sulphate saturation is reached at around 60 g/L, which usually equates to a specific gravity (SG) of slightly above 1.21 and a salinity value of about 330 g/L TDS.

The resultant concentrated solution may be further treated for the recovery of sodium sulphate and sodium chloride salts, in accordance with the embodiment described above for the production of PCC, sodium sulfate and sodium chloride for Type 1 waters.

ZLD Process for Co-Producing GMH, MCL, NaCl and $Na_2SO_4$, Type 4 or 6 Water

In another embodiment, the process of the invention is operated as a process for co-producing gypsum-magnesium hydroxide (GMH), magnesium carbonate light (MCL)[X.Mg $MgCO_3$.Y. $Mg(OH)_2$.Z.$H_2O$], sodium chloride (NaCl) and sodium sulphate ($Na_2SO_4$) from saline impaired waters of Type 4 or 6. In this embodiment, the water is contacted, in step (a), reacting the water with milk of hydrated lime having a solids content between about 5 wt % and about 20 wt %. The milk of hydrated lime is dosed at a dosing rate calculated according to equation [5], for removal of up to 10% of the stoichiometric amount of the $SO_4$ content of the feed and reacted, in a first stage reaction, for about 30 minutes under high agitation conditions, whilst maintaining the pH of the reaction mixture below pH 10, preferably between 8 and 9, and the temperature in the range between ambient and about 55° C. Thereafter, the resultant thin slurry from the first stage reactor is separated in a thickener or settled in a pond. The precipitate may optionally be washed before drying it to yield a gypsum-magnesium hydroxide product which is suitable for application as a soil conditioner, particularly for the remediation of sodic soils in salinity impacted areas.

The partially processed water from the thickener is contacted, in a second stage reactor, with a 25 wt % to 40 wt % sodium carbonate solution, in a predetermined amount or rate, to achieve substantially complete removal of magnesium ions. The second stage reaction is allowed to proceed for a period of about 60 to about 80 minutes, under high agitation conditions, and with the temperature maintained between about 40° C. and about 50° C. After the second stage reaction, the thin slurry thus formed is transferred to a thickener for solid-liquid separation. The thickened slurry recovered from the thickener is optionally washed in a suitable washing means, at a wash water to slurry volumetric ratio of between about 3:1 and about 5:1, whereafter it is dewatered and dried to obtain a magnesium carbonate light (MCL) product. The MCL product is characterised by having an MgO equivalent of over 40 wt % and features comparable to magnesium carbonate light products available in the market.

The partially processed water from the second thickening and separation step is transferred to an evaporation pond and concentrated by solar evaporation until a specific gravity (SG) of slightly above 1.20 is obtained. The resultant brine is transferred to a shallow crystalliser pond to allow the formation of sodium chloride crystals. The sodium chloride crystals are recovered by means of a conventional salt harvesting method which leaves a residual mother liquor having a sulphate ion content of a minimum of 60 g/L.

The residual mother liquor may be artificially cooled in a conventional cooling facility to between zero and minus 10° C., to promote crystallisation. The solution is optionally dewatered to separate the crystals from the mother liquor, whereafter the crystals may be dehydrated and dried using an appropriate drying unit, such as a hot air blower or a rotary drier, to produce anhydrous sodium sulphate.

A major proportion of the mother liquor from the dewatering step may be recycled back to the evaporation pond for improving the sodium chloride and sodium sulphate yield. A minor portion of the mother liquor may be concentrated by further evaporative concentration, in a solar pond, or by using a thermo-mechanical concentrator, to total dryness, for disposal as a solid residue.

MCL Mining Process Water

In yet a further embodiment, the process is operated to extract MCL from a partially processed water. In this way, a water for mineral processing operations requiring a low Mg content and a high pH, including Carbon-In-Leach (CIL) processes, may be prepared. This partially processed water has the advantage over high magnesium content water in that it has been stripped of magnesium and requires less lime (or sodium hydroxide) to raise the pH of such water to over 10, in order for such water to be suitable for mineral processes such as cyanide based leaching processes. A second advantage is that, since less lime is used to raise the pH, the amount of calcium ions in the high pH process water is also reduced, thereby avoiding or reducing gypsum formation within the process plant, leading to a significant reduction in operating costs. An indirect but related advantage is the reduction in the risk of cyanide break out.

The reduction in the formation of gypsum on plant equipment may also be accompanied by a reduction in gypsum formation on ore particles, thus providing a greater surface area for cyanide ions to dissolve gold. This may result in the more efficient use of cyanide and a reduction in the retention time of ore slurry within the leaching plant.

Reverse Osmosis Linkage

For waters belonging to Type 1, the pH of the partially processed water from step (a) may be adjusted by adding Reverse Osmosis (RO) concentrate of Type 1 waters in an amount sufficient to reduce the pH of the partially processed water to around 9.6-10. In this way, the need for acid (which is expensive) may be overcome or at least substantially reduced. RO concentrate is also a safer alternative than acid. Alternatively, raw Type 1 water or a mixture of raw water and a side stream of RO concentrate may be used to reduce the pH of the partially processed water to within the pH range as aforementioned.

Reduction of Carbon Dioxide Emissions

The invention further provides a method of reducing carbon dioxide gas emissions from saline impaired waters belonging to Type 1, or from RO concentrate obtained when Type 1 water is processed in an RO plant. Part of the dissolved bicarbonate ions in the water is recovered in the form of a useable precipitated calcium carbonate (PCC) product.

Anhydrous sodium carbonate ($Na_2CO_3$) may be recovered from partially processed water, using a pH adjustment method as hereinabove described, which method avoids the loss of carbon dioxide gas to the atmosphere by converting the bulk of the dissolved bicarbonate ion content of the Type 1 water to a sodium carbonate product.

Removal of Silica and Metal Ions

In a further embodiment, the process may be operated as a process for the removal of dissolved silica and ions of iron, manganese, arsenic and nickel, from a saline impaired water, by desulphation of the feedwater, using hydrated lime as a reagent, to form GMH. These aforementioned contaminants co-precipitate with GMH or are absorbed on the surface of GMH particles. This method reduces the concentration of such elements in the secondary magnesium hydroxide product, which is advantageous for broader commercial use of such magnesium hydroxide.

RO Concentrate as Feedwater

The water to the process described by this invention may be concentrated in a desalination process such as a Reverse Osmosis process, where the feed to the RO unit is water of Types 1 to 5. Generally, water types 6 and 7 are too highly saline for use in reverse osmosis desalination.

Mid Process RO

The partially processed water from step (b) for water of Types 1 to 5 may be aged in a tank or a pond to allow residual particles to settle and the pH of the partially processed water to be normalised by aeration. Provided the pH and chemical composition of the partially processed water is suitable, it may then be further treated in an RO system for concentration of the solids dissolved therein and for the recovery of water of improved quality.

RO Feed Pretreatment

In a further embodiment of the invention, water to be processed in an RO plant is pretreated to recover useful products therefrom and/or to reduce the concentration of potential foulant ions.

Magnesium hydroxide recovered from the process may be used in conjunction with conventional water conditioning and softening chemicals to pre-condition water to a primary RO plant, in order to reduce the concentration of foulants in the RO feed water, in particular suspended solids, hardness, bicarbonate, silica, arsenic, iron, barium, strontium and nickel.

The magnesium hydroxide may be added to the RO process water as a thin slurry. The reaction mixture may be agitated for up to 20 min before the resultant product slurry is concentrated in a thickener and further processed to produce one or more products. The conditioned water may then be aged for up to two days to allow any residual solid particles to settle. The clarified water is then fed to an RO system to produce fresh water and a concentrate stream which may be processed to ZLD in the embodiments of the invention.

RO Recycle with Foulant Removal

A first portion of an RO concentrate may be treated, in a reaction vessel, by reaction with an appropriate reagent such as calcium chloride, sodium carbonate, calcium hydroxide, calcium oxide, magnesium hydroxide or a combination thereof. The precipitate containing the foulants may be separated from the reduced concentrate, using a thickener, and the separated precipitate may be treated further to form a product.

The treated concentrate portion may then be transferred to a suitable tank or pond to allow any residual particles to precipitate and settle. The clarified, treated concentrate may be mixed with raw water to the RO system, thus forming a recycle, to improve the recovery of fresh water from the system and to reduce the final volume of concentrate. An advantage of this method is that a higher recycle percentage of concentrate may be achieved, compared to other concentrate recycling methods due to the removal of foulants from the recycle loop.

A second or a bleed portion of the RO concentrate may be treated by one of the embodiments of the invention described herein to achieve ZLD and to produce several useful products.

Nodal Operation

Permeate for use as fresh or irrigation water may be produced by RO desalination at several remote sites or nodes and the associated RO concentrate may either be piped to a central location for treatment in any of the embodiments of the invention, or for storage in a local pond, where it may be later treated using a process in accordance with the invention.

Recycle of Filtrates and or Bitterns

The residual filtrates and bitterns may conveniently be recycled through the process to increase product recovery and to achieve ZLD.

Advantages

The invention offers the following advantages:

The invention optionally provides a ZLD process for treatment of saline impaired waters having wide ranging chemical compositions.

The invention provides a process by which the dissolved solids in saline impaired water may be recovered so as to offset the cost of achieving a ZLD objective.

The invention provides several alternative methods for improving the operational and cost efficiency of desalination processes.

The invention provides process options for the up-front removal of contaminants in RO feed, thus increasing the options for direct disposal of the concentrate where possible (by storage, discharge, re-injection, sewers, etc.).

The invention provides process options for RO unit feed pre-treatment allowing higher water recovery rates from RO desalination processes.

The invention provides process options for reducing the volume and salt load of RO concentrate so as to reduce ZLD costs (e.g., reduce thermal equipment size).

BRIEF DESCRIPTION OF THE DRAWINGS

Preferred forms of the invention will now be described by way of example with reference to the accompanying drawings, wherein.

DETAILED DESCRIPTION OF THE PREFERRED EMBODIMENTS

Figure 1:
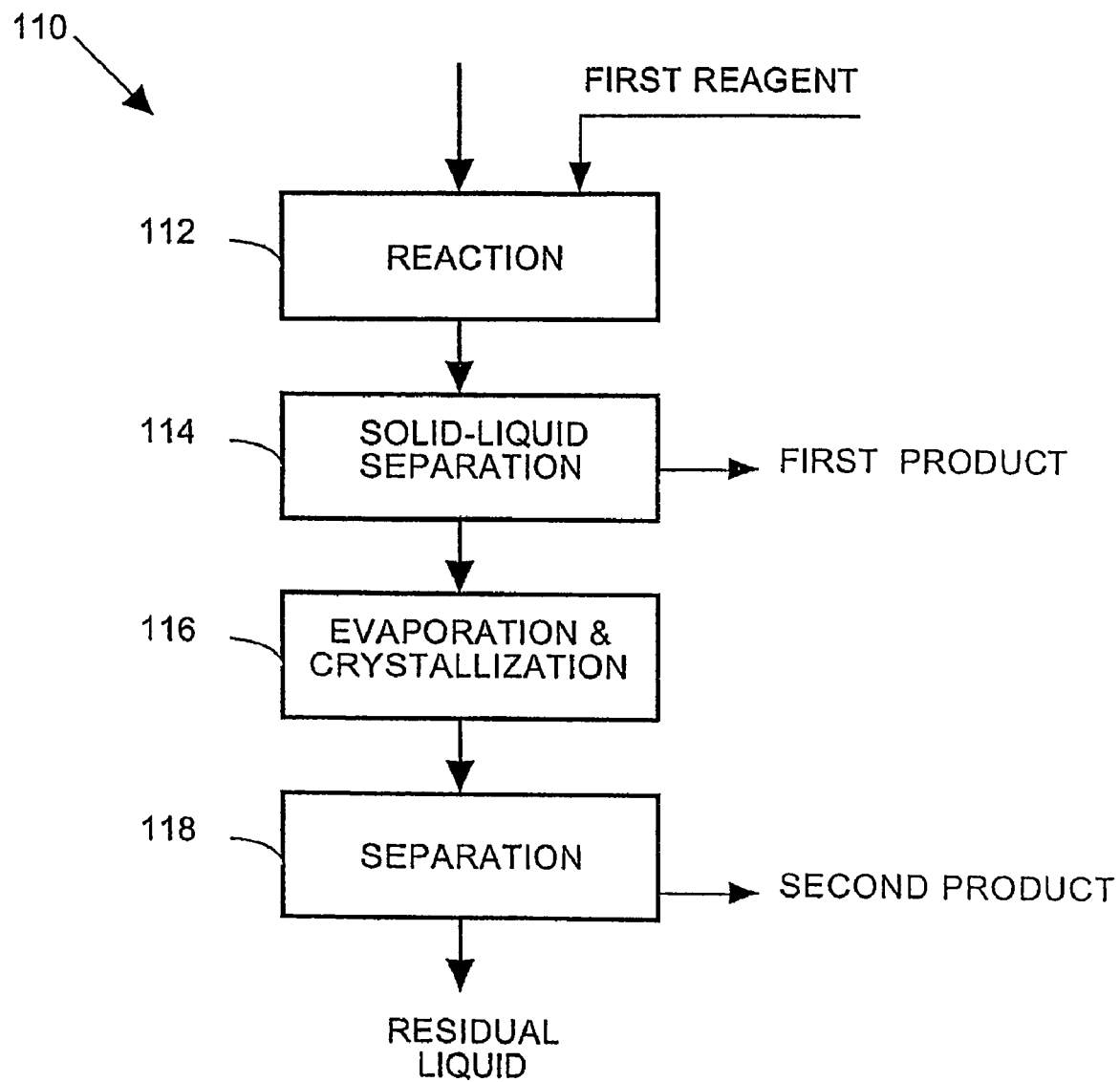
FIG. 1 is a schematic block flow diagram showing one embodiment of a process according to the invention for the comprehensive treatment of saline impaired water of types 1 to 7 listed in Table 1.

Referring to FIG. 1, there is shown a schematic block flow diagram showing an apparatus 110 for conducting a process according to the invention, for the treatment of saline impaired water.

A saline water belonging to any one of types 1 to 7 as listed in Table 1, is fed to a reaction vessel 112 and reacted with milk of hydrated lime to cause the formation of a first product.

In the event that the water is a type 1 water, the first product is precipitated calcium carbonate (PCC) according to reaction [1] or reaction [11]. In the event that the water is a water of types 2, 3, 4, 5, 6 or 7, the first product is GMH which is formed in accordance with reaction [5].

The temperature in the reaction vessel is preferably controlled in the range of between ambient and 55° C.

Figure 13:
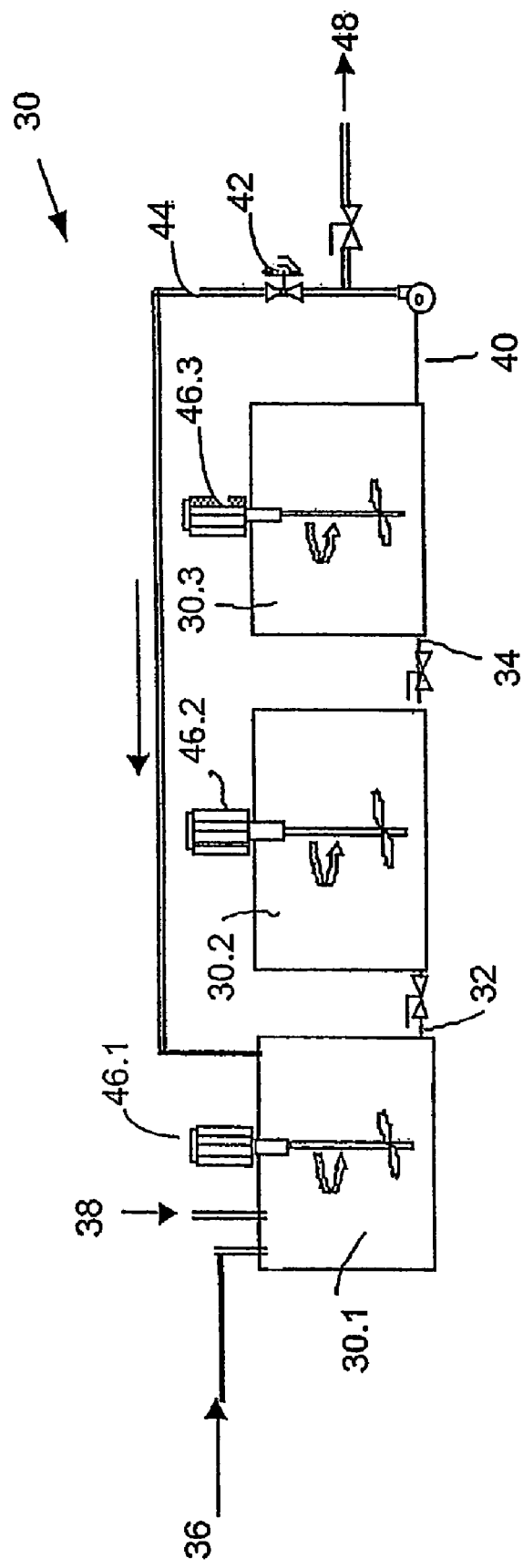
FIG. 13 shows, in diagrammatic form, a reactor train of up to three continuously stirred reactors for contacting water with the first reagent.

As is shown in FIG. 1, a single mixed reactor may be used as the reaction vessel 112. However, the reaction vessel 112 may include up to three mixed reactors in series and with sizes chosen to give a total residence time of no less than one hour as is shown in FIG. 13.

Following reaction, the contents of the reaction vessel 112 are transferred to a solid-liquid separation vessel 114, such as a thickener, for separating the slurry. The solid-liquid separation vessel 114 may be in the form of a thickener as described with reference to FIG. 15.

The slurry may optionally be washed in an appropriate washing means, before it is dewatered and the thickened slurry is optionally dried to produce a saleable dry product (The washing, dewatering and drying means are not shown in FIG. 1, but are described below in relation to FIGS. 2 to 6, 8, 10 and 11).

In the event that a type 1 water is being treated, the lime slurry dose is pre-determined depending on the particular embodiment of the invention, to react at least a portion of the bicarbonate ions in the water solution according to reaction [1] or reaction [11], as may be applicable, to form calcium carbonate which precipitates from the solution as PCC.

In the event that the water is a water of any one of types 2, 3, 4, 5, 6 and 7, the lime slurry dose is pre-determined, depending on the particular embodiment of the invention, to react according to reaction [5] at least some portion of the sulphate and magnesium ions in the water solution, to form gypsum-magnesium hydroxide (GMH) which is precipitated from the solution.

The PCC that is recovered is calcitic in mineralogy and dominated by euhedral crystals and display features comparable to the chemical and physical features of technical grade PCC which may be used as a filler in paper, plastics, paint and ink. A polymeric dispersing agent, such as a poly-carboxylate dispersant, may optionally be applied to the washed PCC in the event that it is required to store the PCC for a long period before it is used.

The GMH product recovered from types 2, 3, 4, 5, 6 and 7 waters contains a variable amount of both calcium sulfate and magnesium hydroxide which co-precipitate as shown by reaction [5]. This GMH material may be used for soil conditioning. Depending on the particular embodiment used in its manufacture and the ratios of the two major components, it may be further processed to yield a magnesium hydroxide product. Alternatively, the GMH may be treated with sulphuric acid before being used as a slow release magnesium and sulfate based fertiliser or further processed to form a material suitable for manufacture of lightweight moulded articles.

The partially processed water from the solid-liquid separation vessel 114 is transferred to a suitable pond or other means 116 for concentrating it until solids still dissolved in it are ready to crystallise. The means 116 may comprise one or several ponds, other containers or commercially available brine concentrators.

It is preferable not to allow crystallisation to occur in the pond or other means where evaporation of a major proportion of water from the partially processed water is effected, so as to facilitate collection and further processing of the crystals and to reserve the capacity of the evaporation pond for evaporation purposes. Therefore means 116 may also contain a crystalliser which may be an additional pond or appropriate crystallisation equipment.

After crystallisation, the crystals are separated from the remaining mother liquor in separation means 118, and recovered as a second product. The second product is then optionally dewatered using conventional dewatering methods such as stockpile drainage (in the event that the second product is sodium chloride) or centrifugation. Following dewatering, the second product is optionally subjected to further processing which may include drying and dehydration of the crystals.

In the event that the water is a water of type 1, the second product may be sodium sulfate if sulphuric acid is used for pH adjustment.

In the event that the water is a water of type 1, the second product may be sodium chloride if hydrochloric acid is used for pH adjustment.

In the event that the water is a water of type 1, the second product may be sodium carbonate if a diverted side-stream of type 1 water is used for pH adjustment.

In the event that the water is a water of type 1, the second product may be sodium hydroxide if pH adjustment is not carried out.

In the event that the water is a water of type 2, 4, 5, 6 or 7, the second product may be sodium chloride.

In the event that the water is a water of type 3, the second product may be sodium sulphate.

Figure 2:
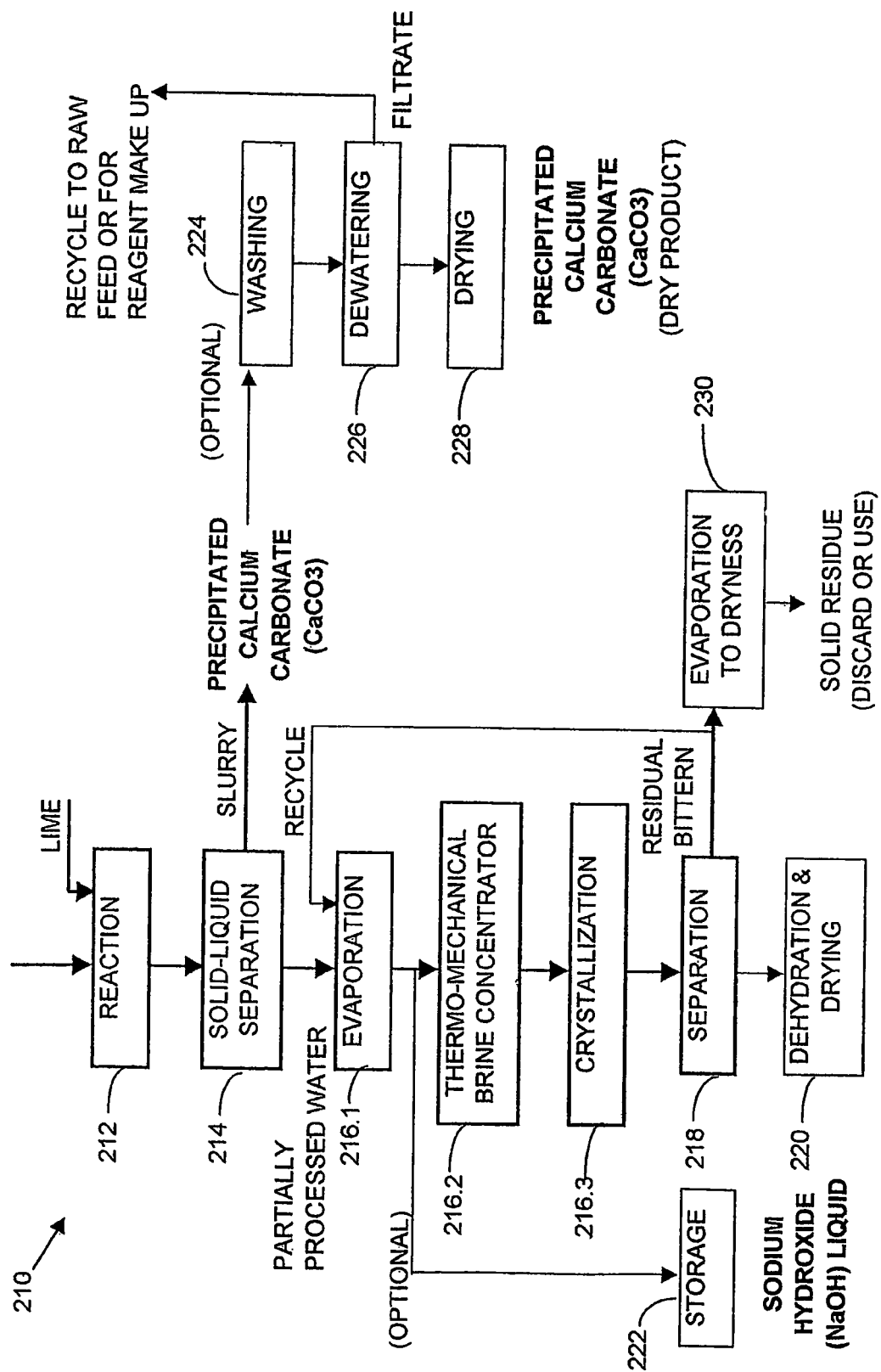
FIG. 2 is a schematic block flow diagram showing another embodiment of a process according to the invention for the comprehensive treatment of saline impaired water of type 1, yielding precipitated calcium carbonate and sodium hydroxide products and optionally operated so as to achieve zero liquid discharge.

FIG. 2 shows a schematic block flow diagram showing an apparatus 210 for the production of PCC and sodium hydroxide (NaOH). As in FIG. 1, a saline water belonging to Type 1, as listed in Table 1, is fed to a reaction vessel 212 and reacted with milk of hydrated lime ($Ca(OH)_2$), to allow formation of a first product. The lime slurry dose is calculated for stoichiometric complete conversion, according to reaction [1], of any bicarbonate ions in the water solution, to insoluble calcium carbonate which precipitates from the solution as PCC.

Figure 15:
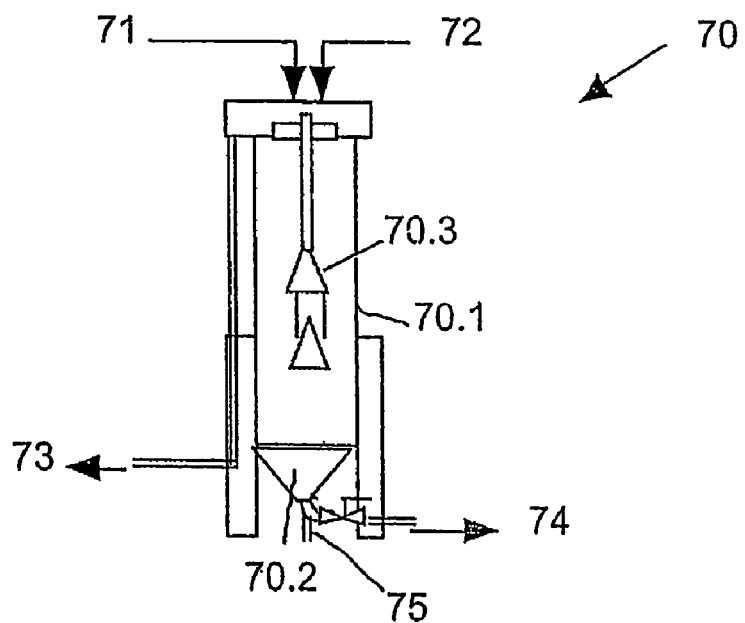
FIG. 15 is a diagrammatic representation of a thickener forming part of an apparatus in accordance with invention.

As in FIG. 1, a lime slurry having a 5-20 wt % solids content is used. High agitation conditions are applied in the reaction vessel 212 for an initial period of up to 30 minutes. The pH of the reaction mixture is maintained between 11.4 and 11.8 whilst the temperature in the reaction vessel is controlled in the range of between ambient and 50° C. Thereafter, the reaction is allowed to continue for at least another 30 minutes under the same pH and temperature conditions but at slower agitation, whereafter the contents are transferred to a solid-liquid separation vessel 214, such as a thickener, for separating the slurry and washing it in an appropriate washing means before it is dewatered and the thickened slurry is optionally dried to produce a saleable dry product. The thickener may be as is shown in FIG. 15.

The partially processed water from the solid-liquid separation vessel 214 is transferred to a suitable pond or other means 216 for concentrating it until solids still dissolved in it start to crystallise.

The means 216, in its simplest form, comprises an initial evaporation pond 216.1 and a crystallisation pond 216.3 in which sodium hydroxide is crystallised as the second product. The partially processed water is directly transferred to the solar evaporation pond 216.1 and concentrated to give an SG of 1.23 before the resultant brine is transferred to the crystallisation pond 216.3 (or optionally to a conventional thermomechanical concentrator) to increase the SG to about 1.24 and to promote crystallisation.

A preferred means 216 includes an initial evaporation pond 216.1 followed by a thermo-mechanical brine concentrator 216.2 to control the final stages of evaporation and thence the water is transferred to a crystallisation vessel 216.3, optionally with a temperature control facility (not shown), to lower the temperature of the liquid.

The crystal slurry forming in the pond or crystalliser 216.3 is dewatered and separated from the remaining mother liquor in separation means 218 which may be in the form of a thickener and/or a dewatering centrifuge (not shown).

After separation, the crystals are dehydrated, at a temperature in the range between 150° C. and 200° C., in a dehydration unit 220, to obtain an anhydrous sodium hydroxide product.

Liquid sodium hydroxide may optionally be recovered from the evaporation pond 216.1 when the SG has reached a value of about 1.22 (but less than 1.24) and transferred to storage 222, which is preferably a deep holding pond, to allow for precipitation and settlement of sodium chloride salt, and the maturation of the sodium hydroxide rich liquid for sale.

Anhydrous and liquid sodium hydroxide products. Depending on the water and reagent quality, an anhydrous sodium hydroxide product having a purity of 95 wt % or more and a liquid sodium hydroxide product containing about 35 to 45 wt % NaOH in solution, preferably about 40 wt % NaOH in solution may be produced by the process as shown in FIG. 2.

Figure 17:
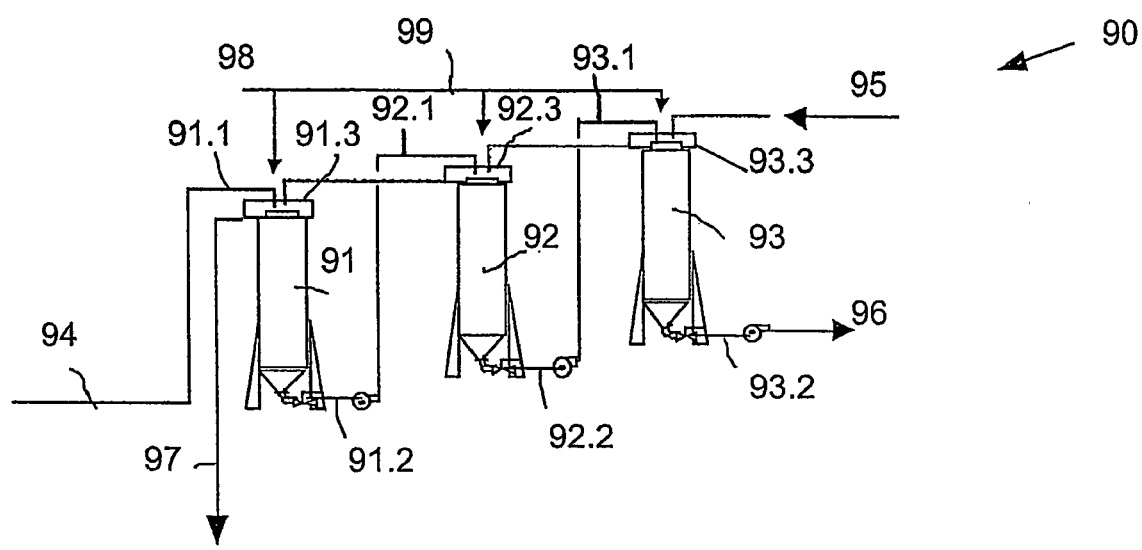
FIG. 17 is shows a Continuous, Countercurrent, Direct (CCD), washing apparatus which may be used to wash a PCC, GMH, MH or MCL product recovered from the process and apparatus of the invention.

In addition, the PCC recovered from the solid-liquid separator 214 may optionally be washed in a washing unit 224 which may be as described in FIG. 17, whereafter it is dewatered in a dewatering unit 226 and dried in a drier 228. The PCC that is recovered is calcitic and consists of euhedral to subhedral cubic particles with uniform particle size distribution, ranging between 0.2 microns and 2 microns in diameter, and having a purity of 98 wt % or more.

For dewatering of the product slurry in the dewatering unit 226, a filter press or other similar dewatering unit may be used. A continuous belt filter press with top and bottom continuous belts which move through a series of rollers, thus dewatering the slurry, has been found to be very effective in dewatering the washed slurry to a semi solid paste of up to 60 wt % solids which may be dried. Alternatively, the material may be stored as filter cake in a dewatered, semi-dried form.

A continuous pneumatic or fluidised bed drier, readily available from commercial suppliers, may be used as the drier 228. The dewatered paste recovered as filter cake from the dewatering unit 226 is conveyed to the drier 228 and thence dried and continuously ejected as a dry powder product. In the event that the product is desired to be in a form other than a powder, the filter cake may be solar dried in drying beds and then stored for further processing, if required.

The filtrate from the dewatering step is preferably recycled to the raw water feed or, alternatively, at least a portion thereof may be used for the preparation of the milk of hydrated lime used in the reaction vessel 212.

A minor portion (about 10% by volume) of the residual bittern recovered from the separation means 218 may be evaporated to dryness in a pond 230 and the solid residue obtained may be discarded. A major portion (about 90% by volume) may be recycled back to the evaporation pond 216.1 to increase NaOH recovery.

Figure 3:
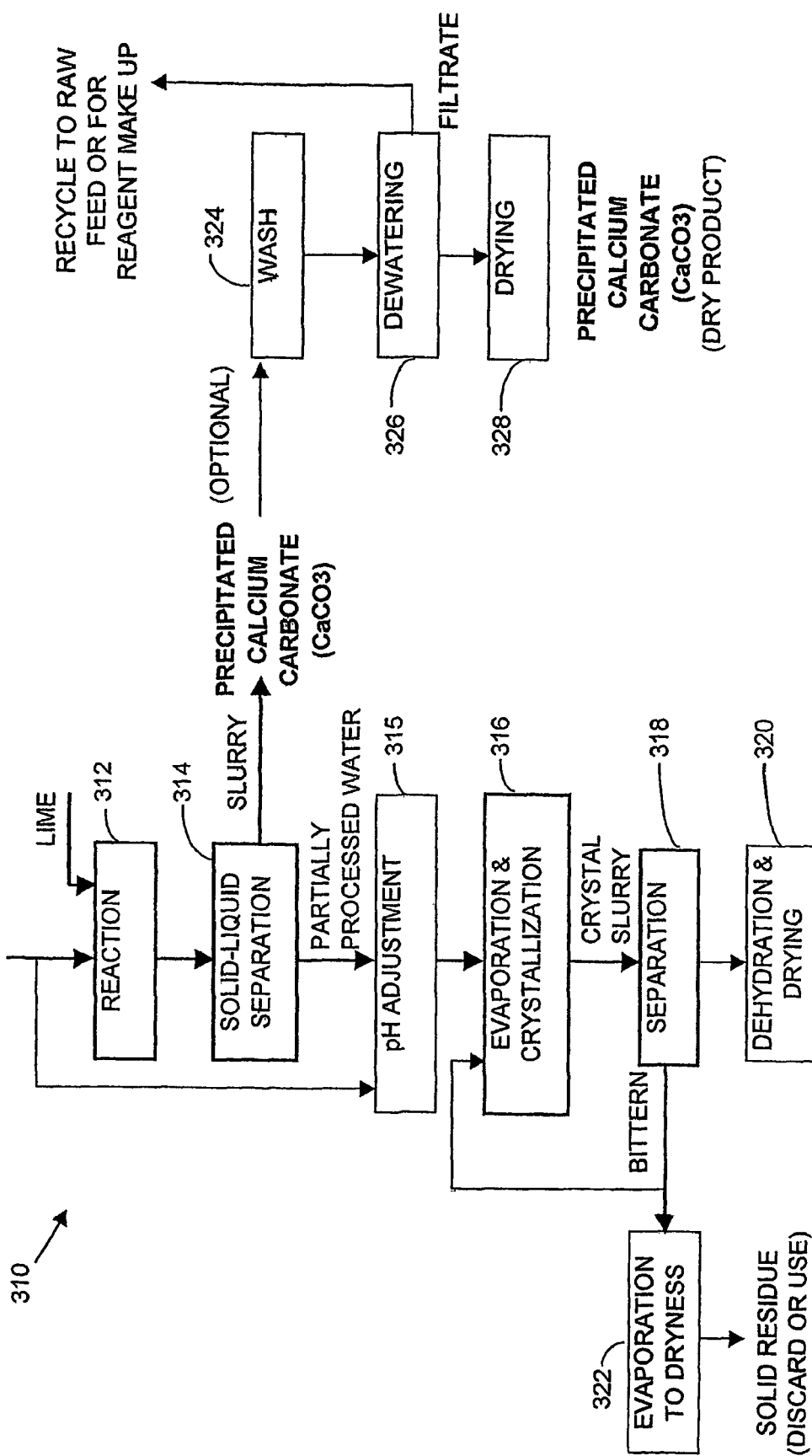
FIG. 3 is a schematic block flow diagram showing another embodiment of a process according to the invention for the comprehensive treatment of saline impaired water of type 1, yielding precipitated calcium carbonate and sodium carbonate products and optionally operated so as to achieve zero liquid discharge.
Figure 4:
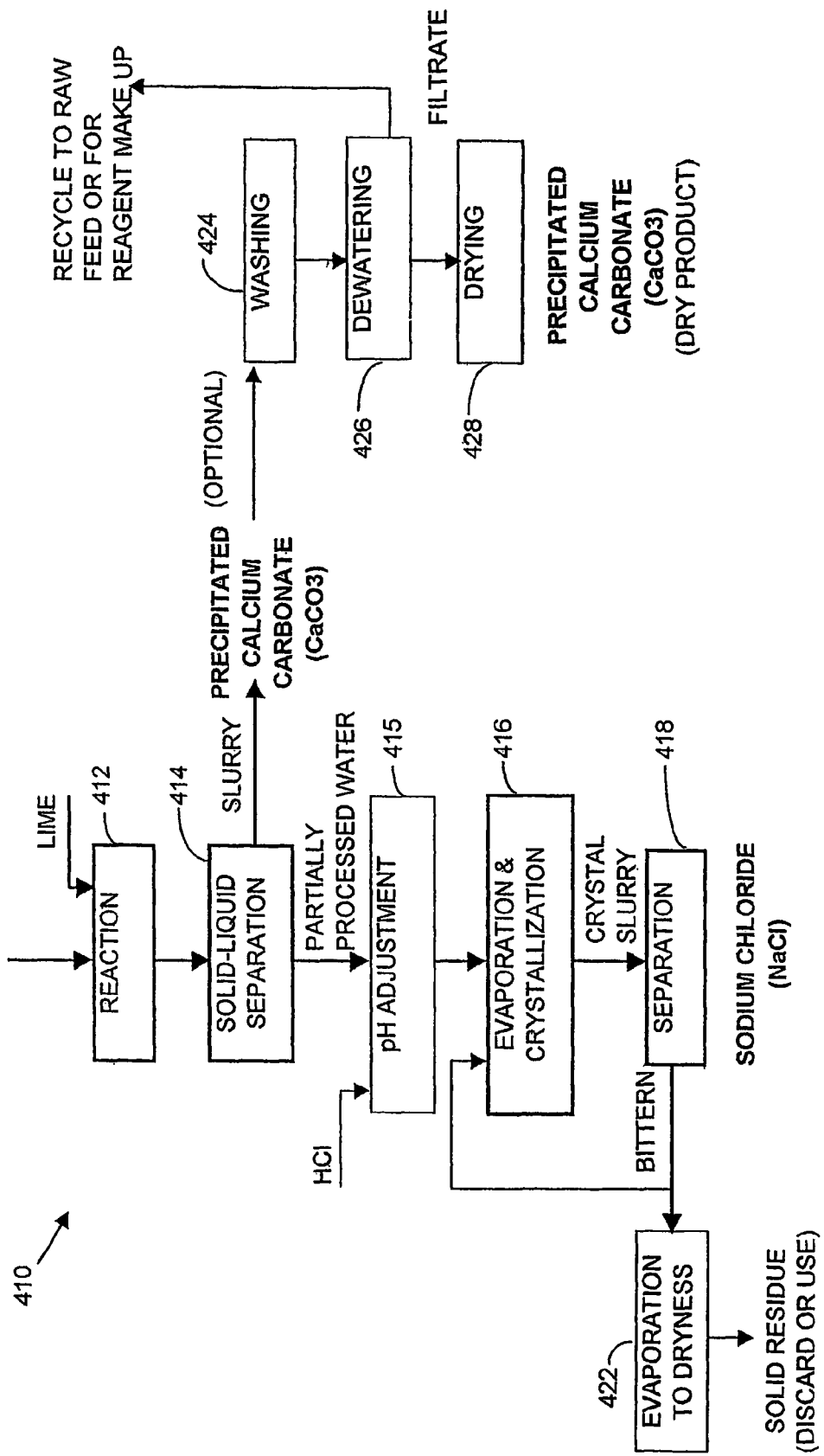
FIG. 4 is a schematic block flow diagram showing another embodiment of a process according to the invention for the comprehensive treatment of saline impaired water of type 1, yielding precipitated calcium carbonate and sodium chloride products and optionally operated so as to achieve zero liquid discharge.
Figure 5:
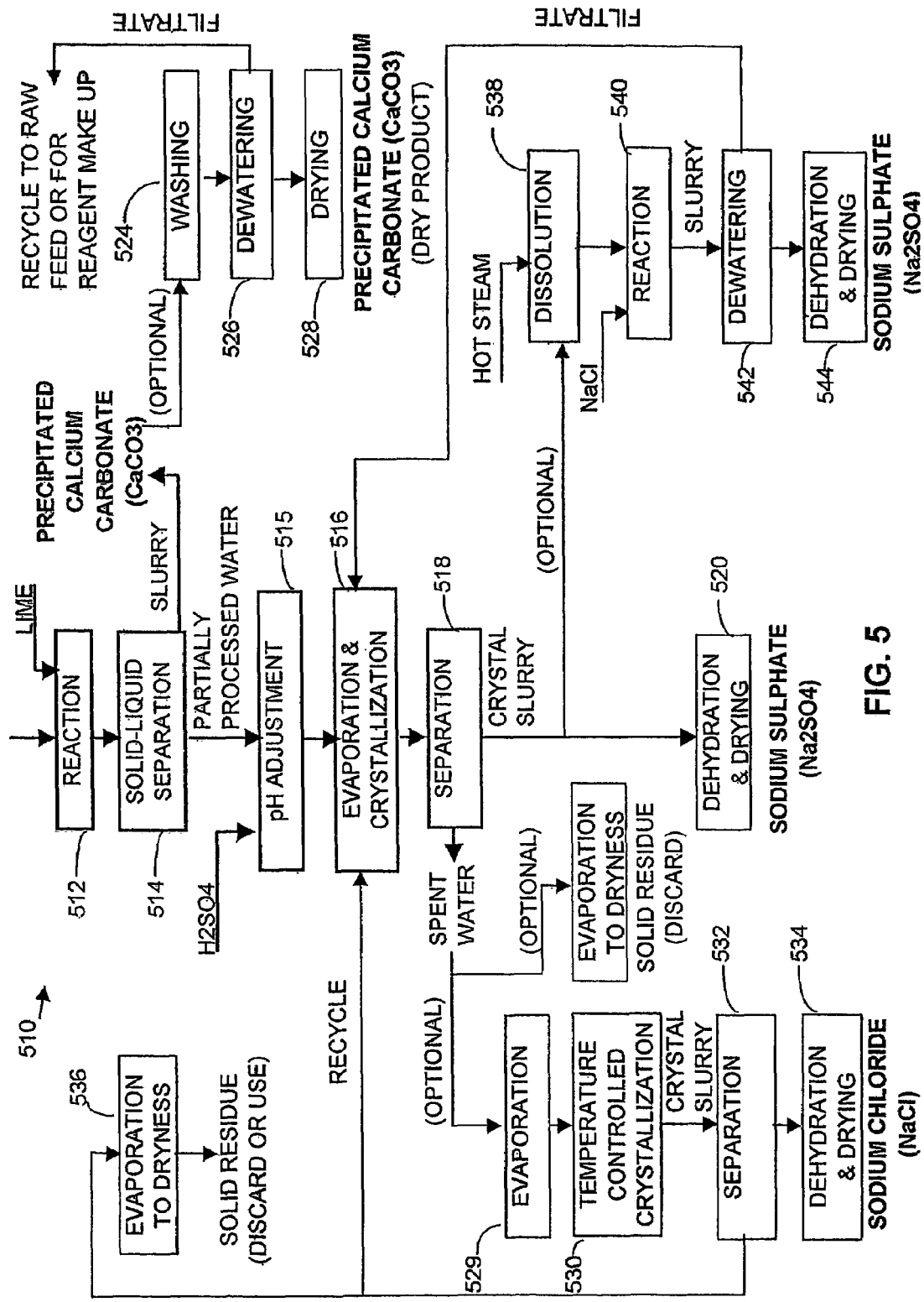
FIG. 5 is a schematic block flow diagram showing another embodiment of a process according to the invention for the comprehensive treatment of saline impaired water of type 1, yielding precipitated calcium carbonate, sodium sulphate and sodium chloride products and optionally operated so as to achieve zero liquid discharge.

As is shown in FIGS. 3, 4 and 5, sodium based products of value may be recovered from the partially processed water separated from the solid-liquid separation means 114 of FIG. 1 for feedwaters belonging to Type 1 as defined in Table 1. For this purpose, the pH of said water is preferably first adjusted to a pH falling within the range of 7 to 10, preferably to between 8 and 10, more preferably to between about 8 and about 9, by using one of the methods described below, to prepare an aliquot suitable for further processing and effluent minimisation. The methods for the adjustment of the pH of the partially treated water are:

(i) addition of raw Type 1 feed water, at a volumetric ratio determined by experimentation to allow reaction [3] to proceed, until the pH of the water is about 9.6 but not exceeding 10;

(ii) where a desalination step by reverse osmosis is employed as part of the process using Type 1 water as the feed, concentrate from the desalination step may be added to the partially processed water, at a volumetric ratio to be determined by experimentation, to allow reaction [3] to proceed until the pH of the water is about 9.6 but not exceeding 10;

(iii) concentrated sulfuric acid or hydrochloric acid may be added to the partially processed water at a rate to be determined by experimentation, to allow reaction [4] or [7] to proceed until the pH is about neutral (but not exceeding pH 9); and/or (iv) a combination of any of the above steps "i", "ii", "iii".

Whereas all of the above methods provide sufficient means for the adjustment of the pH of the partially treated water, the methods "i", "ii", and "iv" are particularly preferred because they are environmentally safe and comparatively cost effective.

The apparatus required to achieve the pH adjustment may comprise a conventional mixing vessel provided with means for addition of acid or a bypass Type 1 water stream. This mixing vessel may be provided with an agitator and may also include pH monitoring means. Optionally, the dose rate of acid or bypassed water is controlled by a feedback loop from the pH monitoring means, thus enabling accurate and efficient dosing of the pH adjustment agent and the consistency of the pH of the pH adjusted water.

FIG. 3 is a diagrammatic representation of a plant 310 for applying a process according to the invention for the production of sodium carbonate ($Na_2CO_3$) from the pH adjusted water of the PCC flow path, in the case of water of Type 1 being treated.

As in the case of FIGS. 1 and 2, the water is fed to a reaction vessel 312 such as is described with reference to FIG. 13, and reacted with milk of hydrated lime ($Ca(OH)_2$) to allow the formation of a first product. In this case, dissolved bicarbonate in the water is converted to PCC according to reaction [1].

The lime slurry preferably has a 5-20 wt % solids content. High agitation conditions are applied in the reaction vessel 312 for an initial period of up to 30 minutes. The pH of the reaction mixture is maintained between 11 and 12 but preferably between 11.4 and 11.8. The temperature in the reaction vessel is controlled in the range of between ambient water temperature and 55° C. Thereafter, the reaction is allowed to continue for another 30 minutes under the same pH and temperature conditions but at slower agitation, whereafter the contents are transferred to a solid-liquid separation vessel 314, such as a thickener, which may a thickener as described in relation to FIG. 15, for separating the slurry and washing it in a suitable washing means, before it is dewatered. The thickened, washed slurry is optionally dried to produce a saleable dry product.

The partially processed water from the solid-liquid separator 314 is transferred to a vessel 315.

After pH adjustment, by method (i) or (ii) as described above, the pH adjusted water is transferred to means 316 which may comprise an evaporation pond and a thermo-mechanical concentrator where the partially processed water is concentrated by evaporation to give a specific gravity (SG) of slightly above 1.25. whereafter the resultant brine is placed in a crystalliser (not shown) to allow crystallisation to take place at a temperature between 5° C. and 20° C. The hydrous crystalline material formed is then separated and dewatered in a separator 318. It is then dehydrated and dried in a drier 320, at a nominal temperature between 120° C. and 150° C., to obtain an anhydrous $Na_2CO_3$ product. The anhydrous sodium carbonate product comprises euhedral crystals and, depending on the water and reagent quality, has a purity of 97 wt % or more, which is considered comparable in quality to the specifications of technical grade soda ash.

The residual bittern from the product separation step 318 is transferred to a shallow evaporation pond 322 for evaporation to complete dryness, for safe disposal of the resultant solid residue. Optionally, the major part (about 90% by volume) of the residual bittern from step 318 is recycled to means 316. A portion of about 10% by volume is removed and evaporated to total dryness in the pond 322, to avoid build up of unwanted ions.

The PCC recovered from the solid-liquid separator 314 may optionally be washed in a washing unit 324 which may be as described for 224, whereafter it may be dewatered in a dewatering unit 326 which may be as described for 226 and dried in a drier 328 which may be as described for 228. The filtrate from the dewatering unit 326 is preferably recycled to the raw water feed. Alternatively, at least a portion thereof may be used for the preparation of the slaked lime used in the reaction vessel 312.

FIG. 4 is a diagrammatic representation of a plant 410 for recovering sodium chloride (NaCl) from the partially processed water of the PCC flow path, in the case of water types 1 being treated.

As in the case of FIGS. 1 to 3, a saline impaired water belonging to type 1 is fed to a reaction vessel 412 (which may be as described for 212) and reacted with milk of hydrated lime ($Ca(OH)_2$) to allow formation of a first product. In this way, dissolved bicarbonate in the water is converted to PCC according to reaction [1].

The lime slurry has a 5-20 wt % solids content. High agitation conditions are applied in the reaction vessel 412 for an initial period of up to 30 minutes. The pH of the reaction mixture is maintained between 11 and 12 but preferably between 11.4 and 11.8.

The temperature in the reaction vessel is controlled in the range of between ambient and 55° C. Thereafter, the reaction is allowed to continue for another 30 minutes under the same pH and temperature conditions but at slower agitation, whereafter the contents are transferred to a solid-liquid separation vessel 414, which may be as described for 214, for separating the slurry which may be washed in an appropriate washing means before it is dewatered. The thickened, washed slurry is optionally dried to produce a saleable dry product.

The partially processed water from the solid-liquid separator 414 is transferred to a container 415 which may be similar to the container 315, wherein the pH of the partially processed water is adjusted until the pH is about neutral (but not exceeding pH 9. The adjustment is done by method "iii" using hydrochloric acid according to reaction[7], whereafter the pH adjusted water is transferred to a suitable evaporation pond or other means 416 for concentration, by solar evaporation to give a specific gravity (SG) of slightly above 1.21. It is then transferred to a crystallisation pond where the sodium chloride crystallises and precipitates. The sodium chloride may be harvested by conventional salt harvesting means.

Figure 16:
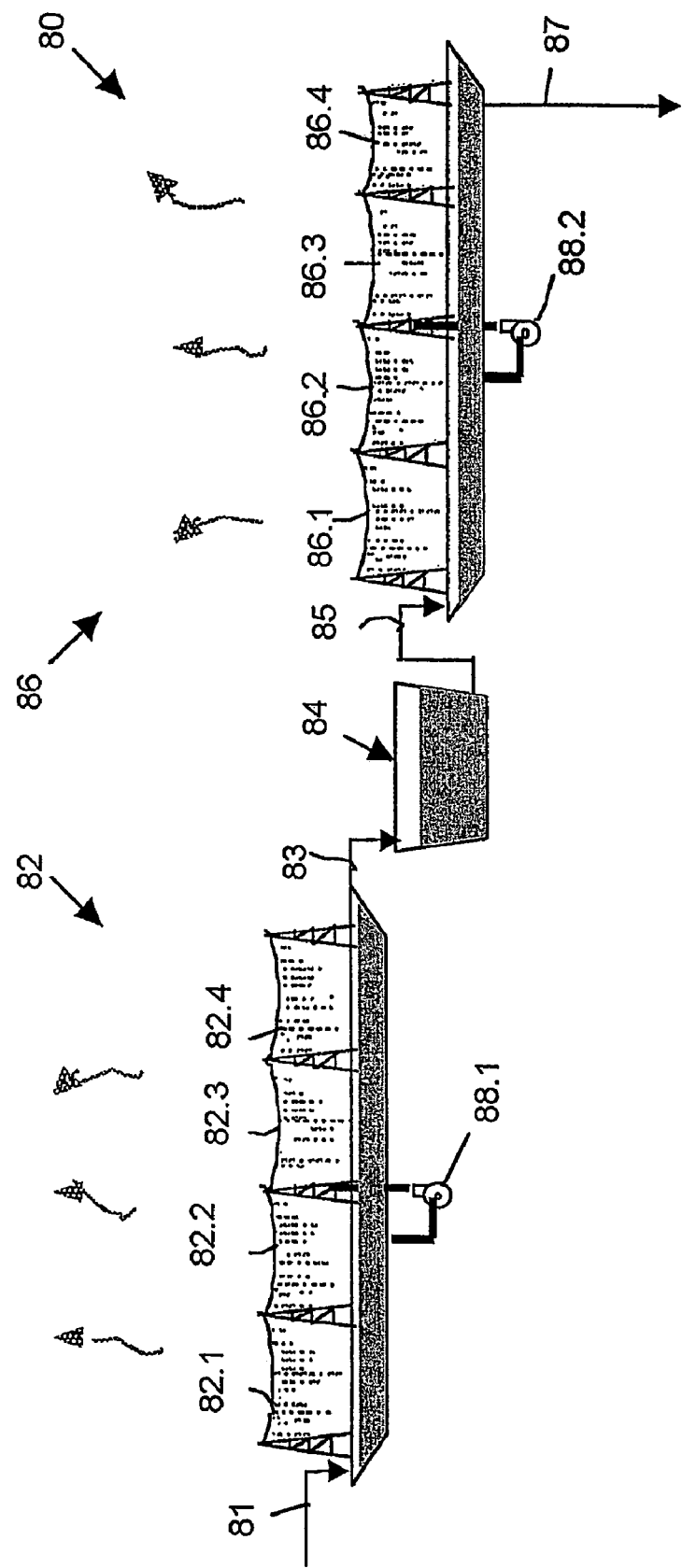
FIG. 16 diagrammatically shows a system of enhanced evaporation ponds with intermediate deep solar pond for use with the apparatus and process of the invention.

The evaporation pond may be designed as shown in FIG. 16. The crystallisation pond is similar in bund design to a pond used for evaporation. The depths of the crystallisation ponds are determined after allowing for compaction of the first salt harvest. The depth should, however, be less than 0.4 m. Drainage between interrelated crystallisation and harvesting ponds is achieved by allowing up to one degree gradient for gravity flow is between the ponds. The residual bitterns should be directed to a collection sump.

A major portion (about 90% to about 95% by volume) of the residual bittern from the separator 418 is recycled to the evaporation pond 416. A minor portion (of between about 5% to about 10% by volume) is transferred or bled to another pond 422 and evaporated to dryness, thus avoiding the build-up of undesired ions within the system.

The crystals of sodium chloride are separated from the mother liquor in a separation stage 418, which may be a combination of conventional harvesting followed by heap drainage or other traditional salt harvesting methods. Alternatively, a dewatering centrifuge is used before the sodium chloride is solar dehydrated and dried or kiln dried.

Alternatively, the partially processed, pH adjusted water, may be transferred to a thermo-mechanical concentrator and the concentration of the solution may be increased to give an SG of about 1.21, whereafter the resultant brine may be placed in a crystalliser to allow crystallisation. The crystal slurry may then be dewatered in a separator 418 which may be a decanter or basket type centrifuge.

The PCC recovered from the solid-liquid separator 414 may optionally be washed in a washing unit 424 which may be as described for 224, whereafter it may be dewatered in a dewatering unit 426 which may be as described for 226 and dried in a drier 428 which may be the same as the drier 228. The filtrate from the dewatering unit 426 is preferably recycled to raw water feed or alternatively, at least a portion thereof may be used for the preparation of the slaked lime used in the reaction vessel 412.

FIG. 5 shows a diagrammatic representation of a plant 510 for applying a process for the production of anhydrous sodium sulphate ($Na_2SO_4$) from the partially processed water of the PCC flow path, when a water of type 1 is treated. In addition, PCC and sodium chloride are recovered.

The pH of the partially processed water is adjusted in a pH adjustment container 515 according to method "(iii)" as described above, using sulfuric acid as the pH adjustment reagent. Reaction [4] applies. Thereafter, the partially processed water is first transferred to an evaporation pond 516 and concentrated by solar evaporation to increase the TDS to about 200 g/L and the sulphate ion content to over 60 g/L. Optionally, the advanced stages of evaporation are controlled using a thermo-mechanical brine concentrator. The resultant brine is then artificially cooled in cooling means (not shown) to a temperature between zero and minus 10° C., to allow a crystal slurry to be formed.

The cooling and crystallisation may be carried out in a circulating magma type or circulating liquor type chilled crystalliser (not shown) whereby a crystal slurry is continuously produced and discharged. Alternatively, the crystallisation may be carried out in a chilled, jacketed, batch type tank crystalliser or a scaped surface tank type crystalliser. Where climatic conditions are favourable, cooling and crystallisation may be promoted in ponds, with the crystals harvested from the pond floor and thus separated from the mother liquor.

The crystal slurry is then dewatered in a separator 518, which may be a decanter type or basket type centrifuge. After separation, the crystals are subjected to drying and dehydration in a drier 520, which may be as is described with reference to 220 in FIG. 2, to obtain an anhydrous sodium sulphate product. The anhydrous sodium sulphate product preferably has a purity of 90 wt % or more, depending on the water and reagent quality. This primary sodium sulphate can be easily purified to a higher grade product.

As is shown in FIG. 5, sodium chloride (NaCl) may also be recovered from the partially processed water of the sodium sulphate flow path, when water type 1 is treated. The mother liquor from the aforementioned separator 518 is further concentrated in a solar evaporation pond 529 to an SG of about 1.20 or slightly higher. It is then transferred to a crystalliser pond 530 to allow crystallisation. Precipitated sodium chloride (NaCl) salt is separated and harvested in a harvesting pond 532. The crystals are then dehydrated and dried in means 534 which may be solar drying or may comprise a drier. The residual bittern remaining after sodium chloride salt harvesting is conveniently recycled to the first evaporation pond 516, with a small portion (around 10% by volume) being evaporated to dryness in a further pond 536 to avoid a build up of undesired ions within the system.

The sodium chloride salt product has a purity of 97 wt % or more, depending on water and reagent quality. This product exhibits chemical and physical features comparable to the quality of commercial grade sodium chloride (NaCl) salt.

An alternative method of dehydration known as "halite replacement" and previously disclosed in Australian Patent No. 641871, may optionally be employed to improve the energy efficiency of the overall process. In that method, the crystal slurry from the separator 518 is first dissolved in a tank 538, by the introduction of hot steam, and then mixed with a pre-determined amount of sodium chloride salt. The mixture is allowed to react for about 30 minutes at a temperature of about 40° C. and then dewatered in a separator 542 and dried in a drier 544 to obtain a crystalline anhydrous sodium sulphate product.

The PCC recovered from the solid-liquid separator 514 may optionally be washed in a washing unit 524 which may be the same as for the washing unit 224, whereafter it may be dewatered in a dewatering unit 526 (which may be the same as the unit 226) and dried in a drier 528 (which may be the same as the drier 228). The filtrate from the dewatering unit 526 may be recycled to the raw water feed or alternatively, at least a portion thereof may be used for the preparation of the slaked lime to be used in the reaction vessel 512.

Figure 6:
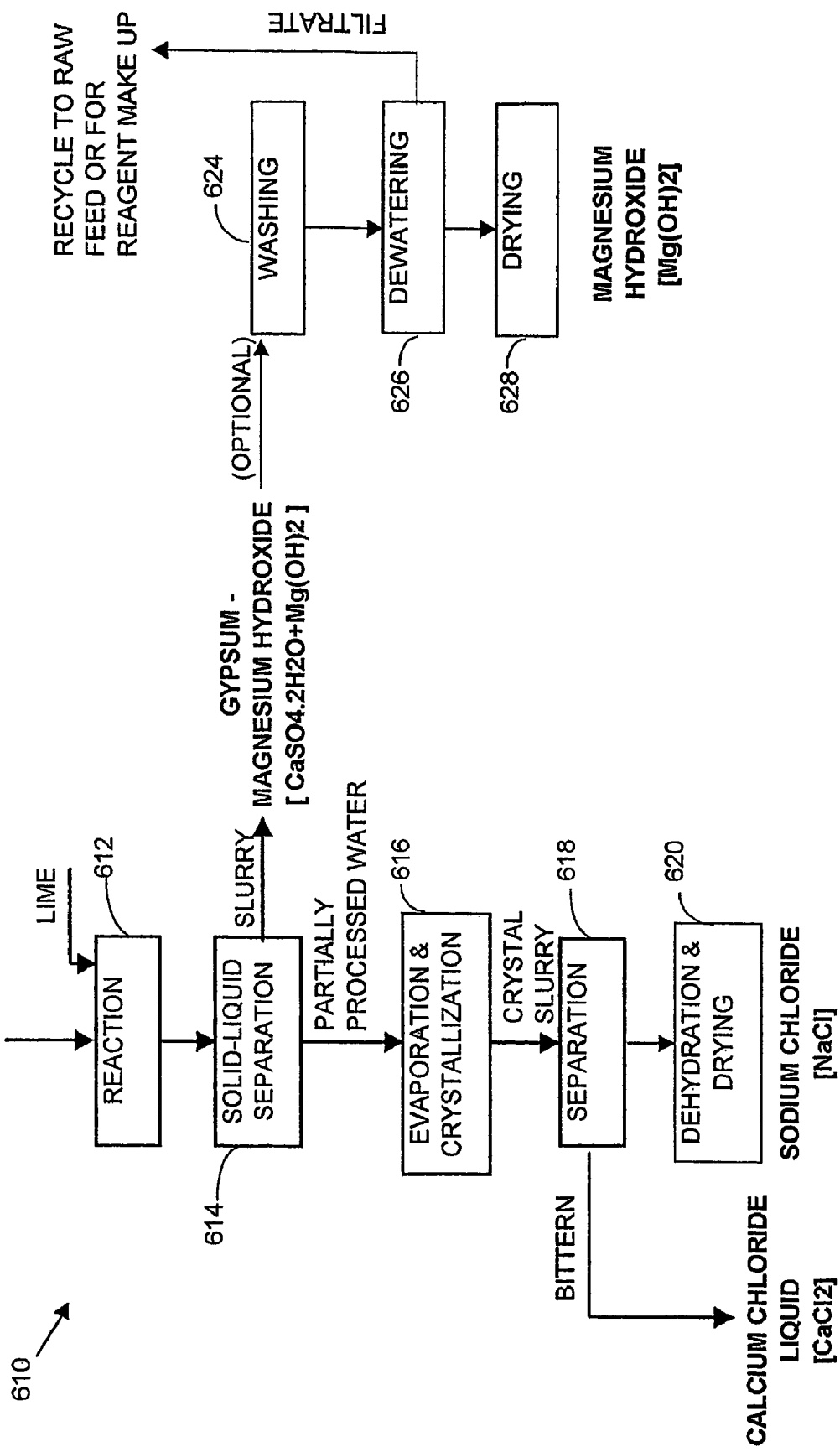
FIG. 6 is a schematic block flow diagram showing another embodiment of a process according to the invention for the comprehensive treatment of saline impaired water of types 2, 4, 5, 6 and 7 listed in Table 1, yielding magnesium hydroxide, calcium chloride and sodium chloride products and optionally operated so as to achieve zero liquid discharge.

FIG. 6 shows a diagrammatic representation of a plant 610 for applying the invention to an alternative process for the production of magnesium hydroxide, (GMH), sodium chloride and calcium chloride, from saline impaired water belonging to any one of water types 2, 4, 5, 6 and 7 and preferably having a Mg/SO4 ratio of greater than 4.

Water is first placed in a reaction vessel 612, which may be as described for 212, and reacted with milk of hydrated lime made to a solids content between 1 wt % and 5 wt %, and dosed at a stoichiometric amount required for the complete removal of Mg from the water according to reaction [6].

To avoid the formation of too much gypsum, the lime slurry solids content and volume are controlled such as to ensure that the weighted average $SO_4^{2-}$ ion concentration of the water and the hydrated lime slurry fed to the reactor is lower than 3 g/L. The lime slurry, while mostly reacting with magnesium cations according to reaction [6] to form magnesium hydroxide, also partially reacts with $SO_4^{2-}$ ions according to reaction [5] to form GMH. Reaction [5] produces a small amount of gypsum in the resultant slurry, due to the low sulphate content in the reaction mixture. This gypsum is undesirable.

The reaction is carried out under strong agitation conditions for about 60 minutes, with the pH of the solution in the reactor 612 being controlled within the range of 10-10.5 (by adjustment in the dosing rate) to ensure a high magnesium ion recovery rate, preferably exceeding 95% of the stoichiometric amount of magnesium ions present in the feed water. The thin slurry thus formed is then transferred to a separator 614, which may be the same as described for 214, to separate solids from the partially processed water. The thickened slurry from the separator 614, which contains less than about 3 wt % gypsum by dry weight, comprises fine grain, hemi-pyramidal, highly soluble, crystals and crystallites. The slurry is subjected to high efficiency washing in a unit 624, which may be as described for 224. Due to the high efficiency of the washing system, the fine grain gypsum formed during reaction is dissolved in the wash water. Preferred wash water to slurry ratios for this step are typically between 3:1 and 5:1.

The slurry, after washing in the unit 624 and dewatering in a dewatering unit 626, which may be as described for 226, and drying in a drying unit 628, which may be as described for 228, yields a product typically comprising a minimum of 92 wt % of $Mg(OH)_2$ by dry weight, which product exhibits chemical and physical features comparable to the quality of commercial grade magnesium hydroxide.

The partially processed water from the solid-liquid separator 614 is transferred to a solar pond 616 and is concentrated by solar evaporation to give an SG reading of slightly over 1.20, to allow for removal of sulphate ions by gypsum precipitation and settlement to the bottom of the pond. The brine is then transferred to a shallow crystalliser pond (not shown) to allow further crystallisation and formation of sodium chloride crystals which are separated from the residual mother liquor by means of a conventional salt harvesting method. The crystal slurry is dewatered in a stockpile 618 and dried using solar drying or kiln drying 620 to sodium chloride product typically having a purity of 97 wt % or more, depending on water and reagent quality. The residual mother liquor from the stockpile 618 is transferred to a deeper pond (not shown). The concentrated mother liquor solution in this pond is rich in calcium chloride having a concentration between 30 wt % and 40 wt % and exhibiting a chemical composition comparable to the quality of commercial grade calcium chloride ($CaCl_2$) solution.

Figure 7:
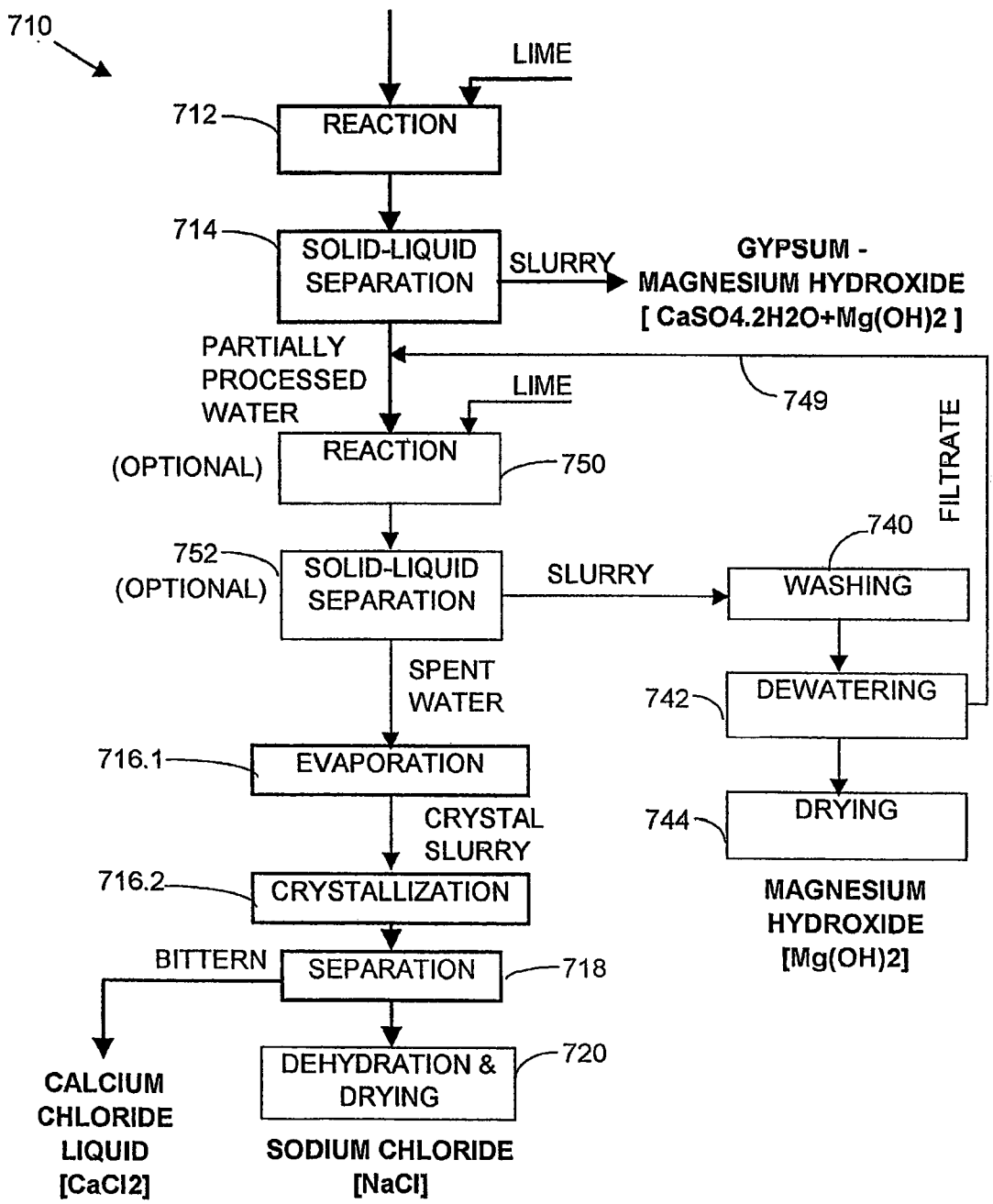
FIG. 7 is a schematic block flow diagram showing another embodiment of a process according to the invention for the comprehensive treatment of saline impaired water of types 2, 4, 5, 6 and 7 listed in Table 1, yielding gypsum-magnesium hydroxide, magnesium hydroxide, sodium chloride and calcium chloride products and optionally operated so as to achieve zero liquid discharge.

FIG. 7 shows a diagrammatic representation of a plant 710 for applying a process for the production of gypsum-magnesium hydroxide, magnesium hydroxide, sodium chloride and calcium chloride from saline water belonging to any one of water types 2, 4, 5, 6 and 7.

Water is first placed in a reaction vessel 712, which may be as described with reference to FIG. 13, and reacted with milk of hydrated lime, with the latter having a solids content between 5 wt % and 20 wt %, and dosed at a stoichiometric amount of calcium ions required for the complete removal of $SO_4^{2-}$ ions from the feed water, according to reaction [5]. The reaction is continued for about 30 minutes under high agitation conditions, with the pH of the reaction mixture being kept below 10 (by accurate control of the dosing rate). The reaction temperature is maintained within the range of ambient and 55° C. The thin slurry thus formed is transferred to a separator 714, which may be as described for 214, to separate solids from partially processed water. The separated slurry may be washed in a washing system (not shown) to reduce sodium chloride content, after which it may optionally be de-watered in a pond by settling or by other means, such as a filter press, to give a GMH product usually comprising about 60-70 wt % of gypsum ($CaSO_4.2H_2O$) and 30-40 wt % of magnesium hydroxide ($Mg(OH)_2$) by solids weight, which product may optionally be used directly. Alternatively, it may be powdered and admixed with one or more nutritious materials for application as a soil conditioner. It may advantageously be used for the remediation of sodic soils in salinity impacted areas. The GMH product may be further processed for use in a variety of applications.

The process of direct sulphate ion removal by lime addition (known as desulphation) also enables the removal of silica and certain dissolved metallic impurities, such as iron, manganese, arsenic and nickel, by co-precipitation of their hydroxide species and/or by direct ionic absorption onto the gypsum-magnesium hydroxide flocs during slurry formation and settlement. This reduces the concentration of these substances in the subsequent magnesium hydroxide product stream.

The desulphated water from the separator 714 may be retained in a deep holding pond 715 (not shown) for 5 to 7 days to allow maturation by precipitation of seed gypsum and reduction of sulphate ion content. In view of supersaturation with respect to gypsum in the partially processed water at ambient temperature conditions, regardless of calcium ion concentration, the sulphate ion concentration in the matured solution may be over 4 g/L but should not exceed 5 g/L.

If necessary, the matured desulphated water is optionally diluted by fresh water or filtrate water 749 to reduce the dissolved sulphate ion content to below 3 g/L, whereafter it is reacted in a reaction vessel 750, which may be as described for 212, with a milk of hydrated lime made to between 5 wt % and 20 wt % solids content and added at a dosing rate equivalent to 100% of the stoichiometric amount required for magnesium ion removal as a hydroxide species, according to reaction [6]. This reaction is carried out under strong agitation conditions for about 60 minutes, with the pH of the solution in the reactor 750 controlled within the range of 10-10.5, which ensures a high magnesium ion recovery rate, usually exceeding 95% of the stoichiometric amount of magnesium present in the partially processed water. The slurry thus formed is separated using a thickener 752, which may be as described for 214, and washed in a multiple stage counter-current washing unit 740, which may be as described for 224. It is then dewatered in a dewatering unit 742, which may be as described for 226, and dried in a drier 744, which may be as described for 228, to obtain a magnesium hydroxide product.

The magnesium hydroxide product thus generated usually has a purity of 92 wt % or more, depending on water and reagent quality and exhibits chemical and physical features comparable to those of commercial grade magnesium hydroxide.

For the production of sodium chloride (NaCl) and calcium chloride ($CaCl_2$) from the partially processed water overflow of the separator 752 (using water types 2, 4, 5, 6 and 7), the said overflow is placed in a solar pond 716.1 and is concentrated by solar evaporation to give an SG of slightly over 1.20, to cause the further reduction of the sulphate ion by gypsum precipitation. The gypsum settles at the bottom of the pond. The brine is transferred to a shallow crystalliser pond 716.2 to cause crystallisation and formation of sodium chloride crystals, which crystals are separated from the residual mother liquor by means of a conventional salt harvesting method. The crystals are dewatered in a stockpile 718 and dried using solar drying, kiln drying or other means of drying in a step 720 to give a sodium chloride product having a purity of 97 wt % or more, depending on water and reagent quality. The resultant residual mother liquor from the dewatering step 718 is transferred to a deeper pond (not shown) to allow further crystallisation and settlement of sodium chloride salt to the bottom of the pond, to reduce sodium chloride content to a minimum level.

The concentrated mother liquor solution in this pond is rich in calcium chloride having a concentration between 30 wt % and 40 wt %. Its chemical composition is comparable to the quality of commercial grade calcium chloride ($CaCl_2$) solution.

In addition to the production of useable hydroxide products, a distinct advantage offered by the removal of magnesium ions from saline impaired waters according to the invention, is a significantly faster rate of evaporation of the resultant partially processed water which, for large-scale saline water disposal schemes, translates to a significant reduction in the capital and operation costs of the plant required for the further reduction of the volume of water. Such plant may include conventional enhanced evaporation means such as spray towers, air injection, dye addition and pressure driven bubbling. Magnesium removal also reduces the magnesium poisoning effect on sodium chloride salt (NaCl) during crystallisation, thus resulting in a better quality salt product. It also enables a higher evaporation rate and hence higher product yield for a given evaporation pond area.

The staged removal of magnesium offers an attractive option for the efficient removal of dissolved sulphate ($SO_4^{2-}$) ions as well as the above mentioned impurities.

Figure 8:
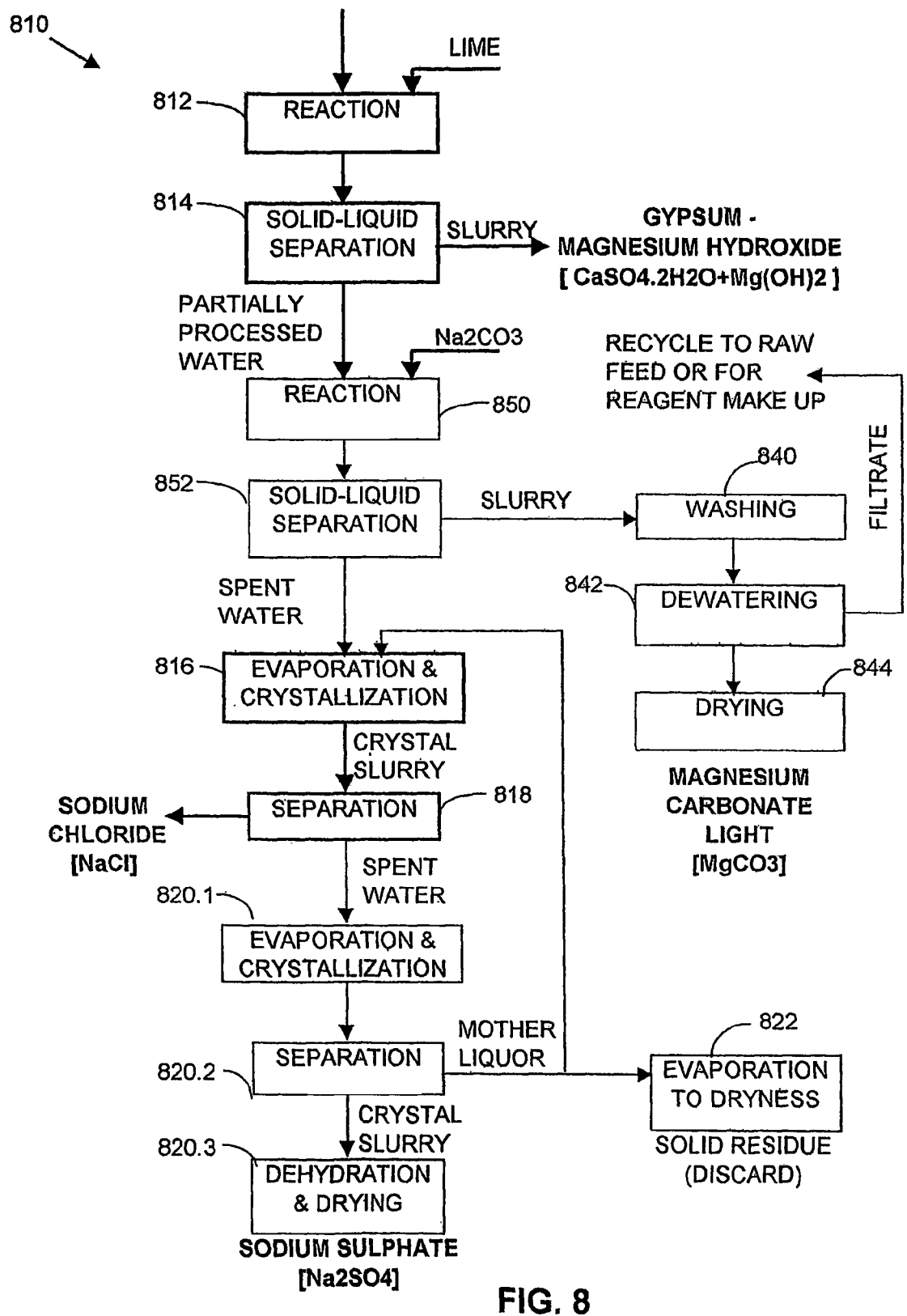
FIG. 8 is a schematic block flow diagram showing another embodiment of a process according to the invention for the comprehensive treatment of saline impaired water of types 4 or 6, yielding gypsum magnesium hydroxide, magnesium carbonate light, sodium chloride and sodium sulphate products and optionally operated so as to achieve zero liquid discharge.

FIG. 8 diagrammatically shows a plant for the co-production of gypsum magnesium hydroxide (GMH), magnesium carbonate light (MCL), sodium chloride and sodium sulphate. A saline impaired water belonging to water types 4 or 6 is fed to a reaction vessel 812, which may be as described for 212, and is reacted according to reaction [5] with a predetermined amount of lime, having 5-20 wt % of solids content in the form of a slurry, for 30 minutes. This reaction causes the reduction of Si, Fe, Al, Sr and other elemental impurities in the partially processed water. A thin slurry is formed in the reactor 812. The thin slurry is transferred to means 814 which may be a holding pond or thickener to allow the gypsum-magnesium hydroxide solids to settle and to leave a clarified, partially processed water. The partially processed water is transferred to a reactor 850, which may be as described for 212, to be reacted with a sodium carbonate solution having a concentration of between 25 wt % and 40 wt %, and added at a stoichiometric amount required for the complete removal of magnesium ions according to either reaction [9] or [10], or a combination thereof. The reaction is allowed to proceed, under strong agitation conditions, for a reaction time ranging between 60 minutes and 80 minutes, while the reaction temperature is preferably maintained at not less than 45° C. The slurry thus formed is separated in separating means 852, which may be as described for 214, and washed in a suitable washing unit 840, which may be as described for 224. It is then dewatered and thickened in a dewatering unit 842, which may be as described for 226. It is optionally dried in a drier 844, which may be as described for 228, to obtain a magnesium carbonate light product (MCL), having an equivalent MgO content of 40 wt % minimum. The chemical and physical features of this product are comparable to those of commercial grade magnesium carbonate light.

The partially processed water from the aforementioned dewatering unit 852 is further concentrated in a solar evaporation pond (not shown) to an SG of about 1.20 or slightly higher. It is then transferred to a crystalliser pond 816 to allow crystallisation. The crystallised material is harvested and dewatered in separation means 818 to obtain sodium chloride (NaCl) salt.

The mother liquor remaining after sodium chloride removal is transferred to an evaporation pond 820.1 and concentrated by solar evaporation to increase the TDS to about 200 g/L and the sulphate ion content to over 60 g/L. The resultant brine is then artificially cooled in cooling means (not shown) to a temperature between zero and minus 10° C., to cause a crystal slurry to be formed, which may be as described for 516. The slurry is then dewatered in a separator 820.2 and subjected to dehydration and drying in a drier 820.3 to obtain an anhydrous sodium sulphate product. The anhydrous sodium sulphate product preferably has a purity of 90 wt % or more, depending on water and reagent quality. This product may be further purified to a commercial grade product using conventional purification methods.

A 90% by volume portion of the mother liquor from the separator 820.2 is recycled to the crystalliser pond 816 to increase the $Na_2SO_4$ recovery rate. The remaining portion of that mother liquor is transferred to an evaporation pond 822 to concentrate, until dryness, for safe solid disposal.

Optionally, the process as described above may be carried out with the objectives of reducing Mg ion content of a water in need thereof, the production of MCL and the use of the remaining water as a low Mg water for mineral processing operations, such as carbon in leach (CIL) processes, to recover gold with the aid of cyanide. Such water of reduced Mg content has an advantage over high Mg content water in that it requires less lime (or sodium hydroxide) to raise the pH of such water to over 10, as is required by a cyanide leach. A second advantage is that, since less lime is used to raise the pH, the amount of dissolved calcium of the process water is also reduced, thus avoiding or reducing gypsum formation within the process plant. This reduces operating costs. A further advantage is the reduction in risks associated with a cyanide break out from such gold recovery operations.

The reduction in the formation of gypsum may also result in more efficient use of cyanide and a reduction in retention time of ore slurry within the leaching plant.

Figure 9:
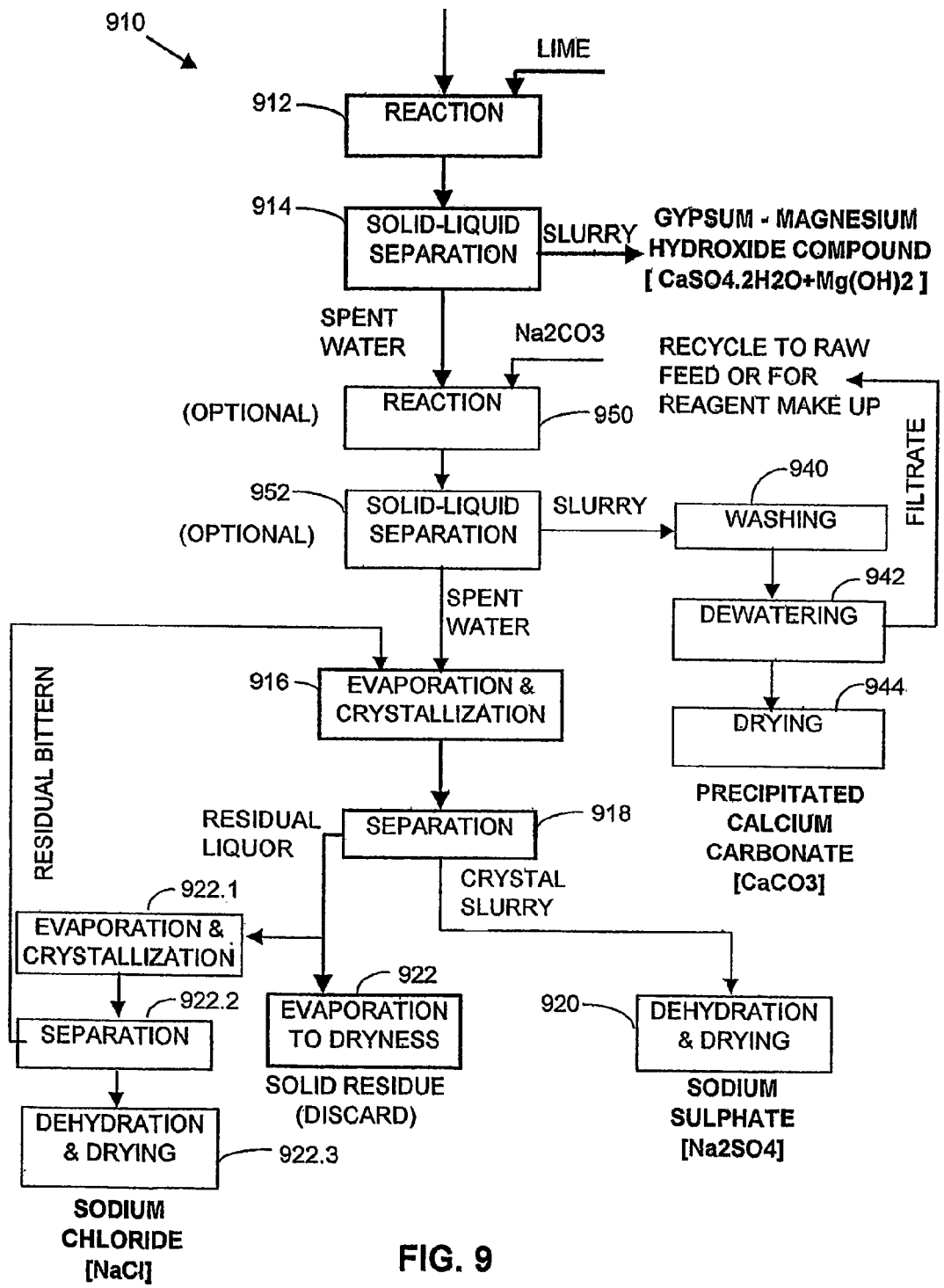
FIG. 9 is a schematic block flow diagram showing another embodiment of a process according to the invention for the comprehensive treatment of saline impaired water of type 3, yielding gypsum magnesium hydroxide, precipitated calcium carbonate, sodium sulphate and sodium chloride and optionally operated so as to achieve zero liquid discharge.

In FIG. 9 an embodiment of the invention is shown which can be used for waters belonging to type 3. The raw water is fed to a reaction vessel 912, which may be as described for 212, and reacted with milk of hydrated lime having a solids content between 5 wt % and 20 wt %. The lime is dosed at the stoichiometric amount of calcium ions required for the substantially complete removal of magnesium ions from the feed water, according to reaction [5]. The reaction is allowed to continue for about 30 minutes under high agitation conditions with the pH of the reaction mixture preferably maintained between 10 and 10.5 (by careful control of the dosing rate), whilst the reaction temperature is maintained within the range of ambient and 55° C. The thin slurry thus formed is transferred to a separator 914, which may be as described for 214, to separate solids from the partially processed water. The slurry recovered from the separator 914 is gypsum-magnesium hydroxide (GMH). It may be washed, dewatered and dried to yield a useful product as mentioned above. The partially processed water from the separator 914 is transferred to a deep pond (not shown), to allow settlement of a minor quantity of precipitate and for maturation.

The matured partially processed water from the holding pond is transferred to a reactor 950, which may be as described for 212, and reacted with a sodium carbonate solution prepared to a strength of between 25 wt % and 40 wt %, and added at the stoichiometric amount of carbonate required for the complete removal of all calcium ions from the water, according to reaction [2]. The reaction proceeds under strong agitation conditions, for a reaction time ranging between 30 and 60 minutes. The slurry thus formed is separated in a separator 952, which may be as described for 214, and washed in a washing unit 940, which may be as described for 224. It is then dewatered in a dewatering unit 942, which may be as described for 226, and optionally dried in a drier 944, which may be as described for 228, to obtain a precipitated calcium carbonate product having a minimum $CaCO_3$ content of 98 wt % and exhibiting chemical and physical features comparable to those of commercial grade precipitated calcium carbonate.

The partially processed water from the separator 952 is first transferred to an evaporation pond 916 and concentrated by solar evaporation to increase its TDS to about 200 g/L and its sulphate ion content of over 60 g/L. The resultant brine is then optionally artificially cooled to a temperature between zero and minus 10° C., to cause a crystal slurry to be formed, which slurry is then dewatered in a separator 918, which maybe as described for 518. The crystals thus separated are subjected to dehydration and drying in a drier 920, which may be as described for 228, to obtain an anhydrous sodium sulphate product. The anhydrous sodium sulphate product preferably has a purity of 90 wt % depending on water and reagent quality. This sodium sulphate product may be further purified to a commercial grade product using conventional purification methods.

A major portion (about 90% by volume) of the residual mother liquor or brine recovered from the separator 918 is transferred to an evaporation pond and concentrated by solar evaporation to give a Specific Gravity (SG) of slightly above 1.20. The brine is then transferred to a shallow crystallisation pond 922.1 to allow crystallisation of sodium chloride. The sodium chloride crystal slurry is separated and dewatered in a stockpile 922.2. The sodium chloride is dried in drying means 922.3, which may employ solar drying or another conventional method. After sodium chloride separation the residual bittern is recycled to the evaporation pond 916.

A sodium chloride salt product is recovered, which has a minimum purity level of 97 wt % depending on water and reagent quality. This product exhibits chemical and physical features comparable to those of commercial grade sodium chloride (NaCl) salt.

A minor portion (about 10% by volume) of the residual mother liquor from the separator 918 is evaporated to dryness in a pond 922 and discarded, thus avoiding a build up of unwanted ions within the system.

Figure 10:
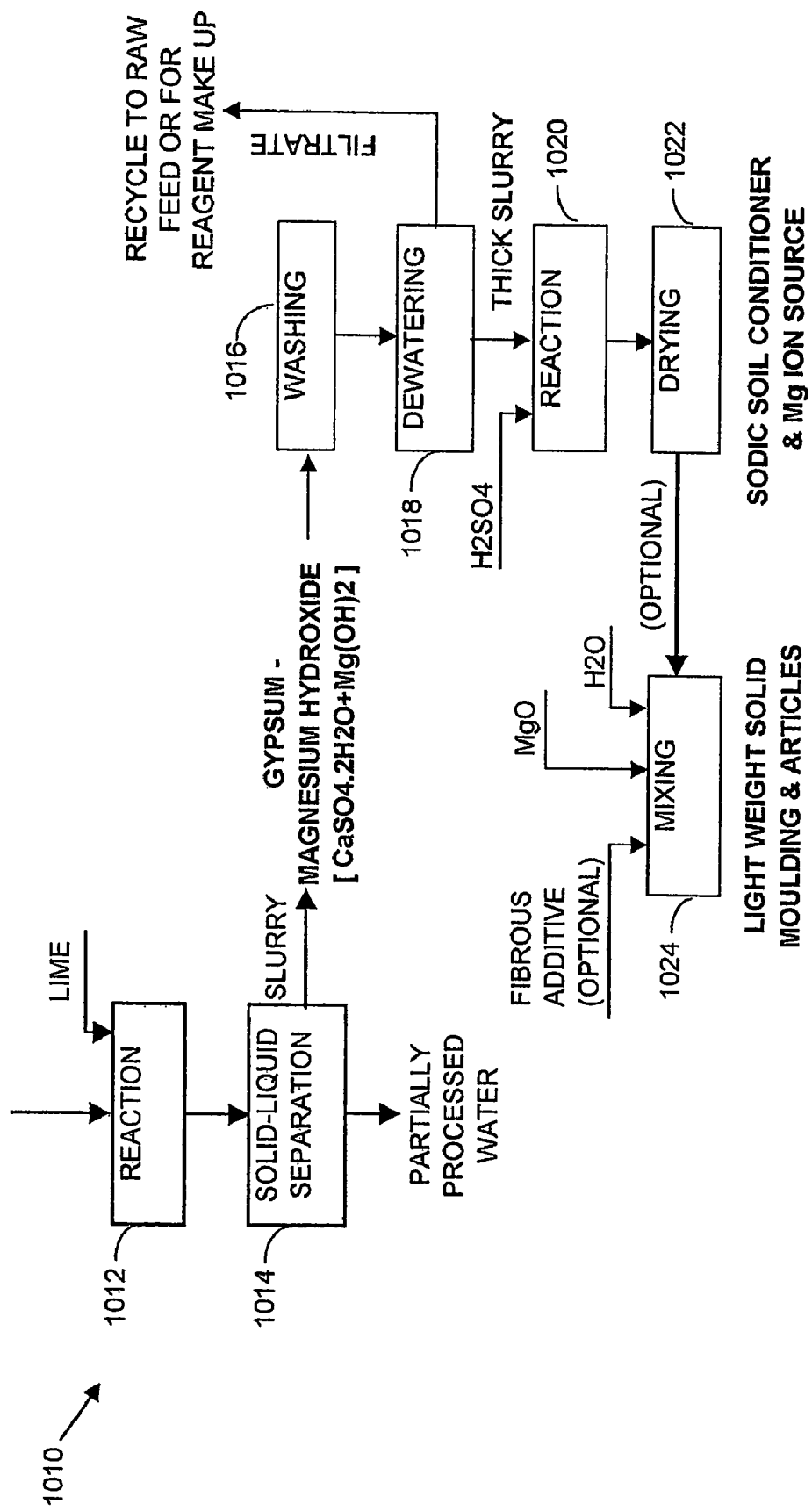
FIG. 10 is a schematic block flow diagram showing another embodiment of a process according to the invention for the treatment of saline impaired water of types 2, 4, 5, 6 and 7, yielding gypsum magnesium hydroxide which may be treated with sulphuric acid to yield a sodic soil conditioner as one product and a substance which may be used for the manufacture of light weight solid moulded articles.

FIG. 10 is a diagrammatic representation of a plant 1010, according to another embodiment of the invention, for the manufacture of an enhanced GMH product.

As in the plant 710 described with reference to FIG. 7, water of any one of types 2, 4, 5, 6, or 7 is reacted with lime in a reactor 1012. The GMH slurry recovered from the separator 1014, or optionally or additionally from the means 714, 814 or 914, is washed in a washing system 1016, which may be the same as described with reference to FIG. 17. The washed GMH slurry is then dewatered in a dewatering unit 1018, which may be as the dewatering unit 214. The dewatered thick slurry or paste is then reacted with a predetermined amount of sulphuric acid in a simple and safe reactor 1020. The amount of acid used may be between 5 and 50% of the stoichiometric amount needed for full conversion of the magnesium hydroxide component of the GMH, according to reaction [12]. The reacted GMH thus formed is dried and dehydrated, in a drying unit 1022, at a temperature between 120° C. and 300° C. The drying temperature to some extent depends on the end use of the material. If it is to be used for making cast or moulded hard setting products, then the temperature is preferably in the range of 200° C. to 300° C. If the reacted GMH is to be used in soil applications, then the temperature may be between 120° C. and 200° C. The dried and treated GMH may be used as a soil conditioner and fertigator providing a slow release of magnesium, calcium and sulfate ions to the soil.

Alternatively, the dried, reacted GMH may be mixed with magnesium oxide (MgO) in a mixer 1024. A pre determined amount of water and optionally fibres may be added to form a paste which is suitable for casting into hard, shaped or moulded products. Alternatively, this paste may also be used as a cement. The paste will react during setting to form a strong, lightweight, hard material.

Figure 11:
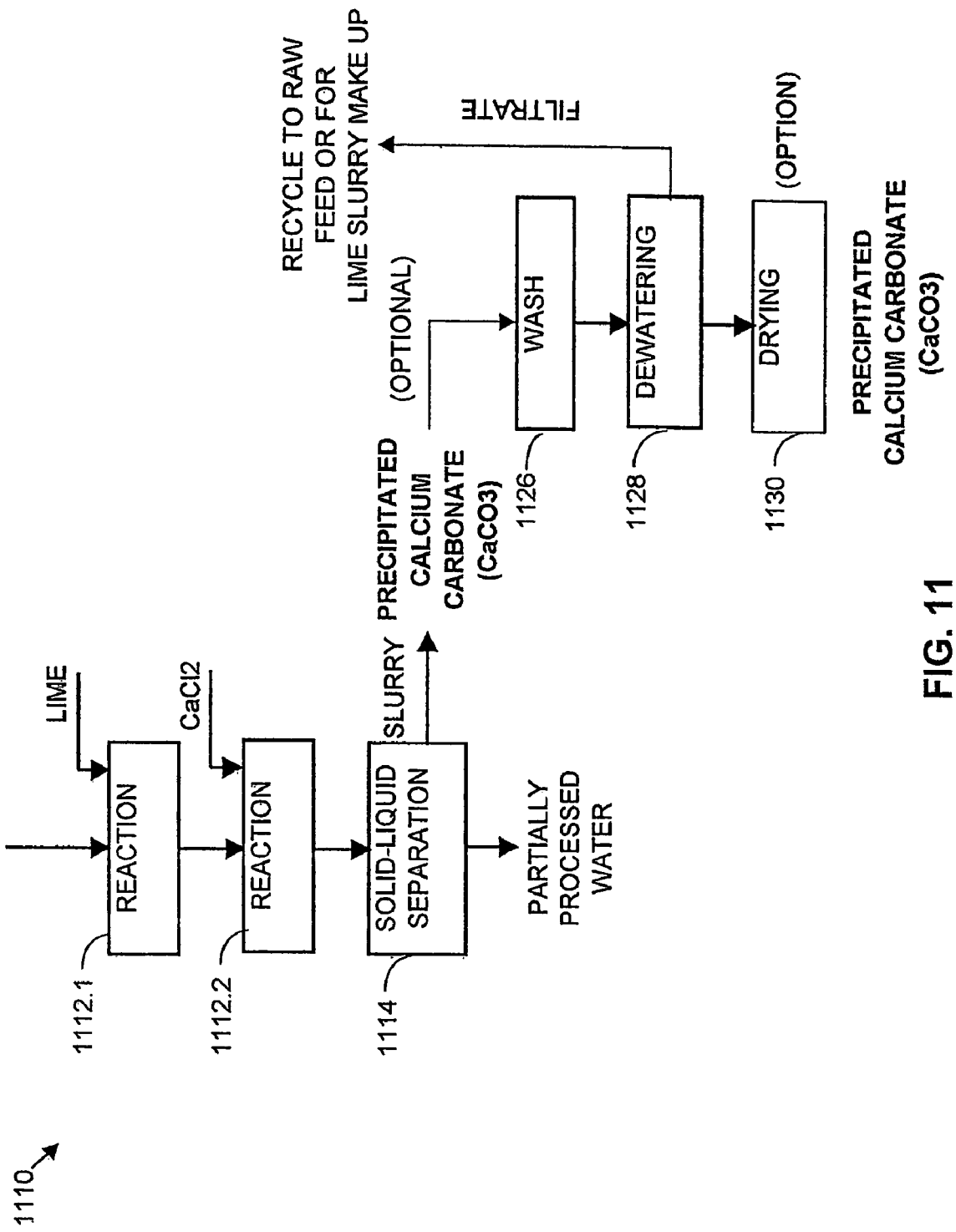
FIG. 11 is a schematic block flow diagram showing another embodiment of a process according to the invention for the treatment of saline impaired water of Type 1, yielding precipitated calcium carbonate (PCC) that has a low saturated slurry pH.

FIG. 11 is a diagrammatic representation of a plant 1110 for applying an alternative means for the production of precipitated calcium carbonate (PCC) that has a lower saturated slurry pH.

As in the case of FIGS. 1 and 2, a saline water belonging to Type 1 is fed to a reaction vessel 1112.1 such as described earlier as means 212 and reacted with milk of hydrated lime to allow formation PCC seed crystals. The amount of lime added is equal to that required to convert 45 to 50% of the stoichiometric amount of bicarbonate ions present in the water to PCC according to reaction [11].

The lime slurry has a 5-20 wt % solids content. High agitation conditions are applied in the reaction vessel 1112.1 for an initial period of up to 30 minutes. The pH of the reaction mixture is maintained between 9 and 11 but preferably between 9.5 and 10.5 whilst the temperature in the reaction vessel is controlled in the range of between ambient water temperature and 55° C. The apparatus for 1112.1 does not include a recycle line and has a residence time of 30 minutes as opposed to a minimum of one hour as described for other reaction steps. The thin slurry thus produced is then transferred to a second reaction vessel 1112.2 and reacted with an aqueous solution of calcium chloride, mixed to 15 to 40 wt % calcium chloride where reaction proceeds according to reaction [2]. The amount of calcium chloride added is determined according to the stoichiometric amount required for full reaction of the carbonate ions present in the partially reacted slurry. High agitation conditions are applied in the reaction vessel 1112.2 for an initial period of up to 30 minutes. The pH of the reaction mixture is maintained between 9.5 and 10.5 whilst the temperature in the reaction vessel is controlled as for the previous reaction step 1112.1. Thereafter, the reaction is allowed to continue for another 30 minutes under the same pH and temperature conditions but at slower agitation, whereafter the contents are transferred to a solid-liquid separation vessel 1114, which may be as described as 214, such as a thickener, for separating the slurry. The slurry is then washed in an appropriate washing means 1126 which may be as described for 224, before it is dewatered in dewatering means 1128, which may be as described for 226 and the washed/thickened slurry is dried to produce a dry product in a drier 1130 which may be as described for 228.

The partially processed water may be processed further as depicted in FIG. 4 from step 416 onwards and as described previously.

Figure 12:
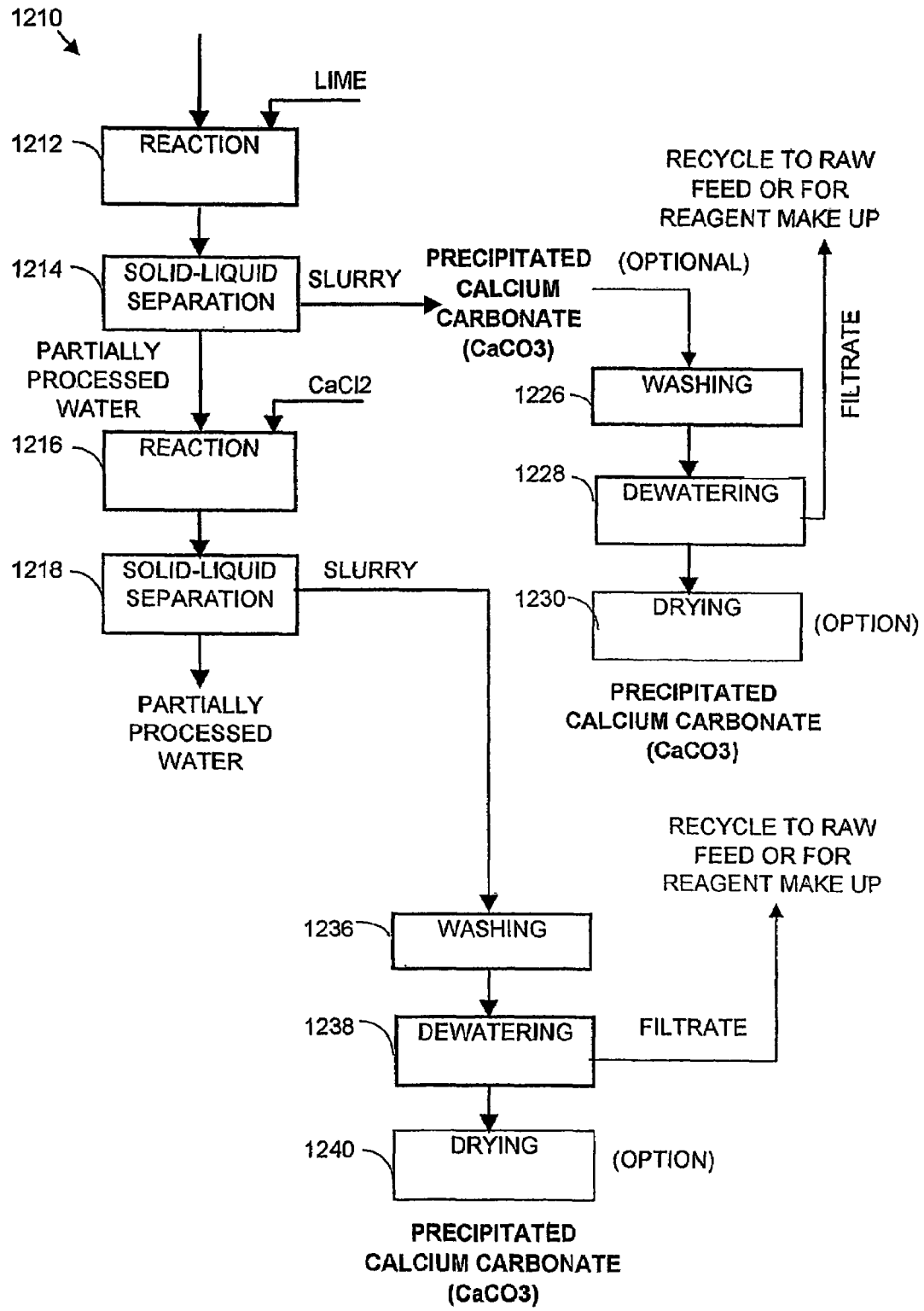
FIG. 12 is a schematic block flow diagram showing another embodiment of a process according to the invention for the treatment of saline impaired water of Type 1, yielding two different grades of precipitated calcium carbonate (PCC)

FIG. 12 is a diagrammatic representation of a plant 1210 for applying an alternative process for the production of precipitated calcium carbonate (PCC) from waters belonging to Type 1. In the plant 1210, two distinctly different PCC products are produced.

The water is fed to a reaction vessel 1212 and reacted with milk of hydrated lime in a slurry form, to cause the formation of a first PCC product. The amount of lime added is equal to that required to convert 45 to 50% of the stoichiometric amount of bicarbonate ions present in the water to PCC according to reaction [11]. The lime slurry has a 5-20 wt % solids content. High agitation conditions are applied in the reaction vessel 1212 for an initial period of up to 30 minutes. The pH of the reaction mixture is maintained between 9 and 11 but preferably between 10 and 11 whilst the temperature in the reaction vessel is controlled between ambient and 55° C. Thereafter, the reaction is allowed to continue for another 30 minutes under the same pH and temperature conditions but at slower agitation, whereafter the contents are transferred to a solid-liquid separation vessel such as a thickener 1214, for separating the slurry. The slurry is then washed in an appropriate washing means 1226 which may be as described for 224, before it is dewatered in dewatering means 1228, which may be as described for 226. The washed and thickened slurry is dried in a drier 1230 to produce a dry PCC product.

The partially processed water from the solid-liquid separation vessel 1214 is then transferred to a second reactor 1216 and reacted with an aqueous solution of calcium chloride, having a concentration of 15 to 40 wt % calcium chloride, according to reaction [2]. The amount of calcium chloride added is determined according to the stoichiometric amount required for complete removal of carbonate ions present in the partially processed water. High agitation conditions are applied in the reactor 1216 for an initial period of up to 30 minutes. The pH of the reaction mixture is maintained between 6 and 8 whilst the temperature in the reactor is controlled in the range between ambient and 55° C. Thereafter, the reaction is allowed to continue for another 30 minutes under the same pH and temperature conditions but at slower agitation, whereafter the contents are transferred to a solid-liquid separation vessel 1218, such as a thickener, for separating the slurry. The slurry is then washed in an appropriate washing means 1236 which may be as described for 224, before it is dewatered in dewatering means 1238, which may be as described for 226. The washed and thickened slurry is dried to produce a dry product in a drier 1240 which may be as described for 228.

The partially processed water from the solid-liquid separation vessel 1218 may be processed further as described in relation to FIG. 4, from the evaporation pond 416 onwards.

FIG. 13 shows, by way of non-limiting example, an embodiment of a reactor train 30 forming part of an apparatus according to the invention, for contacting water with the first reagent.

The reactor train 30 comprises a first reactor 30.1, a second reactor 30.2 and a third reactor 30.3 operatively interconnected by pipes 32 (interconnecting the bottom of the first reactor 30.1 with the bottom of the second reactor 30.2) and 34 (interconnecting the bottom of the second reactor 30.2 with the bottom of the third reactor 30.3). After a water stream 36 has been contacted with a reagent 38 in the first reactor 30.1, the partially processed water flows to the second reactor 30.2, and then, finally, to the third reactor 30.3.

The third reactor 30.3 is provided with a discharge line 40 from which a portion of the thin slurry thus produced in the reactors may be recycled, via a control valve 42 and a line 44, to the first reactor 30.1, to provide seed crystals.

Mixers 46.1, 46.2 and 46.3 are provided to provide agitation in the reactors 30.1, 30.2 and 30.3.

A thin slurry 48 containing the first product in precipitated from, is recovered from the third reactor 30.3.

A portion of the thin slurry 48 from the third reactor 30.3 may be recycled to the first reactor 30.1 as aforementioned, to assist with seeding of the crystallisation, so as to improve the mean particle size of the crystals, to reduce the particle size spread, to provide a substrate upon which the precipitation of further particles can take place and to promote the completion of the crystallisation.

By using multiple reactors in series it is also possible to control individual mixer speeds and thus to enable different mixing speeds at different stages in the reaction process.

Figure 14:
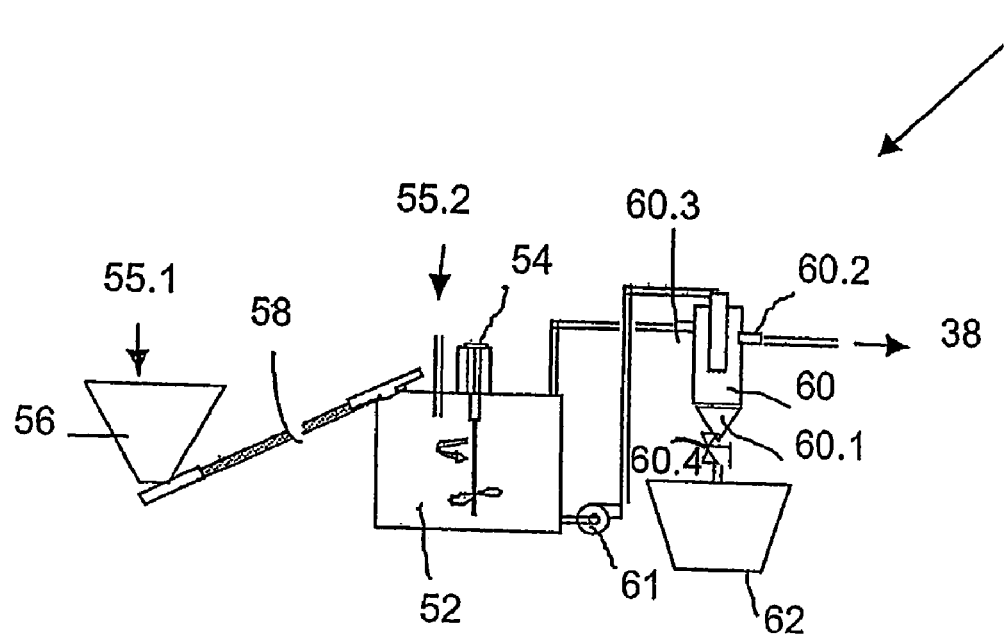
FIG. 14 is a diagrammatic representation of a lime slaking or reagent preparation apparatus forming part of an apparatus in accordance with invention.

FIG. 14 shows an apparatus 50 for preparing lime slurry for use in the process and apparatus of the invention.

The lime mixing apparatus 50 comprises a lime slaker 52 which is provided with a mixer 54 for the batch wise mixing, as and when required, of dry lime 55.1 and water 55.2 in a ratio such as to form a pumpable slurry or milk, and thence dosed to the reactor 30.1. The lime mixing apparatus 50 further comprises a feed hopper 56 and a conveyor 58 to feed lime to the lime slaker 52, and an automatic makeup facility (not shown) based on tank level.

The solids content of the lime slurry is preferably controlled to be in the range of about 5 wt % to about 20 wt %.

The lime mixing apparatus 50 includes a classifier 60 fed by a high speed pump 61 taking suction from the bottom of the lime slaker 52. In the classifier 60, coarse lime and sand particles are removed by settling from the water and lime mixture. The classifier 60 is a cylindrical vessel and has a conical bottom outlet 60.1, where the coarse lime and sand are collected before being discharged to a waste bin 62.

The classifier 60 is designed to give a mean residence time of about 1 to 3 minutes. The classifier has oppositely placed overflows 60.2, 60.3 set to allow sufficient lime slurry to be dosed to the reactor 30.1 from the overflow 60.2, via a reagent metering pump (not shown) and still allow the bulk of the lime slurry to return to the lime slaker 52 via the overflow 60.3. In order to achieve this arrangement, the overflows 60.2 and 60.3 are preferably tubular and the centre of the overflow 60.2 is preferably located at a position about three quarters of the height of the classifier 60, whilst the distance that a lower region of the overflow 60.3 is positioned above an upper region of the overflow 60.2 is about the same as the diameter of the overflow 60.3.

The classifier 60 is fitted with a bottom valve 60.4 which can be periodically opened manually or by an automatic timer (not shown) to allow discharge of the accumulated siliceous and course material to the waste bin 62. The siliceous waste discharged into the waste bin 62 may be used as an agricultural grade lime for soil conditioning.

The base angle of the classifier is preferably less than 90°.

FIG. 15 shows a thickener 70 for solid liquid separation of the reaction mixture recovered from the reaction vessels 114, 214, 314, 414, 514, 614, 714, 814, 914, 1014, 1114 and 1214 respectively of FIGS. 1 to 12.

The thickener 70 may conveniently be a simple, vertical, high rate, rakeless cylindrical vessel 70.1 having a conically shaped bottom 70.2, wherein the height to diameter ratio is greater than 2 and, the conical bottom angle is less than 90°. The thickener 70 contains internally suspended cones 70.3 to aid separation and flow within the unit.

After reaction in a reactor vessel or train such as means 112, a slurry consisting of the partially processed water and a precipitated solid product are introduced into the thickener 70 as a slurry 71. A flocculant or coagulant solution 72 is added to enhance separation of the solids from the liquid.

An overflow 73 is recovered from the thickener 70, and is further treated as is described in relation to the process according to the invention.

An underflow 74 contains a thickened slurry product, which may be the first product as is also referred to in relation to the process according to the invention.

An injection point 75 is provided in the underflow line, as it leaves the bottom 70.2 of the thickener, so that high pressure water or air may from time to time be injected into the thickener 70, in order to clean the conical bottom 70.2, or to dislodge solids sticking to its inner surface.

As an alternative to the thickener 70, a separator as described in U.S. Pat. No. 6,183,634 (Bateman Process Equipment Limited) may be used.

FIG. 16 diagrammatically shows a system 80 of evaporation ponds for use with the apparatus and process of the invention.

The system 80 comprises a first shallow enhanced evaporation pond 82, a deep solar salinity gradient pond 84 and a second shallow enhanced evaporation pond 86.

Partially processed water is fed to the first enhanced evaporation pond 82 at 81. After concentration in the first enhanced evaporation pond 82, the partially processed water is allowed to flow, under gravity and via a line 83, to the deep solar salinity gradient pond 84. From the deep solar salinity gradient pond 84, the concentrated partially processed water is pumped from the bottom of pond 84 to the second enhanced evaporation pond 86 via a line 85.

After concentration in the second enhanced evaporation pond 86, the resulting concentrated (and pregnant) brine is transferred to a crystalliser, via a line 87. The contents of the first and second enhanced evaporation ponds 82, 86 are circulated by means of centrifugal circulating pumps 88.1, 88.2, and sprayed through spray nozzles (not shown) located on tubes supported by towers 82.1, 82.2, 82.3, 82.4 and 86.1, 86.2, 86.3, 86.4 provided over the surfaces of the first and second enhanced evaporation ponds 82, 86 respectively, to increase the area available for evaporation of water. The water is distributed via a system of tubes provided with nozzles adapted to spray the water in the form of fine droplets. The height of each tower is pre determined according to local atmospheric conditions but is typically between 5 and 30 m. The water thus falling to the surface of the pond is collected in a sump and is then recycled to the spray system via the centrifugal pumps 88.1, 88.2.

The depths of the first and second enhanced evaporation ponds 82, 86 from the floor of the pond to the top of the bund should preferably be less than 0.6 m with the ratio of the height to the width of the bund separating the evaporation ponds being about 1:2. The bunds are preferably stabilised by either geo-textiles or gravel beds.

FIG. 17 shows a continuous, countercurrent, washing apparatus 90 which may be used to wash a PCC, MH, GMH or MCL products recovered from the process and apparatus of the invention.

The washing apparatus 90 comprises three high rate vertical rakeless thickeners 91, 92, 93 having top inlets 91.1, 92.1, 93.1, underflow outlets 91.2, 92.2, 93.2 and overflow outlets 91.3, 92.3, 93.3 which are separated from the top inlets 91.1, 92.1 93.1. The thickeners 91, 92, 93 are arranged in countercurrent fashion.

The thickeners 91, 92, 93 are interconnected to one another in such a way that the unwashed slurry 94, introduced into the inlet 91.1 of the thickener 91, is contacted with overflow 92.3 from the thickener 92, whilst the partially washed slurry recovered as underflow 91.2 from the thickener 91, which is introduced into the inlet 92.1 of the thickener 92, is contacted with overflow 93.3 from the thickener 93.

Similarly, the underflow 92.2 from the thickener 92 is contacted with the fresh wash water 95. The underflow from the thickener 93 is a washed product 96 and may be dewatered and dried. Optionally the washed product 96 may be stored in a wet condition.

Spent wash water 97 is returned to the process for treatment.

A flocculant or coagulant solution 98 may be added into any of the thickeners 91, 92, 93 through a line 99, in order to enhance washing of the product.

Figure 18:
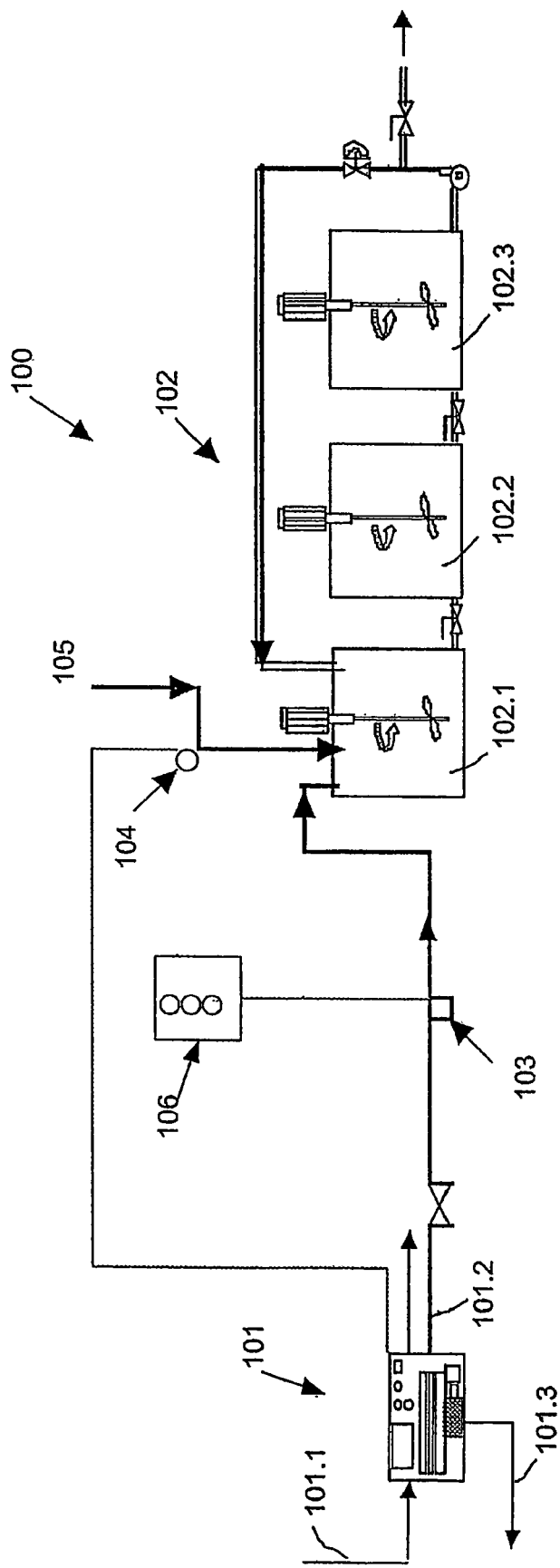
FIG. 18 is a diagrammatic representation of an embodiment of a process in accordance with the invention, linking a reverse osmosis (RO) plant with other apparatus of the invention.

FIG. 18 is a diagrammatic representation of an apparatus 100 incorporating a reverse osmosis (RO) plant 101.

The reverse osmosis plant 101 is a conventional RO desalination plant, for the treatment of a water 101.1 of water types 1 to 5. The reverse osmosis plant 101 is linked to a reactor train 102 as described above in relation to FIG. 13. The reactor train comprises mixed reactors 102.1, 102.2 and 102.3.

Concentrate 101.2 from the reverse osmosis plant 101 is piped directly to the reactor train 102, via an in-line flow meter 103. Permeate 101.3 is piped to where it is required as desalinated water.

A dosing pump 104 is provided to deliver first reactant 105 to the reactor 102.1. The dosing pump 104 may be a hose pump, a diaphragm dosing pump, a helical rotor pump, or some other suitable pump. The dosing pump 104 is controlled by an electronic signal either directly from the reverse osmosis plant 101 (Option A) or from the flow meter 103 which sends a signal either directly to the dosing pump 104 (Option B) or via a central control system such as a PLC or SCADA system indicated by the reference numeral 106 (Option C). This signal, which may be a pulse, is related to the flow of concentrate 101.2 from the reverse osmosis plant 101 to the reactor train 102. The dosage rate of the first reactant 105 may thus be proportionally controlled from this signal to ensure accurate dosage of the first reactant 105 to the reactor 102.1, to ensure that the required level of conversion is achieved.

Figure 19:
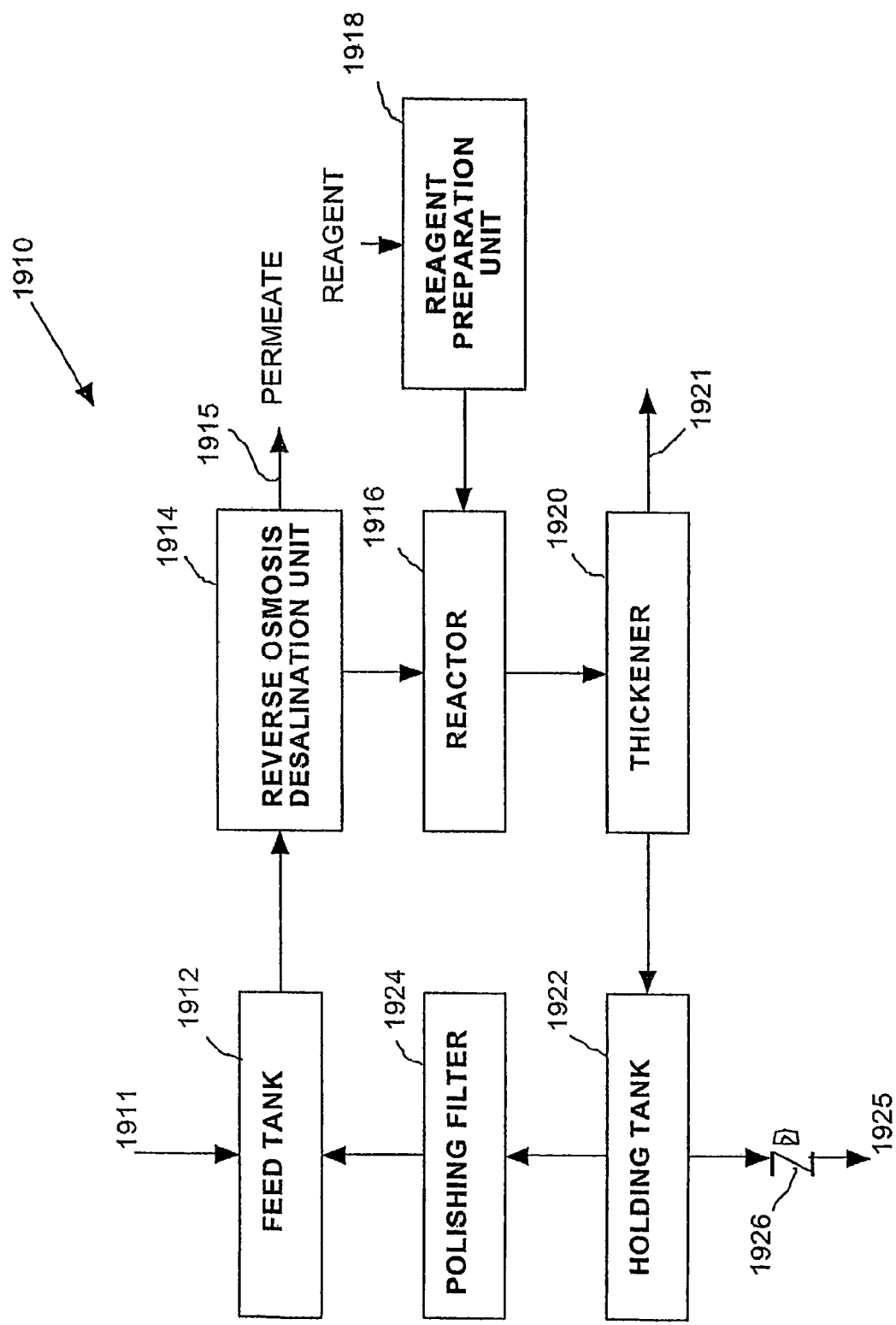
FIG. 19 is a schematic block flow diagram showing a process in accordance with the invention, in which foulants are removed from the recycled concentrate of a reverse osmosis plant in order to maximise recovery of permeate prior to use of the concentrate as feedstock to the invention.

FIG. 19 is a schematic block flow diagram of a further embodiment of a pre-treatment plant 1910 for carrying out a process in accordance with the invention, in which foulants are removed from the concentrate of a reverse osmosis plant.

Water 1911 to the plant 1910 is introduced to a feed tank 1912 for homogenisation. The water 1911 is blended with water returning from a polishing filter 1924. The blended water is then fed to an RO desalination unit 1914 which produces permeate fresh water 1915 which may be used for a variety of purposes, including product washing as described in relation to FIG. 17, or for reagent make-up.

The concentrate from the RO desalination unit 1914 is transferred to a reactor 1916 which may be similar to the reactor 212. A reagent is prepared in a reagent preparation unit 1918. The reagent, which may be calcium chloride, sodium carbonate, calcium hydroxide, calcium oxide, magnesium hydroxide or a combination thereof is introduced into the reactor 1916 at a pre determined dosing rate, selected such as to react with certain ions in the concentrate, causing removal thereof. The ions may include calcium, iron, manganese, bicarbonate, carbonate, nickel, arsenic, barium and strontium. Silica may also be removed.

The thin slurry formed in the reactor 1916 is transferred to a thickener 1920 which may be the same as the thickener 214. The thickened slurry 1921 produced in the thickener 1920 may be further treated for value adding or disposed of.

The partially processed water from the thickener 1920 is transferred to a holding tank 1922 before being pumped to the feed tank 1912 through a polishing filter 1924.

A bleed 1925 from the pre-treatment plant 1910 may be used as water to the reactor 112 as shown in FIG. 1.

The pre-treatment plant 1910 may be used for the removal of foulants while improving a recycle stream to an RO desalination plant and thus for the reduction of the volume of concentrate.

The bleed stream 1925 is controlled by a control valve 1926.

The pre-treatment plant 1910 allows the recycling of concentrate to the feed 1911 of the RO desalination unit 1914 to achieve greater efficiencies of recovery. This results in a reduced volume of concentrate to subsequent processing stages. By removing selected ions mid cycle the concentration of species likely to cause fouling of the RO membranes can be avoided.

Figure 20:
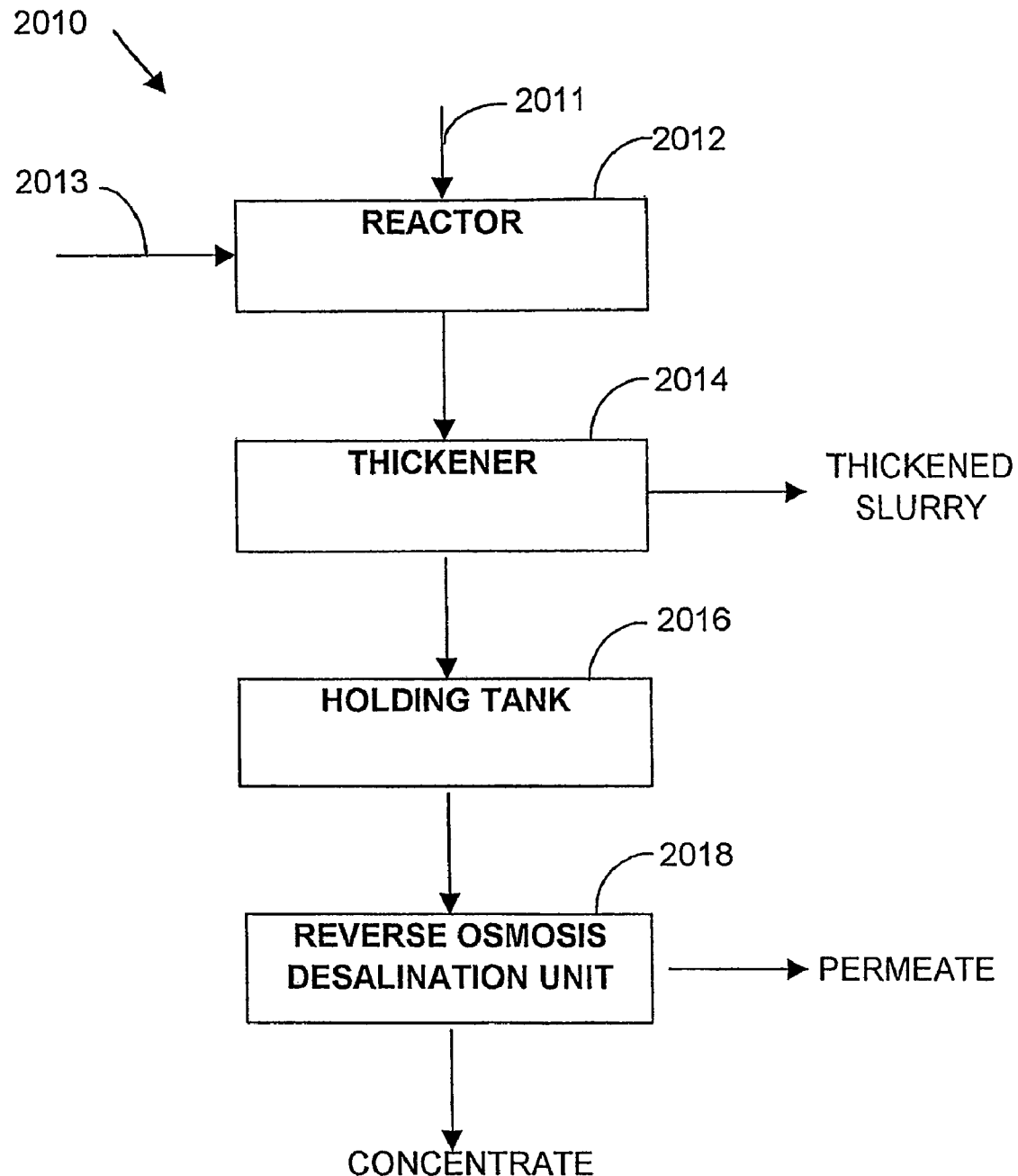
FIG. 20 is a schematic representation of another embodiment of a process in accordance with the invention to improve the operation of reverse osmosis (RO) desalination by pre-treatment of water with a recycle of the products generated by the invention.

FIG. 20 is a diagrammatic representation of another embodiment of a plant 2010 for carrying out a process in accordance with the invention, in which water to a reverse osmosis plant 2018 is pre-treated to remove contaminants, employing the teachings of the present invention.

Water of water types 2, 4 or 5 is fed to a reactor 2012.

In the reactor 2012, the RO concentrate 2011 is contacted with magnesium hydroxide 2013 which may have been produced by the apparatus shown as 610 in FIG. 6 or 710 in FIG. 7. The magnesium hydroxide 2013 may be mixed with a small amount of lime, magnesium chloride, sodium carbonate, or a combination thereof, to enhance the removal of unwanted ionic species. The thin slurry thus formed is transferred to a thickener 2014 which may the same as the thickener 214. The thickened slurry from this thickener 2014 may be further processed to a useable product or it may be disposed of The partially processed water from the thickener 2014 is transferred to a tank or pond 2016 and is then used as water to an RO desalination unit 2018. The concentrate from the RO desalination unit 2018 is then used as water for further processing in a plant 610 as shown in FIG. 6 or 710 as shown in FIG. 7. The permeate is used as a water of reduced TDS content.

Figure 21:
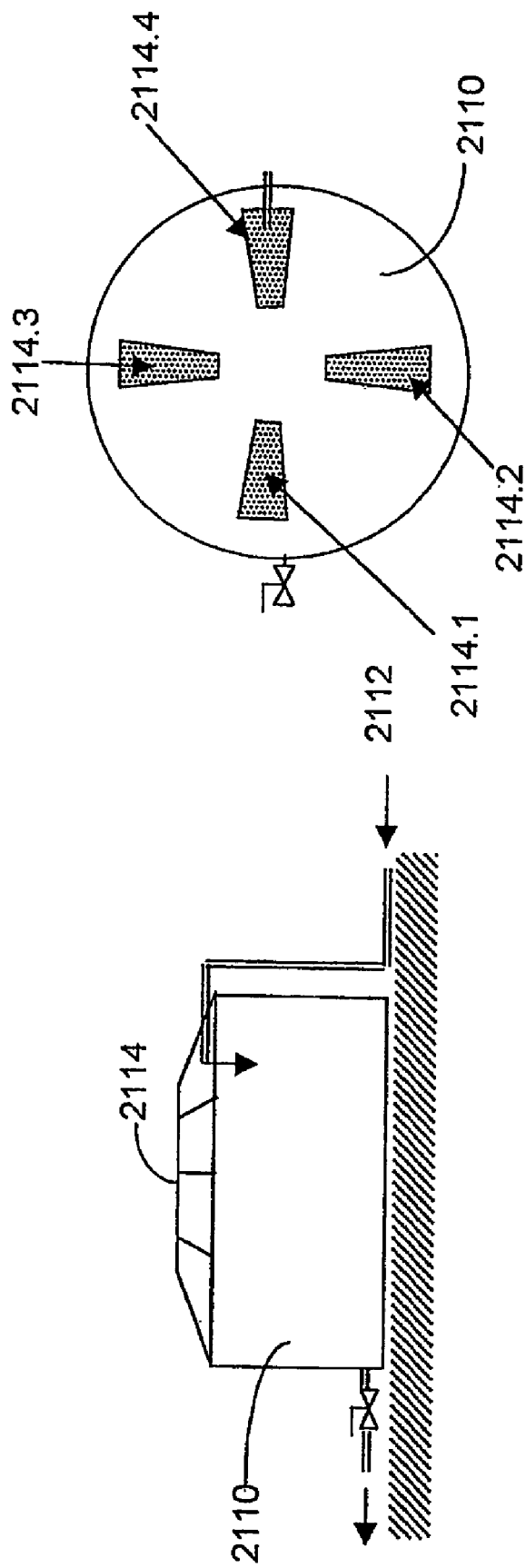
FIGS. 21(a) and 21(b) respectively show a side view and a plan view of a break or degassing tank for stripping dissolved methane gas from water drawn from an underground aquifer in a methane bearing formation prior to use of said water in the invention.

FIGS. 21(a) and 21(b) show how a break or degassing tank may be employed to deal with flammable gases, such as methane, dissolved in water obtained from underground aquifers. Where the saline impaired water is drawn from an underground aquifer which has been in contact with methane gas bearing formations, the water, when brought to the surface, may contain in solution methane gas which may potentially be explosive in a plant environment. In such event, it is desirable to strip the gas from the water. In order to treat such water, a break tank or vessel 2110 as is shown in FIGS. 21(a) and 21(b) may be used to reduce the amount of entrained gas to safe levels.

The break tank 2110 allows incoming water 2112 to cascade to the surface of the bulk of the water in the tank 2110, thus providing some aeration. The tank 2110 is provided with a roof 2114. Openings 2114.1, 2114.2, 2114.3, 2114.4 are provided in the roof 2114 to allow the escape of flammable gases. The combined total area of the openings 2114.1, 2114.2, 2114.3, 2114.4 constitutes about a 10% portion of the total area of the roof.

The water may be retained within the tank 2110 for a period of up to three hours or more depending on the concentration of dissolved methane gas in the water. After the required holding time so as to ensure that the flammable gas content of the water has been reduced to a safe level, the water may be treated in accordance with the invention.

Figure 22:
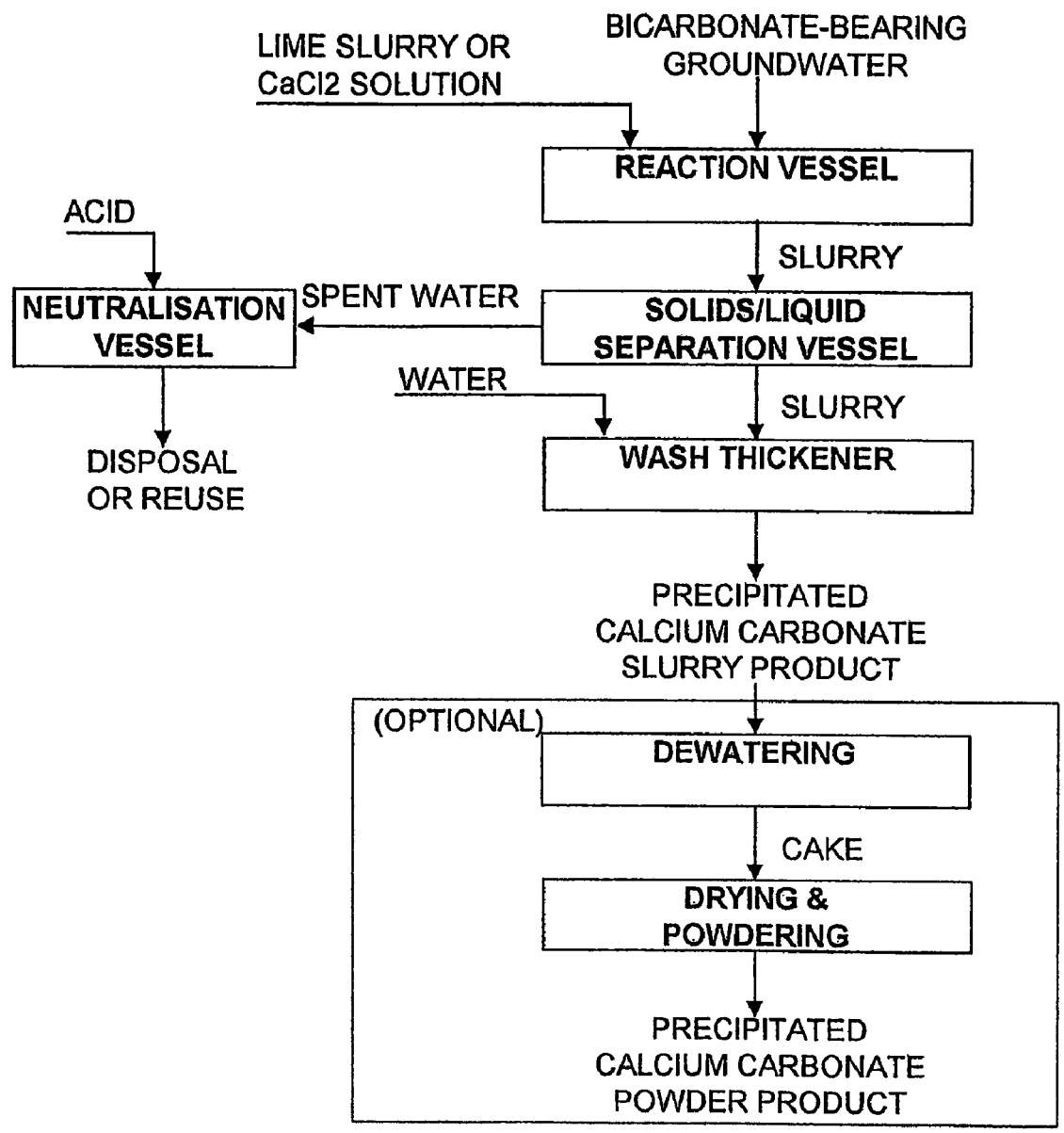
FIG. 22 is a schematic representation of another embodiment of a process in accordance with the invention for the manufacture of PCC.

FIG. 22 shows a schematic representation of another embodiment of a process in accordance with the invention, for the manufacture of PCC.

According to that embodiment of the invention, there is disclosed a common process for the manufacture of PCC compounds from the above-described ground water types, comprising the process steps shown in FIG. 22 and described below:

(a) if required, pre-concentration of the raw ground water solution by natural evaporation or artificial means, to adjust bicarbonate ($HCO_3$) ion concentration in the solution to between 1 g/L and 15 g/L $HCO_3$;

(b) reaction of the raw ground water or pretreated feed solution with hydrated lime slurry or calcium chloride ($CaCl_2$) solution, under constant stirring conditions at temperatures 30° C. or higher, to allow formation of a slurry due to nucleation of fine grain calcium carbonate crystals;

(c) transfer of the slurry to a solids/liquid separation vessel to allow proportional removal of the decarbonated supernatant (spent water) to a neutralisation vessel, followed by pH adjustment to around pH 7 by adding acid, and re-use or disposal of the resultant neutralised water;

(d) transfer of the slurry to a wash thickener vessel, washing the slurry first with fresh water to remove excess dissolved salts, followed by thickening to obtain a precipitated calcium carbonate slurry product;

(e) optionally and depending on market requirements, as indicated in FIG. 22, further dewatering of the precipitated calcium carbonate slurry product (in "d") to obtain a cake, which is dried and powdered to obtain a precipitated calcium carbonate powder product.

The resultant PCC products, in final slurry forms or optionally in dry powder forms, are comprised of micro-crystalline calcium carbonate minerals and mineral particles, having particle morphologies suitable for various industrial applications.

In summary, this embodiment offers a simple way for the manufacture of precipitated calcium carbonate (PCC) products, in either slurry or powder forms, with both achieving product specifications suitable for application as a pigment, for example, in paper coating or for production of plastics, paint and rubber, adhesives and sealants.

Figure 23:
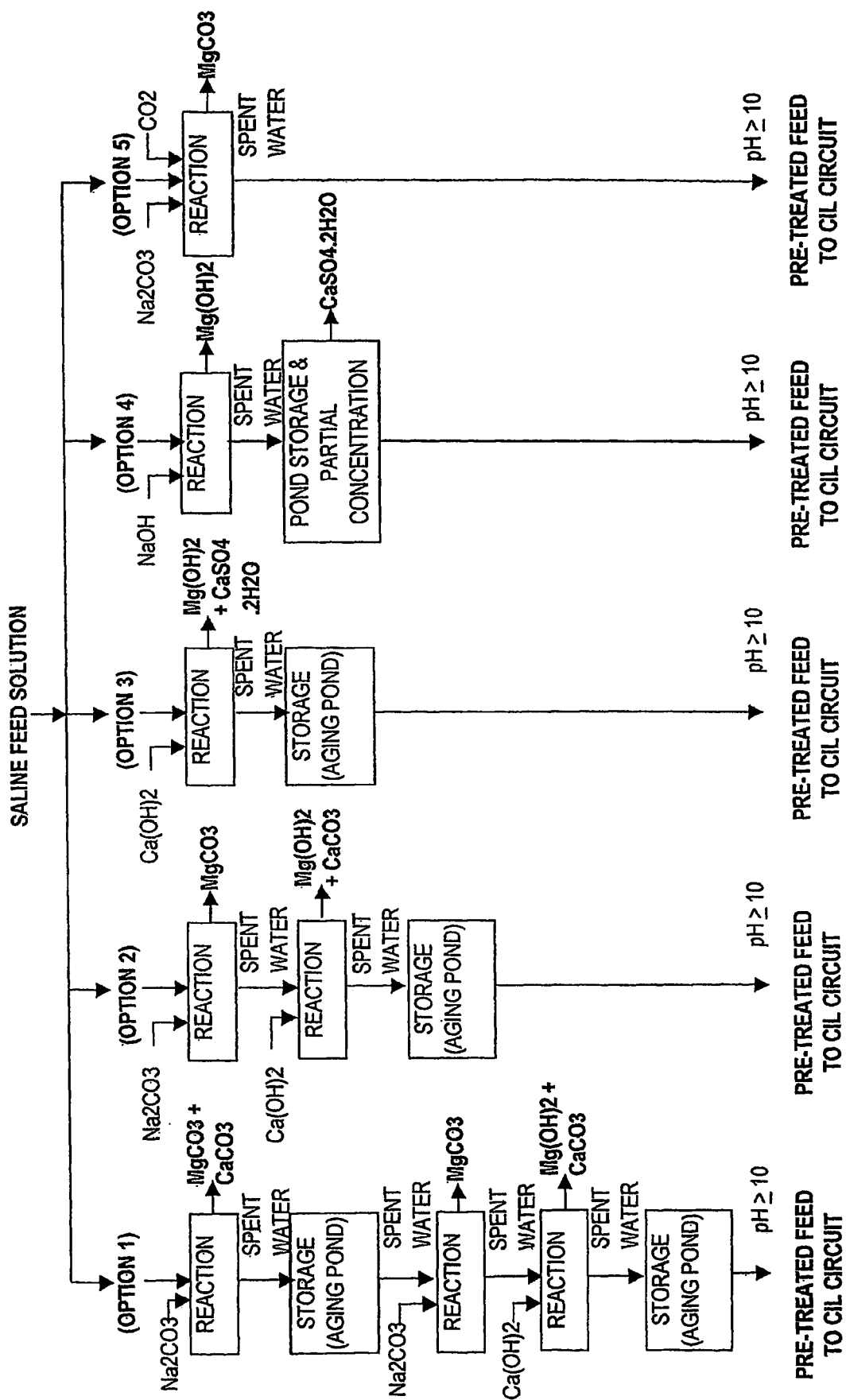
FIG. 23 is a schematic representation of five alternative options for the treatment of a saline feed solution.

FIG. 23 shows a schematic representation of five alternative options for the treatment of a saline feed solution.

This embodiment of the invention relates to the pre-treatment of saline process water for use in gold mining operation, and particularly, for efficient operation of CIL circuits used in the recovery of gold from the ore material. This embodiment also offers the added advantage of generating one or more chemical products of value, which products may be used by mining, mineral processing and related industries or alternatively used for mine site rehabilitation or sold as chemicals of commercial value for cost recovery and/or generation of revenue. Accordingly, one aspect of this embodiment relates to alternative methods for pre-treatment of saline water for use by gold mining industry to improve the operation of CIL circuits and reduce the costs associated with excessive use of lime, and another aspect of the invention relates to generation and sale of useful chemical products for cost recovery and generation of revenue.

Because of limitations with a secure access to fresh or brackish water resource, the bulk of water used for processing of ore in CIL circuit of many gold mines in Australia and elsewhere is comprised of highly saline water of largely groundwater origin that is generated on site by mining operation or recovered by pumping from local saline aquifers. Apart from sodium (Na) and chloride (Cl) ions as the main ionic constituents, these saline waters are also commonly characterised by elevated concentration of magnesium (Mg) and sulphate ($SO_4$) ions in dissolved form. A major problem in processing of gold-bearing ores relates to the need for highly alkaline (high pH) process water to achieve satisfactory gold recovery rates from the CIL circuit. The elevated concentration of Mg ion inherent in most natural saline waters has a pH buffering effect and hence reduces the efficiency of cyanide leach process and hence the gold recovery rates. To negate the buffering effect of high Mg concentration in the feed water, conventionally, large quantities of hydrated lime is added either to grounded ore or to water-ore slurry to ensure the pH of elution water is maintained at 10 or over. However, apart from the added cost of excessive lime addition to achieve the desired pH levels, this practice also generates other significant operational problems, added costs and environmental risks, including but not limited to: (a) inefficiency of the overall process in terms of progressive decrease in gold recovery rates, (b) reaction of calcium (Ca) ion from the added lime with SO4 in the saline feed leading to precipitation of gypsum ($CaSO_4.2H_2O$) mineral through the process as well as encrusting the circuit equipment, consequentially causing significant scaling/fouling/corrosion problems, and thus adding to the plant maintenance and downtime costs, (c) cyanide gas breakout in plant environment by dropout of pH which is a cause of industry and community concern and negates the objectives of the International Cyanide Management Code for improved cyanide management by gold mining industry.

It is accordingly a prime object of the present embodiment to provide alternative methods for pre-treatment of saline water used in processing of gold-bearing ores in order to achieve one or more of the following outcomes in a cost-effective and environmentally safe and sustainable manner:

(a) remove the bulk of dissolved Mg ion in the saline water to achieve a pH of 10 or higher for the elution water, (b) remove gypsum formation in the feed to CIL circuit and avoid gypsum fouling in the follow up steps, and (c) where possible, recover valuable chemical compounds from the feed pre-treatment process.

The saline feed solutions used by gold mining industry, and the subject of this application, are saline or hyper-saline solutions of largely ground water origin having total dissolved solids two or more fold higher than that of standard seawater, and characterised by elevated concentration of Mg and $SO_4$ ions but relatively low to moderate concentration of calcium (Ca), and carbonate and bicarbonate ($HCO_3+CO_3$) species.

According to the present embodiment there are five (5) options for pre-treating the above-described saline water types, comprising the process steps shown in FIG. 23 and described below:

(Pre-Treatment Option 1)

(a) reaction of the raw saline water with $Na_2CO_3$ under constant stirring conditions for a prescribed length of time to allow formation of a slurry, which slurry is then washed and dewatered to obtain a useable compound composed of $MgCO_3$ and $CaCO_3$ minerals;

(b) storage of the spent water in a pond or a container to allow aeration and aging of the water;

(c) reaction of the aged water with $Na_2CO_3$ to produce a slurry, which slurry is washed and then dewatered to produce a high grade product composed of $MgCO_3$ minerals;

(d) transfer of the spent water from the $MgCO_3$ production circuit to a reaction vessel and addition of lime slurry $[Ca(OH)_2]$ first under fast and then slow mixing conditions to form a slurry, which slurry is then washed and dewatered to produce a compound of desired thickness, comprised of $Mg(OH)_2$ and $CaCO_3$ minerals; and (e) transfer of the spent water from the $Mg(OH)_2+CaCO_3$ production circuit to a storage pond or a container to allow the solution to mature by aeration, which solution can then be fed directly to the CIL circuit.

(Pre-Treatment Option 2)
(a) reaction of the raw saline water with $Na_2CO_3$ as per step "a" of the Option 1, disclosed above;
(b) reaction of the spent water with lime slurry as per step "d" of the Option 1, disclosed above; and
(c) storage and aging of the spent water, as per step "e" of the Option 1, disclosed above, which solution can then be fed directly to the CIL circuit.

(Pre-Treatment Option 3)
(a) reaction of the raw saline water with lime slurry as per step "d" of the Option 1, disclosed above; and
(b) storage and aging of the spent water, as per step "e" of the Option 1, disclosed above, which solution can then be fed directly to the CIL circuit.

(Pre-Treatment Option 4)
(a) reaction of the raw saline water with NaOH under constant stirring conditions for a prescribed length of time to allow formation of a slurry, which slurry is then washed and dewatered to obtain a useable compound composed of $Mg(OH)_2$ minerals;
(b) transfer of the spent water from $Mg(OH)_2$ production circuit to a storage pond or a container to allow the solution to mature by aeration, which solution can then be fed directly to the CIL circuit.

(Pre-Treatment Option 5)
(a) reaction of the raw saline water with $Na_2CO_3$ while bubbling the solution with $CO_2$ gas, under constant stirring conditions for a prescribed length of time to allow formation of a slurry, which slurry is then washed and dewatered to obtain a useable compound composed of $MgCO_3$ minerals, and the spent water fed directly to the CIL circuit.

The process routes according to this embodiment offer a broad range of options for the pre-treatment of various saline water streams for use by mining and mineral processing industry for effective and sustainable recovery of gold from ore material using saline feed, CIL process or similar gold recovery methods. Having considered the desired pH level of the elution water, and following the prescribed process steps in one of the disclosed pre-treatment options, significant advantages, can be achieved.

In summary, this embodiment offers five (5) simple and effective methods for the pre-treatment of saline streams, characterised by elevated concentration of Mg and $SO_4$ ions, for the generation of quality process water for cost effective and sustainable operation of gold recovery from ore material, particularly in the CIL and similar leach processes where elevated pH of feed medium is essential.

The above description of the invention with reference to the accompanying drawings and the exemplification of the invention which follows below represent only some of the many ways in which the process and apparatus of the invention may be realised. It is to be understood that the invention includes within its scope any portion of any of the above described processes and apparatus optionally combined either wholly or partially with any one or more of the other processes so as to achieve a particular objective in producing useable products, to treat a particular saline impaired water to minimise or obviate discharge or to prepare or pre-treat a water stream for a particular use.

EXAMPLES

Example 1

One thousand liters of saline impaired water from a ground water source, which analysed as having 3700 mg/L sodium, 74 mg/L potassium, 120 mg/L magnesium, 49 mg/L calcium, 8540 mg/L bicarbonate, 144 mg/L sulphate, 550 mg/L chloride and determined as having 13.2 g/L TDS, was reacted with a hydrated lime slurry under strong agitation for 60 minutes according to reaction [1]. The lime slurry used contained 10 wt % solids. After reaction, the slurry so produced was separated and thickened in a thickener. The thickened slurry from the under flow was then washed in a 3 stage counter current washing unit at a volume ratio of 5 parts of washing water to 1 part of thickened slurry. The washed slurry was dried giving 13.2 kg of precipitated calcium carbonate (PCC) comprising 98.7 wt % $CaCO_3$, 0.5 wt % $Mg(OH)_2$, 0.3 wt % NaCl and 0.5 wt % moisture content, and having a particle size within the range of 0.5-1.0 micron.

The partially processed water (over flow of the main thickener), was further concentrated in a solar evaporation pond to a brine having a salinity of 375 g/L TDS, reducing the total volume to around 16 liters. The brine was then transferred to an evaporator and heated at 80-90° C. to promote evaporation and increase the TDS to about 400 g/L and to reduce the total volume to about 10 liters. The hot bittern was then transferred to a shallow container and allowed to cool down to ambient temperature. Hydrous sodium hydroxide crystals (with 4 crystallisation waters) were deposited on the bottom of the container. The hydrous sodium hydroxide after drying at 55° C. measured 9.5 Kg. The hydrous sodium hydroxide material was then dried at 170° C. to yield 3.4 kg dry weight of stable anhydrous sodium hydroxide (NaOH) which product quality was determined as 97.6 wt % NaOH, 1.6 wt % NaCl and 0.8 wt % $Na_2SO_4$.

About 90% by volume of the residual bittern, after NaOH extraction (having a volume of about 4 liters and a salinity of 390 g/L TDS) was recycled to the evaporation pond and the remaining 10% by volume bittern was evaporated artificially to total dryness and the solids were discarded thus achieving zero liquid discharge.

Example 2

One thousand liters of the water used in Example 1 was split into two streams of five hundred liters each. The first stream was reacted with hydrated lime slurry according to reaction [1], with the lime slurry containing 10 wt % solids, at a dosage sufficient to convert 100% of the stoichiometric amount of $HCO_3^-$ to precipitated calcium carbonate (PCC), under strong agitation for 60 minutes, at a pH of about 11.8.

After reaction, the product slurry was separated and thickened in a thickener. The thickened slurry from the underflow was washed in a three stage, counter current, washing circuit at a ratio of 5 parts of washing water to 1 part of thickened slurry. The washed slurry, after drying, yielded 6.5 kg of precipitated calcium carbonate (PCC) of the same quality as the PCC in Example 1 (representing 95% of the stoichiometric amount of $HCO_3^-$ recovered as PCC). The partially processed water (overflow of the main thickener) was added to the second 500 L portion of the feedwater, by which the pH of the aliquot was reduced to 9.72. This partially processed and pH adjusted water was then concentrated in a solar pan giving a brine having a salinity just over 330 g/L TDS, corresponding to an SG of about 1.21 and a total volume of 19 L. The brine was then transferred to a thermal concentrator and was further concentrated at a temperature between 70 and 75° C., to a salinity of about 410 g/L TDS. The analysis of this concentrated brine gave a $CO_3^{2-}$ content of 95 g/L, and a final volume of about 11 liters. The saturated brine was then transferred to a crystalliser and stored for 8 hours at 15° C. to 20° C. from which hydrous sodium carbonate ($Na_2CO_3.H_2O$) crystals were precipitated. The precipitated crystals were then separated, dehydrated and dried in an oven set at 130-150° C. Anhydrous $Na_2CO_3$ product was obtained which was comprised of 97.2 wt % $Na_2CO_3$ and 2.8 wt % NaCl. The bulk of the filtrate from the separation step was then recycled to the solar pan. Around 10% by volume of the filtrate was evaporated to dryness thus avoiding the need for liquid discharge.

Example 3

One thousand liters of saline impaired water from a surface mining operation which analysed as containing 1420 mg/L sodium, 11 mg/L potassium, 18 mg/L magnesium, 17.8 mg/L calcium, 1600 mg/L bicarbonate, 886 mg/L sulphate, 1060 mg/L chloride and determined as having 5 g/L TDS was first filtered through a sand filter and then desalinated using a reverse osmosis unit, giving 50% by volume permeate recovery (500 liters of fresh water) with a salinity of 30 mg/L TDS. 500 liters of concentrate with a salinity of 9.4 g/L TDS was produced. This concentrate was reacted with a hydrated lime slurry having a solids content of 10 wt %, for 60 minutes, under strong agitation, according to reaction [1]. The slurry from the reaction was then separated and thickened in a thickener and the thickened slurry from the underflow was washed in a 3 stage washing unit at a ratio of 5 parts wash water to 1 part underflow slurry. The washed slurry was then dried to give 2.5 kg of PCC product. The PCC comprised 98.1 wt % $CaCO_3$, 0.9 wt % $Mg(OH)_2$, 0.7 wt % gypsum and 0.3 wt % NaCl. The pH of the partially processed water from the overflow of the main thickener was then reduced to 8.9 by adding concentrated $H_2SO_4$. The pH adjusted, partially processed water was then evaporated in a solar pan to a salinity of just above 200 g/L TDS, giving a brine volume of 20 liters. The brine was then cooled in a freezer to about minus 10° C. from which a crystalline slurry was obtained which slurry was then centrifuged to remove free liquid. The crystals were then dehydrated and dried at a temperature of 200° C. to obtain an anhydrous sodium sulphate product of 2.7 kg dry weight. The analysis results indicated 97.6 wt % $Na_2SO_4$, 0.1 wt % gypsum, 0.9 wt % NaCl and 1.4 wt % moisture content. The mother liquor, which after crystal separation was 18 liters in volume with a salinity of 150 g/L TDS, was further evaporated, in serially arranged trays, to increase the salinity to over 320 g/L TDS (corresponding to a SG=1.20). This reduced the volume to 7 liters. It was then transferred to a crystallisation tray and further evaporated, from which sodium chloride crystals were precipitated and harvested. The sodium chloride salt measured 1.4 kg in dry weight. Analysis indicated a composition comprised of 98 wt % NaCl, 1.5 wt % gypsum, 0.4 wt % $CaCl_2$ and 0.1 wt % $MgCl_2$. About 90% by volume of the residual bittern, having a salinity of 510 g/L TDS and a volume of about 2 liters, was recycled back to the primary evaporation pond and the remaining 10% by volume was further evaporated to total dryness.

Example 4

One thousand liters of saline impaired water was analysed as containing 26500 mg/L sodium, 650 mg/L potassium, 3500 mg/L magnesium, 640 mg/L calcium, 300 mg/L bicarbonate, 6500 mg/L sulphate, 46500 mg/L chloride, and having a salinity of 85 g/L TDS and a pH of 8.2. This water was firstly treated by reaction with a hydrated lime slurry, having 10 wt % solids content, at a dosing rate equivalent to react with 100% of the stoichiometric amount of $SO_4^{2-}$ present according to reaction [5], giving a slurry which was separated in a thickener, washed in a three stage wash unit and dewatered. The resultant dewatered filter cake, was dried and weighed 7.3 kg dry weight. Analysis of the dried material showed a composition of 38 wt % $Mg(OH)_2$, 60 wt % gypsum and 2 wt % NaCl by weight. The partially processed water from the thickener was transferred to a holding tank to allow maturation of the solution. It was analysed five days later showing a $SO_4^{2-}$ ion concentration of 4 g/L. The solution was reacted again with a hydrated lime slurry, this time having solids content of 5 wt %, and dosed at a rate to react and precipitate 100% of the stoichiometric amount of the magnesium ion present according to reaction [6]. The $SO_4^{2-}$ ion concentration of the mixed lime slurry and water solution in the reactor was analysed at 2.8 g/L. Strong agitation was applied for 60 minutes. The resultant $Mg(OH)_2$ slurry formed in the reaction vessel was separated from the partially processed water in a thickener and washed in a three stage counter current washing unit at a ratio of five parts washing water to one part underflow. The washed slurry was then dewatered and dried to yield a powder product with a total weight of 5.1 kg. On chemical analysis, this dry powder showed a composition of 95.6 wt % $Mg(OH)_2$, 3.4 wt % calcium oxide equivalent, 0.12 wt % NaCl, 0.5 wt % gypsum, 0.08 wt % Fe, 0.14 wt % heavy metals and other impurities, mainly $Al_2O_3$ and $SiO_2$. The partially processed water from this reaction (being overflow of the second thickener) was concentrated in a solar evaporation pan to brine having a salinity of 335 g/L TDS and a volume of 210 L. This brine was transferred to a crystallisation pan allowing further solar evaporation and thus causing crystallisation and precipitation of sodium chloride (NaCl) crystals. Sodium chloride salt was harvested from the crystallisation pan, stockpile drained and solar dried. The total mass of dried salt thus produced was 51 kg NaCl and upon chemical analysis showed 97.5 wt % NaCl with 0.8 wt % gypsum impurity and 1.7 wt % moisture content. The residual bittern left over from salt harvesting as directed to a deep sump within the crystallisation pan. After two weeks 24 liters of bittern was drawn from the sump and analysed to show a salinity of 550 g/L TDS, SG 1.32 and with chemical composition comprising of 36 wt % $CaCl_2$, 4.5 wt % NaCl and 1.2 wt % $MgCl_2$. This solution rich in calcium chloride was deemed suitable for use in applications where dissolved calcium chloride flakes in water would commonly be used.

Example 5

A field scale experiment was carried out in which a water analysed as having 7.1 g/L magnesium, 2.5 g/L calcium, 69 g/L sodium, 2.6 g/L potassium, 117 g/L chloride, 4.2 g/L sulphate and a TDS salinity of 203 g/L and a flow rate of 7 m³ per hour was reacted with a lime slurry having 4 wt % solids content and a volumetric flow rate of 3 m³ per hour. The reaction was carried out in a series of three reactors, each being 5 cubic meters in volume. The weighted average sulphate concentration of the lime and water charged to the first reactor was controlled to be 2.9 g/L. The three reactors provided about 90 minutes of total residence time. Strong agitation conditions were applied. The slurry from the third reactor was pumped to a vertical, high rate, rakeless thickener, which was operated at a flow rate of 10 m³/hr. Chemical analysis of a sample from the underflow of the thickener gave a composition comprising 85.5 wt % Mg(OH)$_2$, 3.1 wt % gypsum and 11.4 wt % NaCl by dry weight. Microscopic examination of the wet slurry material aided by scanning electron microscopy showed the presence of two types of solid particles, one comprising granular, 1-4 micron size magnesium hydroxide particles and the other comprising euhedral to subhedral acicular to hemi-pyramidal gypsum crystals and crystallites (seed gypsum), less than 30 microns across. The seed gypsum particles were found to be interspersed randomly between the magnesium hydroxide particles. The thickened slurry from the under-flow of the thickener was transferred to a three stage counter current slurry wash system where the wash water flow rate was controlled in the region of 4.5-5 m³/hr, thus giving a ratio of wash water to input slurry of about 4:1. The washed slurry was then dewatered using a filter press, giving 5 tonnes of wet cake after 24 hours of continuous operation. The analysis of a dried sub-sample from a composite sample of three samples collected from the filter press at 8 hourly intervals gave a mineral composition comprising 93.5 wt % Mg(OH)$_2$, 3 wt % calcium oxide equivalent (non-reactive material), 0.6 wt % gypsum, 1.0 wt % NaCl and 1.9 wt % moisture content. In comparison with Example 4, the magnesium hydroxide thus produced required fewer process steps. Microscopic examination aided by scanning electron microscopy showed the general absence of gypsum crystal seeds in the Mg(OH)$_2$ mass, thus indicating the combined beneficial effects of control of the weighted average sulphate ion concentration of the feed streams to the first reactor and the application of a counter current wash system. 5 cubic meters of partially processed water from the main thickener analysed as having 240 mg/L magnesium, 6800 mg/L calcium, 2700 mg/L sulphate, 69200 mg/L chloride and having a salinity of 135 g/L TDS was transferred to a solar evaporation pond and concentrated to a specific gravity of 1.21. Thereafter, it was transferred to a crystallisation pond wherein sodium chloride (NaCl) salt was crystallised and later harvested giving a total of 405 kg of NaCl salt. The raw NaCl salt crystals were de-watered by a stockpile drainage method alongside the pond. The analysis of an air dried sample from this salt harvest batch gave a chemical composition of 97.2 wt % NaCl, 0.7 wt % CaCl$_2$, 1.1 wt % gypsum and 1 wt % moisture content. The residual solution was left for two months in a deep sump within the crystallisation pond. 200 L of bittern were extracted from the sump which upon chemical analysis, showed a salinity of 520 g/L TDS (corresponding to an SG of 1.31) and a composition of 32 wt % of CaCl$_2$, 0.8 wt % MgCl$_2$, 5.5 wt % NaCl, 0.55 wt % Na$_2$SO$_4$, making the solution useable for dust suppression and some other applications where calcium chloride flakes dissolved in water would generally be used.

Example 6

An experiment was carried out using the same water and process steps as in Example 5, but with the difference that the solids content of the lime slurry used was slightly above 4 wt %, such that the weighted average sulphate ion concentration of the combined lime slurry and water was 3.1 g/L. The resultant washed, dewatered and dried magnesium hydroxide product, when analysed, gave a mineral composition comprising 91.2 wt % Mg(OH)$_2$, 2.6 wt % calcium oxide equivalent (non-reactive material), 2.5 wt % gypsum, 1.2 wt % NaCl and 1.6 wt % moisture content. Compared with the washed magnesium hydroxide produced of Example 4, there is a marked increase in the gypsum content of the washed magnesium hydroxide product.

Example 7

Example 6 was repeated using the same materials, but with the difference that the weighted average sulphate ion concentration of the combined lime slurry and water streams was 3.26 g/L. The resultant washed, dewatered and dried magnesium hydroxide product, when analysed, gave a mineral composition comprising 88.7 wt % Mg(OH)$_2$, 3.45 wt % calcium oxide equivalent (non-reactive material), 3.5 wt % gypsum, 1.3 wt % NaCl and 1.9 wt % moisture content. Compared with the washed magnesium hydroxide produced in Example 5, there is a further increase in the gypsum content of the washed magnesium hydroxide product.

Example 8

One thousand liters of saline impaired water, generated by a mining operation, was sampled and treated as described below. The water analysed as containing 6000 mg/L magnesium, 520 mg/L calcium, 120 mg/L bicarbonate, 21620 mg/L sulphate, 145160 mg/L chloride and had a salinity of 270 g/L TDS and a measured pH of 6.57. The water was first reacted with hydrated lime slurry having a solids content of 10 wt % and at a rate sufficient to react and precipitate 10% of the stoichiometric amount of the sulphate ions present in the water. The precipitate thus produced in thin slurry form was thickened and the thickened solid material comprising gypsum and magnesium hydroxide, was stored for possible future processing. The clarified partially processed solution from the thickening stage was then reacted with soda ash (Na$_2$CO$_3$) in a reaction vessel with the soda ash added as a 35 wt % solution at a rate to react with 100% of the stoichiometric amount of the magnesium ion present according to reaction [9]. This equated to 24 dry kg of soda ash. Strong agitation was applied for 80 minutes. The reaction mixture was maintained at a temperature of 45° C. The slurry, which formed according to reaction [9], was then separated and washed in a three stage counter current washing unit at a ratio of five parts washing water to one part underflow rate. The washed slurry was then de-watered and dried to form a light, white powder. X-ray diffraction analysis determined the characteristics of this material to be comparable with those of commercially available magnesium carbonate light (MCL) products. The total weight of dried powder weighed 17.1 kg and chemical analysis determined a composition of 41.1 wt % MgO equivalent; 1.75 wt % CaO equivalent and 0.9 wt % NaCl. The partially processed water after MCL slurry separation was transferred to an evaporation pan and evaporated to a salinity of 325 g/L TDS corresponding to a SG of 1.20. It was then transferred to a shallow crystallisation pan from which sodium chloride salt was precipitated and later harvested. The total weight of sodium chloride salt product weighed 170 kg and was analysed as being composed of 98.6 wt % NaCl, 0.6 wt % MgSO$_4$ and 0.8 wt % gypsum. The residual bittern following slat harvesting was collected and transferred to shallow trays and cooled artificially to minus 10° C. A crystal slurry was formed from which clear crystals were separated by filtration which were then dehydrated by direct heating, giving a white crystalline material that weighed 16 kg. Analysis indicated an anhydrous sodium sulphate product comprising 90 wt % $Na_2SO_4$, 7 wt % NaCl and 3 wt % $MgSO_4$. The residual bittern from the thernardite recovery measuring 110 liters in volume and having a salinity of 510 g/L TDS, was evaporated in a thermal evaporator to total dryness, giving a mixed salt weighing 49.6 kg. Visual examination indicated a composition dominated by NaCl and $Na_2SO_4$ salts.

A sample taken from the partially processed water following MCL separation was analysed as having 310 g/L TDS and a chemical composition of 170 mg/L magnesium, 23 mg/L calcium, 23075 mg/L sulphate, 143530 mg/L chloride and a pH of 10.23. A very small amount of hydrated lime was added to raise the pH of this sample to 11. These pH and chemical characteristics are considered desirable for waters that are to be used in cyanide based leaching processes in gold mining operations as compared with the characteristics of the untreated feedwater.

Example 9

Two hundred liters of a saline impaired water was analysed as containing 595 mg/L sodium, 140 mg/L potassium, 831 mg/L magnesium, 1120 mg/L calcium, 412 mg/L bicarbonate, 5620 mg/L sulphate, 954 mg/L chloride, and 207 mg/L silicon and having a salinity of 9.9 g/L TDS. This water was first reacted with hydrated lime slurry, having a 10 wt % solids content, at a rate corresponding to 100% of the stoichiometric amount required for Mg ion removal according to reaction [5]. Strong agitation was applied for 60 minutes. The slurry thus formed was separated from the partially processed water in a thickener. The thickened slurry was washed in a three stage counter current washing unit at a ratio of five parts washing water to one part underflow rate. The washed slurry was then dewatered and the dewatered filter cake was dehydrated and dried. The total dry weight of this material was 0.9 kg, and upon chemical analysis indicated a composition of 64.4 wt % gypsum, 35 wt % $Mg(OH)_2$ and 0.6 wt % NaCl. The partially processed water from the thickener, was kept in a tank for 3 days to allow residual suspended material to settle. This water was then analysed at the end of the third day and showed a $SO_4^{2-}$ ion content of 2.8 g/L, a Mg ion content of 0.05 g/L and a Ca ion content of 2.3 g/L. This solution was then reacted with 1.2 kg of technical grade sodium carbonate in a reaction vessel for 40 minutes where a reaction according to reaction [2] proceeded under mild agitation conditions. The sodium carbonate reagent dosing was controlled to allow removal of 100% of the stoichiometric amount of the calcium ion content of the water. The slurry precipitate thus formed was separated from the bulk partially processed water in a thickener and then washed in a three stage countercurrent washing unit at a ratio of five parts washing water to one part underflow rate. The washed slurry was then dewatered, dehydrated and dried in a giving a total dry weight of 1.1 kg of dried precipitated calcium carbonate (PCC) material. The composition of this material was determined by analysis as being 98 wt % $CaCO_3$, 0.81 wt % $Mg(OH)_2$, 0.15 wt % $SiO_2$, 0.3 wt % NaCl and 0.12 wt % other impurities (dominated by $Fe_2O_3$ and $Al_2O_3$). The partially processed water separated from the PCC in the second thickener, which was 188 L in volume, was analysed as having a dissolved Si of 4.2 mg/L and a pH of 8.5. This water was then desalinated in a conventional single stage RO desalination unit at a 50% by volume recovery rate to yield 94 liters of permeate at a salinity of 115 mg/L TDS. The concentrate from the RO unit having a volume of 94 L, was then evaporated to dryness in a solar pan giving 1.8 kg of mixed salt which was safely discarded.

Example 10

Three thousand three hundred (3300) liters of saline impaired water which analysed as 8 mg/L magnesium, 35 mg/L calcium, 4100 mg/L bicarbonate, 0.1 mg/L sulphate and 4000 mg/L chloride and total dissolved solids content of 12 g/L, was desalinated in a conventional Reverse Osmosis desalination unit to produce two thousand one hundred and forty (2140) liters of permeate and one thousand and sixty (1160) liters of concentrate. The concentrate analysed as having 18 mg/L magnesium, 90 mg/L calcium, 11600 mg/L bicarbonate, 0.1 mg/L sulphate, 11300 mg/L chloride and a total dissolved solids of 34 g/L. The concentrate was firstly reacted with a hydrated lime slurry, having a 10 wt % solids content, with the lime slurry added at an amount equal to convert 48% of the stoichiometric amount of the $HCO_3^-$ present in the solution to PCC according to reaction [11]. This reaction was carried out under strong agitation conditions for 30 minutes, in a first reactor. During reaction, the pH in the first reactor was measured at 10.6. The thin PCC from this first reactor was transferred to a second reactor, where a calcium chloride solution of 18 wt % $CaCl_2$ content was added at a pre-determined rate to convert 100% of the stoichiometric amount of dissolved carbonate ions to insoluble calcium carbonate. The carbonate ion formation is as a result of reaction [11] in the first reactor. The reaction mixture in the second reactor was subjected to strong agitation for 60-70 minutes at a pH 10.2 to 10.5. The chemical reaction taking place of this second reaction stage was according to reaction [2].

The PCC particles resulting from the reaction with hydrated lime in the first reactor effectively became seeds in the second reactor for further formation of calcium carbonate. Also any residual, minute, unreacted lime particles left over from the first reaction were coated by CaCO3 in the second reactor.

From the second reactor the thin product slurry was separated and thickened in a thickener. The thickened calcium carbonate slurry underflow from this thickener was washed in a three stage counter current washing unit at a ratio of five parts washing water to one part underflow. The washed precipitated calcium carbonate (PCC) slurry was stored in a container and was later dewatered and dried. The total weight of dry PCC product recovered was 18 kg. Analysis of this PCC product showed 98.5 wt % $CaCO_3$, 1.0 wt % $Mg(OH)_2$, 0.28 wt % NaCl and 0.2 wt % moisture content. When this PCC material was mixed with fresh water the pH of the product saturated solution was 9.75 SEM pictures indicated PCC particle sizes of 1 to 2 microns, with an average of 1.5 micron. The particles were bright white, discrete cubic granular crystals.

Example 11

One thousand liters of saline impaired water from a ground water source analysed as 3700 mg/L sodium, 74 mg/L potassium, 120 mg/L magnesium, 49 mg/L calcium, 8540 mg/L bicarbonate, 144 mg/L sulphate, 550 mg/L chloride and contained 13.2 g/L total dissolved solids (TDS). This water was firstly reacted with a hydrated lime slurry, having a 10 wt % solids content, of sufficient amount to convert 47% of the stoichiometric amount of $HCO_3$ present to PCC according to reaction [11], under strong agitation conditions for 60 minutes.

After this first reaction, the resultant thin slurry was separated and thickened in a thickener. The thickened calcium carbonate slurry underflow thus formed was washed in a 3 stage counter current washing unit at a ratio of five parts washing water to one part under flow slurry. The washed precipitated calcium carbonate (PCC) slurry was dewatered and dried to form a PCC product. This PCC product had a total dry weight of 6.5 kg with a chemical analysis as follows: 98.2 wt % $CaCO_3$, 1.46 wt % $Mg(OH)_2$ and 0.34 wt % NaCl.

The partially processed water (overflow of the first thickener) from the first reaction was reacted with sufficient $CaCl_2$ solution, having 18 wt % $CaCl_2$ content, added at a pre-determined rate to convert 100% of the stoichiometric amount of dissolved carbonate ions to insoluble calcium carbonate according to reaction [2]. The reaction mixture in the second reactor was subjected to agitation for 60 minutes.

After the second reaction, the resultant second PCC product slurry was separated and thickened in a thickener. The thickened calcium carbonate slurry underflow was washed in a 3 stage counter current washing circuit at a ratio of five parts washing water to one part under flow. This second washed precipitated calcium carbonate (PCC) slurry was stored in drums and later dewatered and dried which product then weighed 6.2 kg. The second PCC product (from $CaCl_2$ reaction) displayed different chemical and physical qualities compared to the PCC produced in the first reaction (lime reaction). The chemical analysis of the PCC produced in the second reaction was as follows: 98.8 wt % $CaCO_3$, 0.73 wt % $Mg(OH)2$ and 0.34 wt % NaCl. For both products, the $CaCO_3$ particle size and shape were observed by scanning electoral microscope. The particle size of the PCC from the lime reaction (the first PCC product) was in the range of 1 to 3 microns. The particle size of the PCC from the $CaCl_2$ reaction (second PCC product) was in the range of 3 to 10 microns.

The invention claimed is:

1. A process for treatment of water containing dissolved solids, said process being usable for each of the following types of water:

Type 1 water comprising total dissolved solids of 1 to 60 g/L, a $Cl^-/HCO_3^-$ ratio of <2 and a $Cl^-/2SO_4^{2-}$ ratio of >1, Type 2 water comprising total dissolved solids of 1 to 15 g/L, a $Cl^-/HCO_3^-$ ratio of $\geq 2$ and a $Cl^-/2SO_4^{2-}$ ratio of >1, Type 3 water comprising total dissolved solids of 1 to 15 g/L, a $Cl^-/HCO_3^-$ ratio of >2 and a $Cl^-/2SO_4^{2-}$ ratio of <1, Type 4 water comprising total dissolved solids of >15 and $\leq 60$ g/L, a $Cl^-/HCO_3^-$ ratio of >5 and a $Cl^-/2SO_4^{2-}$ ratio of >7, Type 5 water comprising total dissolved solids of >15 and $\leq 60$ g/L, a $Cl^-/HCO_3^-$ ratio of >5 and a $Cl^-/2SO_4^{2-}$ ratio of <7, Type 6 water comprising total dissolved solids of >60 g/L, a $Cl^-/HCO_3^-$ ratio of >5 and a $Cl^-/2SO_4^{2-}$ ratio of >9, and Type 7 water comprising total dissolved solids of >60 g/L, a $Cl^-/HCO_3^-$ ratio of >5 and a $Cl^-/2SO_4^{2-}$ ratio of <9, said process comprising the steps of:

(a) contacting the said water with a first reagent comprising a source of calcium ions selected from the group consisting of calcium oxide, calcium hydroxide, and a combination thereof as a sole agent to cause at least some solids dissolved in the water to react with the first reagent and to form a first solid product and a partially processed water, wherein the water containing dissolved solids is a Type 1 water and the first solid product is precipitated calcium carbonate (PCC) or the water containing dissolved solids is a water of any of Types 2 to 7 and the first solid product is gypsum-magnesium hydroxide mixture (GMH) and wherein the said GMH is further treated by the addition of sulphuric acid to react with 5-50% of the stoichiometric amount of magnesium hydroxide present in the GMH;

(b) recovering the first solid product from the partially processed water;

(c) at least partially concentrating the partially processed water or a portion thereof, so as to promote the formation of a precipitate and a mother liquor; and (d) recovering the precipitate from the mother liquor as a second product, wherein the water is a water of type 1 and the second product is sodium hydroxide, sodium sulphate, sodium chloride or sodium carbonate; wherein the water is a water of any one of types 2, 4, 5, 6 and 7, and the second product is sodium chloride; or wherein the water is a water of type 3, and the second product is sodium sulphate.

2. A process as claimed in claim 1, wherein the water is a type 1 water having a salinity of from 1 to 60 g/L total dissolved solids (TDS).

3. A process as claimed in claim 1, wherein the water is contacted with a pre-determined amount of the first reagent.

4. A process as claimed in claim 1, wherein the water is a water of type 1 and the first product is precipitated calcium carbonate (PCC).

5. A process as claimed in claim 4, wherein, in step (a), only a portion of the bicarbonate ions in the water are converted to PCC and, wherein, in a secondary reaction step, the first solid product and the partially processed water of step (a) are contacted with a solution of calcium chloride to convert substantially all of the carbonate ions in the partially processed water to PCC.

6. A process as claimed in claim 4, wherein, in step (a), only a portion of the bicarbonate ions in the water are converted to PCC and, wherein, in a secondary reaction step after the recovery of the said PCC in step (b), the partially processed water of step (b) is contacted with a solution of calcium chloride to convert substantially all of the remainder of the carbonate ions in the partially processed water to supplementary PCC.

7. A process as claimed in claim 1, wherein the water is a water of type 1 and the second product is sodium hydroxide.

8. A process as claimed in claim 1, wherein the water is a water of any one of types 2, 4, 5, 6 and 7, and the second product is sodium chloride.

9. A process as claimed in claim 8, wherein, after step (b), the partially processed water is contacted, in a step (e), with a second reagent also comprising a source of calcium ions selected from the group consisting of calcium oxide, calcium hydroxide, and a combination thereof, so as to cause at least some of the solids dissolved in the partially processed water to react with the second reagent and to form magnesium hydroxide, and wherein the magnesium hydroxide is recovered from the partially processed water before the recovery of said sodium chloride therefrom.

10. A process as claimed in claim 1, wherein the water is a water of type 3, and the second product is sodium sulphate.

11. A process as claimed in claim 1, wherein the water is a water of type 1 and the pH of the partially processed water is reduced, in a step (b)(i), to a pH falling within the range of from 7 to 10.

12. A process as claimed in claim 11, wherein the pH of the partially processed water is reduced by adding to the partially processed water a pH reducing agent selected from the group consisting of hydrochloric acid, sulphuric acid, saline impaired feed water, a reverse osmosis (RO) concentrate of type 1 water, and a combination of any two or more thereof.

13. A process as claimed in claim 11, wherein the water is a type 1 water, the pH of the partially processed water is reduced to between 8 and 9 by adding sulphuric acid to the partially processed water and wherein the second product is sodium sulphate.

14. A process as claimed in claim 11, wherein the water is a type 1 water, the pH of the partially processed water is reduced to between 8 and 9 by adding hydrochloric acid to the partially processed water and wherein the second product is sodium chloride.

15. A process as claimed in claim 11, wherein the water is a type 1 water, the pH of the partially processed water is reduced to between 8 and 9 by adding type 1 water to the partially processed water and wherein the second product is sodium carbonate.

16. A process as claimed in claim 1, wherein the first reagent is hydrated lime slurry and the weighted average sulphate ion concentration of the water and the hydrated lime slurry is controlled below 3 g/L by controlling the volume of hydrated lime slurry contacted with the water or by controlling the concentration of solids in the hydrated lime slurry, or by both.

17. A process as claimed in claim 1, wherein the reacted GMH product is dried at a temperature between 120° C. and 300° C.

18. A process as claimed in claim 1, wherein the water to the process is a type 4 or a type 6 water, wherein, after step (b), sodium carbonate is added to the partially processed water, and wherein magnesium carbonate light (MCL) is recovered therefrom to produce a treated water which is low in magnesium content.

19. A process as claimed in claim 1, wherein the water is or comprises a concentrate from a reverse osmosis (RO) desalination plant.

20. A process as claimed in claim 1, wherein a portion of the mother liquor of step (d) is combined with the partially processed water from step (b) before it is subjected to evaporation in step (c).

21. A process as claimed in claim 1, wherein a portion of the mother liquor of step (d) is evaporated to total dryness.

22. The process of claim 1, wherein the process is carried out on water of Types 1-3 or 5-7.

* * * * *

UNITED STATES PATENT AND TRADEMARK OFFICE
CERTIFICATE OF CORRECTION

PATENT NO. : 7,595,001 B2
APPLICATION NO. : 10/533980
DATED : September 29, 2009
INVENTOR(S) : Arakel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Twenty-eighth Day of September, 2010

David J. Kappos
*Director of the United States Patent and Trademark Office*